US008611446B2

(12) United States Patent
Maeda et al.

(10) Patent No.: US 8,611,446 B2

(45) Date of Patent: Dec. 17, 2013

(54) COMMUNICATION SYSTEM USING INITIAL LIKELIHOOD INFORMATION FOR PERFORMING MAXIMUM LIKELIHOOD SEQUENCE ESTIMATION (MLSE)

(75) Inventors: Taizo Maeda, Kawasaki (JP); Motoyoshi Sekiya, Kawasaki (JP); Takuya Miyashita, Kawasaki (JP); Rikiya Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 459 days.

(21) Appl. No.: 12/623,850

(22) Filed: Nov. 23, 2009

(65) Prior Publication Data

US 2010/0128809 A1 May 27, 2010

(30) Foreign Application Priority Data

Nov. 27, 2008 (JP) ................................ 2008-302561

(51) Int. Cl.
*H04L 5/12* (2006.01)

(52) U.S. Cl.
USPC .......................................................... 375/262

(58) Field of Classification Search
USPC .......................................................... 375/262
See application file for complete search history.

(56) References Cited

U.S. PATENT DOCUMENTS

| | | | | |
|---|---|---|---|---|
| 5,471,500 | A * | 11/1995 | Blaker et al. | 375/340 |
| 5,537,443 | A * | 7/1996 | Yoshino et al. | 375/340 |
| 5,579,344 | A | 11/1996 | Namekata | |
| 5,673,294 | A | 9/1997 | Namekata | |
| 5,796,756 | A * | 8/1998 | Choi et al. | 714/795 |
| 5,844,951 | A * | 12/1998 | Proakis et al. | 375/347 |
| 6,072,610 | A * | 6/2000 | Kuroyanagi et al. | 398/5 |
| 6,477,200 | B1 * | 11/2002 | Agazzi et al. | 375/233 |
| 6,477,208 | B1 * | 11/2002 | Huff | 375/265 |
| 6,510,536 | B1 * | 1/2003 | Crozier et al. | 714/755 |
| 6,781,938 | B2 | 8/2004 | Nanba et al. | |
| 6,798,852 | B2 * | 9/2004 | Khayrallah et al. | 375/341 |
| 7,203,257 | B2 * | 4/2007 | Fimoff et al. | 375/343 |
| 7,277,506 | B1 * | 10/2007 | Pope et al. | 375/341 |
| 7,633,377 | B2 * | 12/2009 | Sadr | 340/10.1 |
| 2001/0022820 | A1 * | 9/2001 | Zhengdi et al. | 375/265 |
| 2003/0115061 | A1 * | 6/2003 | Chen | 704/240 |
| 2003/0118093 | A1 * | 6/2003 | Bohnhoff et al. | 375/229 |

(Continued)

FOREIGN PATENT DOCUMENTS

| | | |
|---|---|---|
| JP | 07-095107 | 7/1995 |
| JP | 2003-187533 | 4/2003 |
| WO | 2008/038337 | 4/2008 |

OTHER PUBLICATIONS

Notification of Reason for Refusal issued Jun. 5, 2012 in corresponding Japanese Patent Application No. 2008-302561 (3 pages) (2 pages English translation).

*Primary Examiner* — Juan A Torres

(74) *Attorney, Agent, or Firm* — Staas & Halsey LLP

(57) ABSTRACT

A communication system is provided for communicating over a network. A plurality of transmission devices are disposed within a network and connected by transmission channels. A control device calculates initial data required during an initial operation of the transmission devices and sets the initial data to the transmission devices. The transmission devices perform reception processing using maximum likelihood sequence estimation, and the control device obtains, as the initial data, with respect to paths that are signal communication pathways between the transmission devices and in accordance with transmission states of individual paths, initial likelihood information that is initial-stage likelihood information for performing the maximum likelihood sequence estimation.

20 Claims, 46 Drawing Sheets

(56) References Cited

U.S. PATENT DOCUMENTS

| | | | | |
|---|---|---|---|---|
| 2004/0081248 | A1* | 4/2004 | Parolari | 375/259 |
| 2004/0218933 | A1* | 11/2004 | Fludger et al. | 398/205 |
| 2004/0240587 | A1* | 12/2004 | Ozen | 375/340 |
| 2005/0158057 | A1* | 7/2005 | Tomofuji et al. | 398/160 |
| 2005/0271394 | A1* | 12/2005 | Whiteaway et al. | 398/188 |
| 2007/0053650 | A1* | 3/2007 | Shimada et al. | 385/140 |
| 2010/0021179 | A1 | 1/2010 | Kikuchi | |

* cited by examiner

FIG.7

T1 HISTOGRAM TABLE

SIGNAL LEVEL (QUANTIZATION VALUE z)

| | PRESENT STATE AND NEXT BIT | 0 | 1 | 2 | 3 | 4 | 5 | 6 | 7 |
|---|---|---|---|---|---|---|---|---|---|
| h1 | 00-0 | 6 | 50 | 15 | 12 | 10 | 4 | 2 | 1 |
| | 00-1 | 1 | 3 | 5 | 7 | 10 | 32 | 30 | 12 |
| h2 | 01-0 | 3 | 41 | 20 | 15 | 12 | 5 | 3 | 1 |
| | 01-1 | 1 | 3 | 4 | 6 | 9 | 22 | 40 | 15 |
| h3 | 10-0 | 3 | 41 | 20 | 15 | 12 | 5 | 3 | 1 |
| | 10-1 | 1 | 3 | 4 | 6 | 9 | 22 | 40 | 15 |
| h4 | 11-0 | 5 | 25 | 32 | 17 | 12 | 5 | 3 | 1 |
| | 11-1 | 1 | 2 | 3 | 4 | 5 | 15 | 50 | 20 |

PRESENT STATE AND NEXT BIT

T1

| | 0 | 1 | 2 | 3 | 4 | 5 | 6 | 7 |
|---|---|---|---|---|---|---|---|---|
| 00-0 | 6 | 50 | 15 | 12 | 10 | 4 | 2 | 1 |
| 00-1 | 1 | 3 | 5 | 7 | 10 | 32 | 30 | 12 |
| 01-0 | 3 | 41 | 20 | 15 | 12 | 5 | 3 | 1 |
| 01-1 | 1 | 3 | 4 | 6 | 9 | 22 | 40 | 15 |
| 10-0 | 3 | 41 | 20 | 15 | 12 | 5 | 3 | 1 |
| 10-1 | 1 | 3 | 4 | 6 | 9 | 22 | 40 | 15 |
| 11-0 | 5 | 25 | 32 | 17 | 12 | 5 | 3 | 1 |
| 11-1 | 1 | 2 | 3 | 4 | 5 | 15 | 50 | 20 |

| | 0 | 1 | 2 | 3 | 4 | 5 | 6 | 7 |
|---|---|---|---|---|---|---|---|---|
| 00-0 | 6 | 50 | 15 | 12 | 10 | 4 | 2 | 1 |
| 00-1 | 1 | 3 | 5 | 7 | 10 | 32 | 31 | 12 |
| 01-0 | 3 | 41 | 20 | 15 | 12 | 5 | 3 | 1 |
| 01-1 | 1 | 3 | 4 | 6 | 9 | 22 | 40 | 15 |
| 10-0 | 3 | 41 | 20 | 15 | 12 | 5 | 3 | 1 |
| 10-1 | 1 | 3 | 4 | 6 | 9 | 22 | 40 | 15 |
| 11-0 | 5 | 25 | 32 | 17 | 12 | 5 | 3 | 1 |
| 11-1 | 1 | 2 | 3 | 4 | 5 | 14 | 50 | 20 |

FIG.16

| L1 | L2 | L3 | L4 | L5 | L6 | --- |
| --- | --- | --- | --- | --- | --- | --- |
| 0.91 (01-1) | 0.89 (11-1) | 0.20 (11-0) | 0.15 (10-0) | 0.18 (00-0) | 0.90 (00-1) | |

FIG.19

T2 PROBABILITY OF OCCURRENCE TABLE

| r1 QUANTIZATION VALUE z | r2 QUANTIZATION INTERMEDIATE VALUE ( z + 0.5 ) | r3 NORMALIZED RECEIVED LEVEL | L1 (=0.91) | L2 (=0.89) | L3 (=0.20) | L4 (=0.15) | L5 (=0.18) | L6 (=0.90) | ------ |
|---|---|---|---|---|---|---|---|---|---|
| 7 | 7 | 1.00 | 1 | 1 | 1 | 1 | 1 | 1 | |
| 6 | 6.5 | 0.93 | 0.7477878 | 0.9171935 | 1 | 1 | 1 | 0.8477878 | |
| 5 | 5.5 | 0.79 | 3.959E-06 | 8.894E-05 | 1 | 1 | 1 | 1.996E-05 | |
| 4 | 4.5 | 0.64 | 3.906E-22 | 3.24E-19 | 1 | 1 | 1 | 1.199E-20 | |
| 3 | 3.5 | 0.50 | 1.856E-49 | 6.012E-45 | 1 | 1 | 1 | 3.562E-47 | ------ |
| 2 | 2.5 | 0.36 | 3.536E-88 | 4.534E-82 | 1 | 1 | 1 | 4.27E-85 | |
| 1 | 1.5 | 0.21 | 2.55E-138 | 1.3E-130 | 0.6961977 | 0.9895761 | 0.8910982 | 1.94E-134 | |
| 0 | 0.5 | 0.07 | 6.79E-200 | 1.38E-190 | 1.905E-06 | 0.0023697 | 4.759E-05 | 3.27E-195 | |
| | 0 | 0.00 | 5.69E-235 | 7.32E-225 | 3.265E-13 | 3.49E-08 | 4.899E-11 | 6.89E-230 | |

FIG.24

T3 FREQUENCY TABLE

| QUANTIZATION VALUE z | SIGNAL LEVEL L1 | L2 | L3 | L4 | L5 | L6 |
|---|---|---|---|---|---|---|
| 7 | 0.2522 | 0.0828 | 0.0000 | 0.0000 | 0.0000 | 0.1522 |
| 6 | 0.7478 | 0.9171 | 0.0000 | 0.0000 | 0.0000 | 0.8478 |
| 5 | 0.0000 | 0.0001 | 0.0000 | 0.0000 | 0.0000 | 0.0000 |
| 4 | 0.0000 | 0.0000 | 0.0000 | 0.0000 | 0.0000 | 0.0000 |
| 3 | 0.0000 | 0.0000 | 0.0000 | 0.0000 | 0.0000 | 0.0000 |
| 2 | 0.0000 | 0.0000 | 0.3038 | 0.0104 | 0.1089 | 0.0000 |
| 1 | 0.0000 | 0.0000 | 0.6962 | 0.9872 | 0.8911 | 0.0000 |
| 0 | 0.0000 | 0.0000 | 0.0000 | 0.0024 | 0.0000 | 0.0000 |

FIG.26

T1a HISTOGRAM TABLE

STATE-NEXT BIT

| QUANTIZATION VALUE z | 01-1 | 11-1 | 11-0 | 10-0 | 00-0 | 00-1 |
|---|---|---|---|---|---|---|
| 7 | 3 | 1 | 0 | 0 | 0 | 2 |
| 6 | 7 | 9 | 0 | 0 | 0 | 8 |
| 5 | 0 | 0 | 0 | 0 | 0 | 0 |
| 4 | 0 | 0 | 0 | 0 | 0 | 0 |
| 3 | 0 | 0 | 0 | 0 | 0 | 0 |
| 2 | 0 | 0 | 3 | 0 | 1 | 0 |
| 1 | 0 | 0 | 7 | 10 | 9 | 0 |
| 0 | 0 | 0 | 0 | 0 | 0 | 0 |

| STATE-NEXT BIT | 0 | 1 | 2 | 3 | 4 | 5 | 6 | 7 |
|---|---|---|---|---|---|---|---|---|
| 00-0 | 0 | 0 | 0 | 0 | 0 | 0 | 0 | 0 |
| 00-1 | 0 | 0 | 0 | 0 | 0 | 0 | 0 | 0 |
| 01-0 | 0 | 0 | 0 | 0 | 0 | 0 | 0 | 0 |
| 01-1 | 0 | 0 | 0 | 0 | 0 | 0 | 0 | 0 |
| 10-0 | 0 | 0 | 0 | 0 | 0 | 0 | 0 | 0 |
| 10-1 | 0 | 0 | 0 | 0 | 0 | 0 | 0 | 0 |
| 11-0 | 0 | 0 | 0 | 0 | 0 | 0 | 0 | 0 |
| 11-1 | 0 | 0 | 0 | 0 | 0 | 0 | 0 | 0 |

QUANTIZATION VALUE z

⇨

T1a-1

| STATE-NEXT BIT | 0 | 1 | 2 | 3 | 4 | 5 | 6 | 7 |
|---|---|---|---|---|---|---|---|---|
| 00-0 | 0 | 0 | 0 | 0 | 0 | 0 | 0 | 0 |
| 00-1 | 0 | 0 | 0 | 0 | 0 | 0 | 0 | 0 |
| 01-0 | 0 | 0 | 0 | 0 | 0 | 0 | 0 | 0 |
| 01-1 | 0 | 0 | 0 | 0 | 0 | 0 | 7 | 3 |
| 10-0 | 0 | 0 | 0 | 0 | 0 | 0 | 0 | 0 |
| 10-1 | 0 | 0 | 0 | 0 | 0 | 0 | 0 | 0 |
| 11-0 | 0 | 0 | 0 | 0 | 0 | 0 | 0 | 0 |
| 11-1 | 0 | 0 | 0 | 0 | 0 | 0 | 0 | 0 |

QUANTIZATION VALUE z

⇨

T1a-2

| STATE-NEXT BIT | 0 | 1 | 2 | 3 | 4 | 5 | 6 | 7 |
|---|---|---|---|---|---|---|---|---|
| 00-0 | 0 | 0 | 0 | 0 | 0 | 0 | 0 | 0 |
| 00-1 | 0 | 0 | 0 | 0 | 0 | 0 | 0 | 0 |
| 01-0 | 0 | 0 | 0 | 0 | 0 | 0 | 0 | 0 |
| 01-1 | 0 | 0 | 0 | 0 | 0 | 0 | 7 | 3 |
| 10-0 | 0 | 0 | 0 | 0 | 0 | 0 | 0 | 0 |
| 10-1 | 0 | 0 | 0 | 0 | 0 | 0 | 0 | 0 |
| 11-0 | 0 | 0 | 0 | 0 | 0 | 0 | 0 | 0 |
| 11-1 | 0 | 0 | 0 | 0 | 0 | 0 | 9 | 1 |

QUANTIZATION VALUE z

| STATE-NEXT BIT | QUANTIZATION VALUE z: 0 | 1 | 2 | 3 | 4 | 5 | 6 | 7 |
|---|---|---|---|---|---|---|---|---|
| 00-0 | 0 | 0 | 0 | 0 | 0 | 0 | 0 | 0 |
| 00-1 | 0 | 0 | 0 | 0 | 0 | 0 | 0 | 0 |
| 01-0 | 0 | 0 | 0 | 0 | 0 | 0 | 0 | 0 |
| 01-1 | 0 | 0 | 0 | 0 | 0 | 0 | 7 | 3 |
| 10-0 | 0 | 0 | 0 | 0 | 0 | 0 | 0 | 0 |
| 10-1 | 0 | 0 | 0 | 0 | 0 | 0 | 0 | 0 |
| 11-0 | 0 | 7 | 3 | 0 | 0 | 0 | 0 | 0 |
| 11-1 | 0 | 0 | 0 | 0 | 0 | 0 | 9 | 1 |

T1a-4

| STATE-NEXT BIT | QUANTIZATION VALUE z: 0 | 1 | 2 | 3 | 4 | 5 | 6 | 7 |
|---|---|---|---|---|---|---|---|---|
| 00-0 | 0 | 0 | 0 | 0 | 0 | 0 | 0 | 0 |
| 00-1 | 0 | 0 | 0 | 0 | 0 | 0 | 0 | 0 |
| 01-0 | 0 | 0 | 0 | 0 | 0 | 0 | 0 | 0 |
| 01-1 | 0 | 0 | 0 | 0 | 0 | 0 | 7 | 3 |
| 10-0 | 0 | 10 | 0 | 0 | 0 | 0 | 0 | 0 |
| 10-1 | 0 | 0 | 0 | 0 | 0 | 0 | 0 | 0 |
| 11-0 | 0 | 7 | 3 | 0 | 0 | 0 | 0 | 0 |
| 11-1 | 0 | 0 | 0 | 0 | 0 | 0 | 9 | 1 |

| STATE-NEXT BIT | 0 | 1 | 2 | 3 | 4 | 5 | 6 | 7 |
|---|---|---|---|---|---|---|---|---|
| 00-0 | 0 | 9 | 1 | 0 | 0 | 0 | 0 | 0 |
| 00-1 | 0 | 0 | 0 | 0 | 0 | 0 | 0 | 0 |
| 01-0 | 0 | 0 | 0 | 0 | 0 | 0 | 0 | 0 |
| 01-1 | 0 | 0 | 0 | 0 | 0 | 0 | 7 | 3 |
| 10-0 | 0 | 10 | 0 | 0 | 0 | 0 | 0 | 0 |
| 10-1 | 0 | 0 | 0 | 0 | 0 | 0 | 0 | 0 |
| 11-0 | 0 | 7 | 3 | 0 | 0 | 0 | 0 | 0 |
| 11-1 | 0 | 0 | 0 | 0 | 0 | 0 | 9 | 1 |

QUANTIZATION VALUE z

⇩

T1a-6

| STATE-NEXT BIT | 0 | 1 | 2 | 3 | 4 | 5 | 6 | 7 |
|---|---|---|---|---|---|---|---|---|
| 00-0 | 0 | 9 | 1 | 0 | 0 | 0 | 0 | 0 |
| 00-1 | 0 | 0 | 0 | 0 | 0 | 0 | 8 | 2 |
| 01-0 | 0 | 0 | 0 | 0 | 0 | 0 | 0 | 0 |
| 01-1 | 0 | 0 | 0 | 0 | 0 | 0 | 7 | 3 |
| 10-0 | 0 | 10 | 0 | 0 | 0 | 0 | 0 | 0 |
| 10-1 | 0 | 0 | 0 | 0 | 0 | 0 | 0 | 0 |
| 11-0 | 0 | 7 | 3 | 0 | 0 | 0 | 0 | 0 |
| 11-1 | 0 | 0 | 0 | 0 | 0 | 0 | 9 | 1 |

QUANTIZATION VALUE z

T4 PROBABILITY OF OCCURRENCE TABLE

| r1 QUANTIZATION VALUE z | r2 QUANTIZATION INTERMEDIATE VALUE (z + 0.5) | r3 NORMALIZED RECEIVED LEVEL | BIT 1 (MARK $\mu_1$=0.64) | BIT 0 (SPACE $\mu_0$=0.38) |
|---|---|---|---|---|
| 7 | 7 | 1.00 | 1 | 1 |
| 6 | 6.5 | 0.93 | 1 | 1 |
| 5 | 5.5 | 0.79 | 1 | 1 |
| 4 | 4.5 | 0.64 | 0.7249691 | 1 |
| 3 | 3.5 | 0.50 | 1.038E-44 | 1 |
| 2 | 2.5 | 0.36 | 1.15E-179 | 0.9255107 |
| 1 | 1.5 | 0.21 | 0 | 1.05E-39 |
| 0 | 0.5 | 0.07 | 0 | 2.55E-169 |
|  | 0 | 0.00 | 0 | 1.12E-268 |

FIG.36

T5 FREQUENCY TABLE

| QUANTIZATION VALUE z | BIT 1 | BIT 0 |
|---|---|---|
| 7 | 0.0000 | 0.0000 |
| 6 | 0.0000 | 0.0000 |
| 5 | 0.2750 | 0.0000 |
| 4 | 0.7250 | 0.0000 |
| 3 | 0.0000 | 0.0745 |
| 2 | 0.0000 | 0.9255 |
| 1 | 0.0000 | 0.0000 |
| 0 | 0.0000 | 0.0000 |

FIG.38

T1b HISTOGRAM TABLE

| QUANTIZATION VALUE z | BIT 1 | BIT 0 |
|---|---|---|
| 7 | 0 | 0 |
| 6 | 0 | 0 |
| 5 | 28 | 0 |
| 4 | 72 | 0 |
| 3 | 0 | 7 |
| 2 | 0 | 93 |
| 1 | 0 | 0 |
| 0 | 0 | 0 |

COMMUNICATION SYSTEM USING INITIAL LIKELIHOOD INFORMATION FOR PERFORMING MAXIMUM LIKELIHOOD SEQUENCE ESTIMATION (MLSE)

CROSS-REFERENCE TO RELATED APPLICATIONS

This application is based upon and claims the benefit of priority of the prior Japanese Patent Application No. 2008-302561, filed on Nov. 27, 2008, the entire contents of which are incorporated herein by reference.

FIELD

The present invention relates to a communication system for communicating over a network.

BACKGROUND

In an optical communication system, when performing high-capacity long-distance transmission at high speed, nonlinear optical phenomena such as wavelength dispersion and polarization mode dispersion (PMD) become prominently manifested, causing waveform distortion which, in turn, causes an increase in the error rate of a received signal.

Compensation control must be performed on such waveform distortion at the receiving side of the optical communication system. A received signal sequence estimation method using maximum likelihood sequence estimation (MLSE) technology has been realized as compensation to be performed at an electrical stage.

Maximum likelihood sequence estimation refers to an estimation method of searching for most probable information data that maximizes the likelihood of presently received information data based on previously obtained likelihood (probability) information.

In this case, likelihood refers to a conditional probability that Y has been transmitted in received data X. In other words, likelihood refers to the probability of the occurrence of an event in which Y is transmitted, given that an event in which data X is received has already occurred.

As a conventional technique for maximum likelihood sequence estimation, a technique involving estimating a transmission channel impulse response initial value in a known signal sequence segment to reduce the amount of computation to be performed is proposed in paragraph [0068] and FIG. 1 in Japanese Patent Laid-Open No. H07-095107 (Japanese Patent No. 3560991). In addition, a technique for creating an accurate expected value from a histogram of a playback signal sampling value even when an offset occurs in the playback signal is proposed in paragraph [85] and FIG. 4 in Japanese Patent Laid-Open No. 2003-187533.

With a receiving device that performs bit estimation using maximum likelihood sequence estimation, bit estimation of a received signal is performed using previously obtained likelihood information. In this case, a method is adopted in which a likelihood determined upon bit estimation is fed back to previously obtained likelihood information to update the likelihood information and sequentially generate new likelihood information.

In addition, with a receiving device, during initial activation thereof, the receiving device retains initial likelihood information (an initial value of a likelihood distribution) as a first piece of likelihood information to be used in bit estimation and, based on the initial likelihood information, performs bit estimation and updates likelihood information.

Therefore, in order to perform maximum likelihood sequence estimation with high accuracy, it is required that the transmission state of a signal received by the receiving device is appropriately reflected in initial likelihood information that becomes a basis when performing update processing.

However, with a receiving device that performs conventional maximum likelihood sequence estimation, initial likelihood information is often set as a fixed default value and does not reflect information on the transmission state of the actual network where the receiving device is disposed.

Since using initial likelihood information not reflecting a transmission state means that the first piece of likelihood information for performing bit estimation is erroneous, bit estimation cannot be performed with high accuracy. In addition, updating likelihood information using erroneously judged likelihoods results in errors being accumulated in likelihood information. This problem becomes prominent when there is a significant difference between a waveform of a received signal assumed in order to obtain initial likelihood information and a waveform of an actually transmitted received signal.

FIG. 46 is a diagram illustrating an eye pattern of a received signal. The waveform of an actually transmitted received signal is susceptible to degradation due to waveform distortion and noise which often result in a lower eye aperture ratio. Reducing the error rate of a received signal requires that a transmission state due to such waveform degradation occurring on a transmission channel be appropriately reflected in initial likelihood information to be used in bit sequence estimation. However, conventionally, such transmission states have not been reflected.

Consequently, the deviation between a transmission state of an actual network and an optimum value increases, resulting in a higher error rate. Moreover, in the case of an occurrence of an excessive error, there is even a risk that the receiving device will fail to activate.

SUMMARY

A communication system for communicating over a network, the communication system has a plurality of transmission devices disposed within a network and connected by transmission channels; and a control device that calculates initial data required during an initial operation of the transmission devices and sets the initial data to the transmission devices, wherein the transmission devices perform reception processing using maximum likelihood sequence estimation, and the control device obtains, as the initial data, with respect to paths that are signal communication pathways between the transmission devices and in accordance with the transmission states of individual paths, initial likelihood information that is initial-stage likelihood information for performing the maximum likelihood sequence estimation.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating a management configuration example of histogram data;

FIG. 16 is a diagram illustrating signal level values obtained from a received waveform;

FIG. 19 is a diagram illustrating the probabilities of occurrence of a received level in a signal level;

FIG. 24 is a diagram illustrating a frequency table;

FIG. 26 is a diagram illustrating a histogram table;

FIG. 27 is a diagram illustrating a registration process of initial histogram data to a histogram table;

FIG. 28 is a diagram illustrating a registration process of initial histogram data to a histogram table;

FIG. 29 is a diagram illustrating a registration process of initial histogram data to a histogram table;

FIG. 31 is a diagram illustrating the probabilities of occurrence of received levels at bits 0 and 1;

FIG. 36 is a diagram illustrating a frequency table;

FIG. 38 is a diagram illustrating a histogram table;

DETAILED DESCRIPTION OF EMBODIMENT(S)

Figure 1:
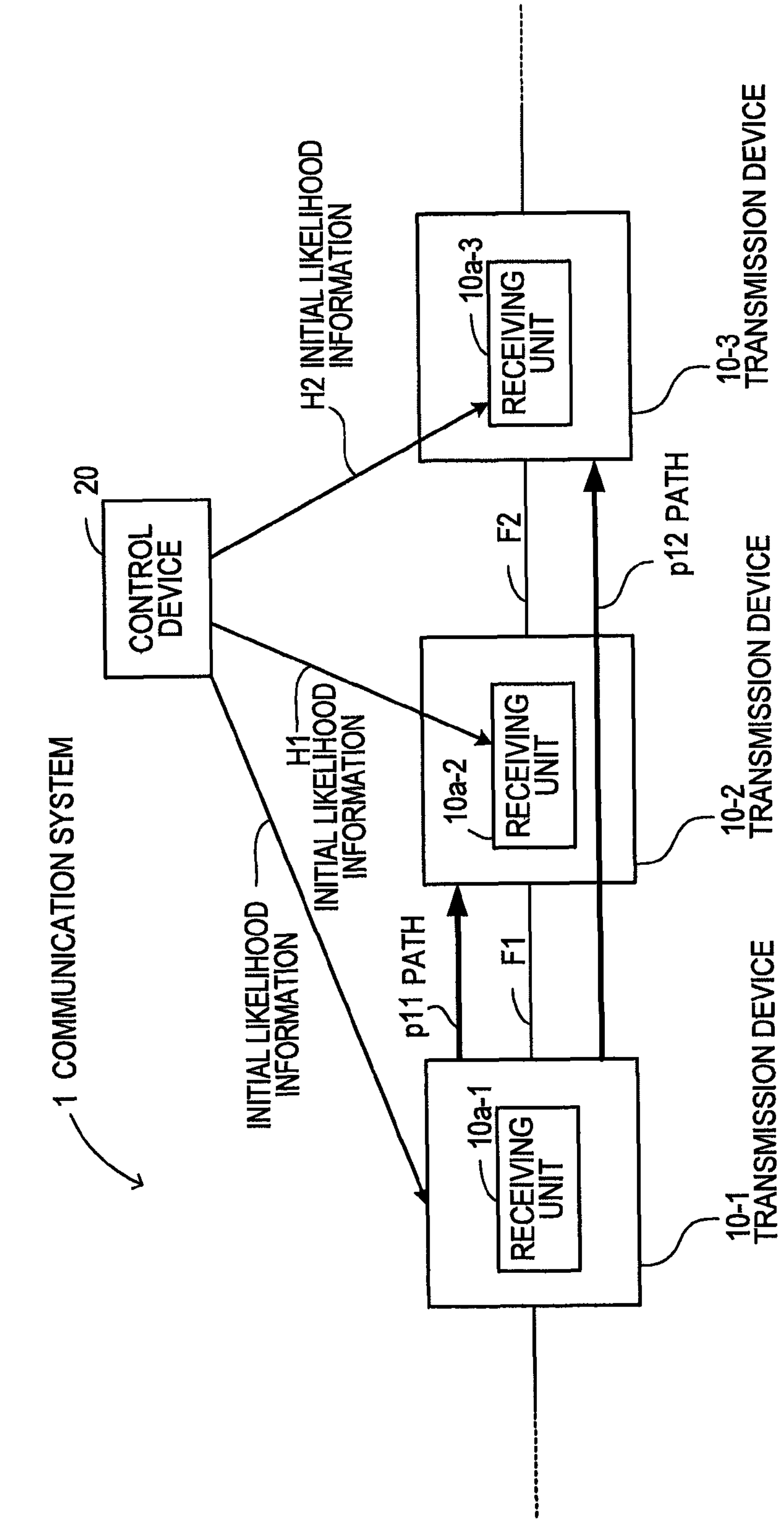
FIG. 1 is a principle diagram of a communication system.

Hereinafter, embodiments of the present invention will be described with reference to the drawings. FIG. 1 is a principle diagram of a communication system. A communication system 1 forms a network including transmission devices 10-1 to 10-3 and a control device 20, and is a system for communicating over the network.

The transmission device 10-1 and the transmission device 10-2 are connected by a transmission channel F1, and the transmission device 10-2 and the transmission device 10-3 are connected by a transmission channel F2. In addition, the transmission devices 10-1 to 10-3 respectively include receiving units 10*a*-1 to 10*a*-3 which perform maximum likelihood sequence estimation during signal reception.

The control device 20 calculates initial data that becomes necessary during initial operations of the transmission devices 10-1 to 10-3, and sets the calculated initial data to the transmission devices 10-1 to 10-3. The initial data is initial likelihood information that is initial-stage likelihood information to be used by the transmission devices 10-1 to 10-3 to perform maximum likelihood sequence estimation and is obtained in accordance with the transmission states of the individual paths that are signal communication pathways between the transmission devices.

In this case, a path p11 denotes a signal communication pathway (a logical data communication path) from the transmission device 10-1 to the transmission device 10-2 (a communication pathway through which a signal flows in a sequence of the transmission device 10-1→ the transmission channel F1→ the transmission device 10-2), and a signal is transmitted from the transmission device 10-1 to the transmission device 10-2 via the path p11. In addition, a path p12 denotes a signal communication pathway from the transmission device 10-1 to the transmission device 10-3 (a communication pathway through which a signal flows in a sequence of the transmission device 10-1→ the transmission channel F1→ the transmission device 10-2→ the transmission channel F2→ the transmission device 10-3), and a signal is transmitted from the transmission device 10-1 to the transmission device 10-3 via the path p12.

In this case, the control device 20 calculates, as initial data corresponding to the path p11, initial likelihood information H1 that becomes necessary when maximum likelihood sequence estimation is performed by the transmission device

10-2, and sets the initial likelihood information H1 to the receiving unit 10*a*-2 in the transmission device 10-2.

In addition, the control device 20 calculates, as initial data corresponding to the path p12, initial likelihood information H2 that becomes necessary when maximum likelihood sequence estimation is performed by the transmission device 10-3, and sets the initial likelihood information H2 to the receiving unit 10*a*-3 in the transmission device 10-3.

The transmission device 10-2 performs bit estimation processing upon signal reception and updates likelihood information based on the initial likelihood information H1 set for initial operation. In a similar manner, the transmission device 10-3 performs bit estimation processing upon signal reception and updates likelihood information based on the initial likelihood information H2 set for initial operation.

Next, a configuration of a receiving unit in a transmission device will be described. In the following description, it is assumed that the communication system 1 is a system configured on an optical network and the transmission devices are optical nodes that perform transmission control of optical signals.

Figure 2:
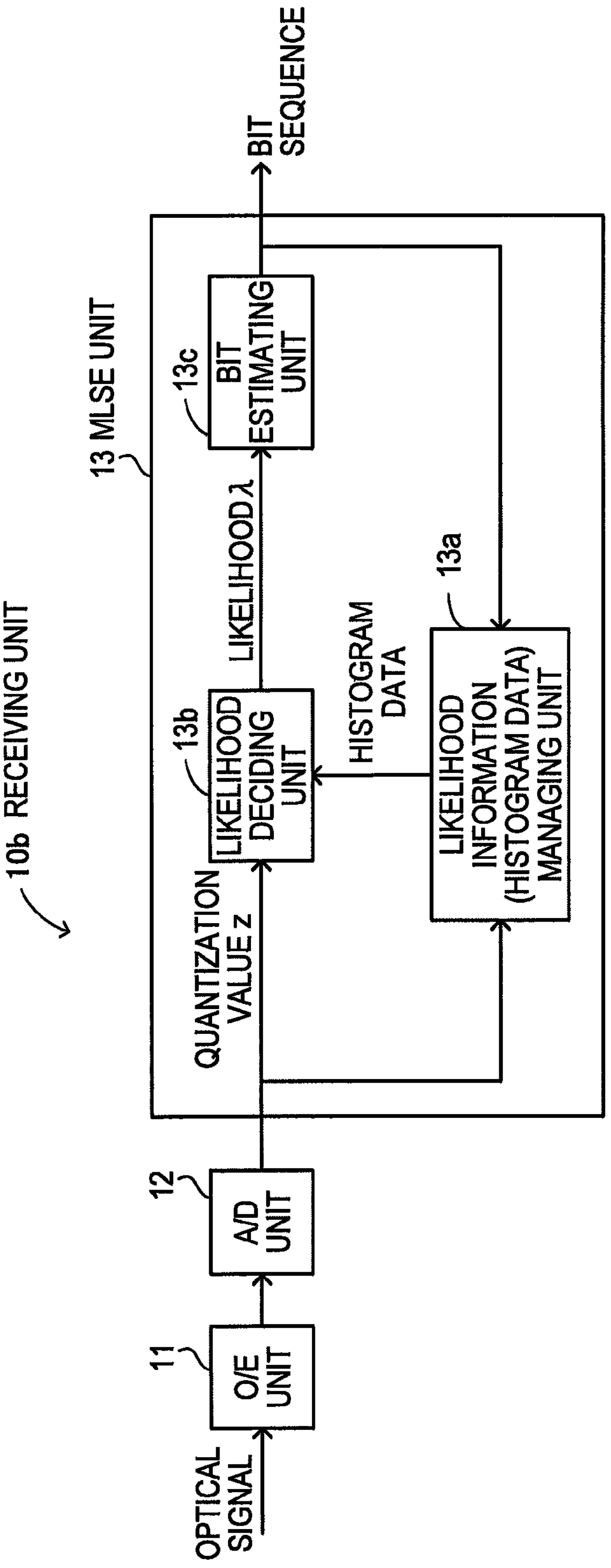
FIG. 2 is a diagram illustrating a configuration of a receiving unit.

FIG. 2 is a diagram illustrating a configuration of a receiving unit. A receiving unit 10*b* that performs maximum likelihood sequence estimation includes an O/E unit (optical/electrical converting unit) 11, an A/D unit (analog/digital converting unit) 12, and an MLSE unit 13. The MLSE unit 13 includes a likelihood information managing unit 13*a*, a likelihood deciding unit 13*b*, and a bit estimating unit 13*c*.

The O/E unit 11 converts a received optical signal into an electrical signal. The A/D unit 12 performs quantization on the electrical signal and outputs a quantized value (quantization value) z. The likelihood information managing unit 13*a* manages, on a database, likelihood information that is information on a likelihood distribution (probability distribution) as to whether the quantization value z is to take a bit value of 0 or 1.

For example, when the A/D unit 12 performs 8-bit quantization and outputs quantization values z=0 to 7, the likelihood information managing unit 13*a* converts a distribution of the likelihood that the respective quantization values z=0 to 7 take bit 0 and a distribution of the likelihood that the respective quantization values z=0 to 7 take bit 1 into histogram data, and retains and manages the histogram data. Data management using histograms will be described later with reference to FIG. 4.

Moreover, the likelihood information managing unit 13*a* retains initial likelihood information set by the control device 20, and updates the initial likelihood information based on bit values determined by self-performed bit estimation (hereinafter, initial likelihood information shall be referred to as initial histogram information).

The likelihood deciding unit 13*b* obtains a likelihood λ of the presently received quantization value z based on the quantization value z and likelihood information (histogram data) of previous quantization values z retained by the likelihood information managing unit 13*a*.

Based on the likelihood λ, the bit estimating unit 13*c* estimates and outputs a bit value (0 or 1) of the quantization value z. The quantization value z and the bit estimate of the quantization value z are transmitted to the likelihood information managing unit 13*a* to be used to update the likelihood distribution to be newly generated.

Next, operations of maximum likelihood sequence estimation to be performed by the MLSE unit 13 will be described in detail with reference to FIGS. 3 to 6. When performing bit estimation (maximum likelihood sequence estimation) on whether the bit value of a presently received signal takes a value of 0 or 1, the bit value is estimated by respectively obtaining the likelihood that the bit takes a value of 0 and the likelihood that the bit takes a value of 1, and selecting which ever likelihood is greater.

In this case, the likelihood that the presently received bit takes a value of 0 is equivalent to a conditional probability under the condition that a most recently (previously) received N-bit bit sequence (b1, b2, . . . , bN) has occurred. In addition, the likelihood that the presently received bit takes a value of 1 is equivalent to a conditional probability under the condition that a most recently received N-bit bit sequence (b1, b2, . . . , bN) has occurred.

A specific description will be given below assuming that N=2 (in the following description, N shall also be referred to as a state bit N). Let state (b1b2) denote a state of a most recently received bit sequence (b1, b2) and likelihood λ (b1b2, 0) denote a likelihood (conditional probability) that the presently received bit takes a value of 0. In addition, let likelihood λ (b1b2, 1) denote a likelihood (conditional probability) that the presently received bit takes a value of 1.

Figure 3:
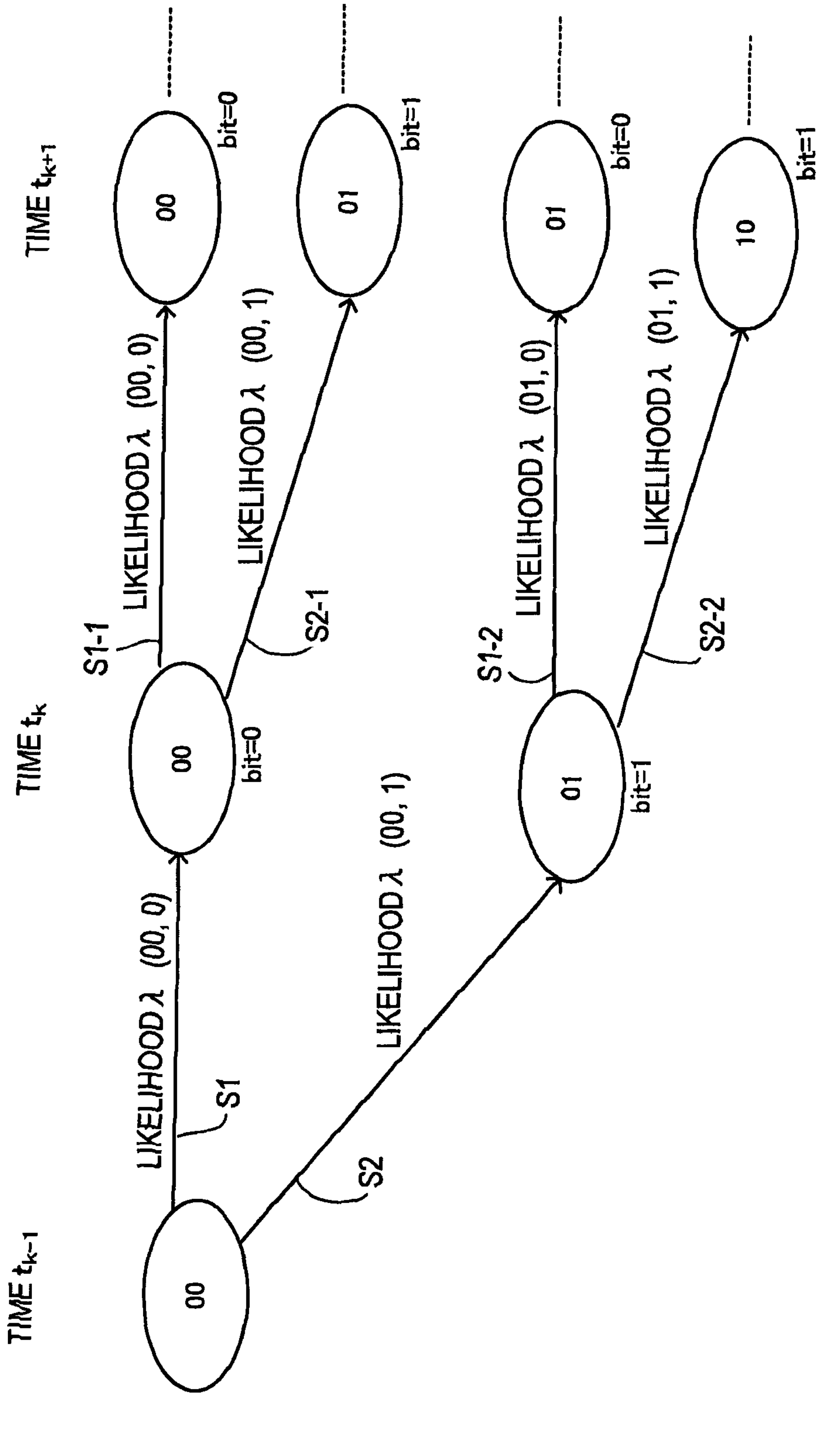
FIG. 3 is a diagram illustrating a flow of bit estimation.

FIG. 3 is a diagram illustrating a flow of bit estimation. When the state of the bit sequence at time $t_{k-1}$ is (00), the likelihood that the bit received at time $t_k$ takes a value of 0 may be expressed as likelihood λ (00, 0) and the likelihood that the bit received at time $t_k$ takes a value of 1 may be expressed as likelihood λ (00, 1).

[S1] Comparing the value of the likelihood λ (00, 0) and the value of the likelihood λ (00, 1), if likelihood λ (00, 0)>likelihood λ (00, 1), then the value of the bit at time $t_k$ is estimated to be 0. Subsequently, a state transition occurs to the bit sequence state (00) of time $t_k$.

[S2] If likelihood λ (00, 1)>likelihood λ (00, 0), then the value of the bit at time $t_k$ is estimated to be 1. Subsequently, a state transition occurs to the bit sequence state (01) of time $t_k$.

In addition, as an estimation of a bit to be received at time $t_{k+1}$, under the condition that the bit sequence state (00) at time $t_k$ has occurred, the likelihood that the bit to be received at time $t_{k+1}$ takes a value of 0 can be expressed as likelihood λ (00, 0) and the likelihood that the bit to be received at time $t_{k+1}$ takes a value of 1 can be expressed as likelihood λ (00, 1).

[S1-1] Comparing the value of the likelihood λ (00, 0) and the value of the likelihood X, (00, 1), if likelihood λ (00, 0)>likelihood λ (00, 1), then the value of the bit at time $t_{k+1}$ is estimated to be 0. Subsequently, a state transition occurs to the bit sequence state (00) of time $t_{k+1}$.

[S2-1] If likelihood λ (00, 1)>likelihood λ (00, 0), then the value of the bit at time $t_k+_1$ is estimated to be 1. Subsequently, a state transition occurs to the bit sequence state (01) of time $t_{k+1}$.

Furthermore, as an estimation of a bit to be received at time $t_{k+1}$, under the condition that the bit sequence state (01) at time $t_k$ has occurred, the likelihood that the bit to be received at time $t_{k+1}$ takes a value of 0 can be expressed as likelihood λ (01, 0) and the likelihood that the bit to be received at time $t_{k+1}$ takes a value of 1 can be expressed as likelihood λ (01, 1).

[S1-2] Comparing the value of the likelihood λ (01, 0) and the value of the likelihood λ (01, 1), if likelihood λ (01, 0)>likelihood λ (01, 1), then the value of the bit at time $t_{k+1}$ is estimated to be 0. Subsequently, a state transition occurs to the bit sequence state (01) of time $t_{k+1}$.

[S2-2] If likelihood λ (01, 1)>likelihood λ (01, 0), then the value of the bit at time $t_{k+1}$ is estimated to be 1. Subsequently, a state transition occurs to the bit sequence state (10) of time $t_{k+1}$. Thereafter, in a similar manner, by performing bit estimation, a bit sequence made up of bit values estimated at respective time points is to be generated and outputted.

Next, a histogram representing a likelihood distribution will be described. Likelihood to be used as a criterion of bit estimation on whether a bit takes a value of 0 or 1 is to be converted into a database and stored in advance. Specifically, a likelihood distribution for each quantization value is converted into histogram data to be saved and managed.

When performing a bit estimation of a quantization value at time $t_k$, a likelihood corresponding to the quantization value that a value of 0 is to be taken and a likelihood corresponding to the quantization value that a value of 1 is to be taken are extracted from the histogram, the two likelihoods are compared against each other, and whichever the greater of the two is determined as the likelihood λ.

Figure 4:
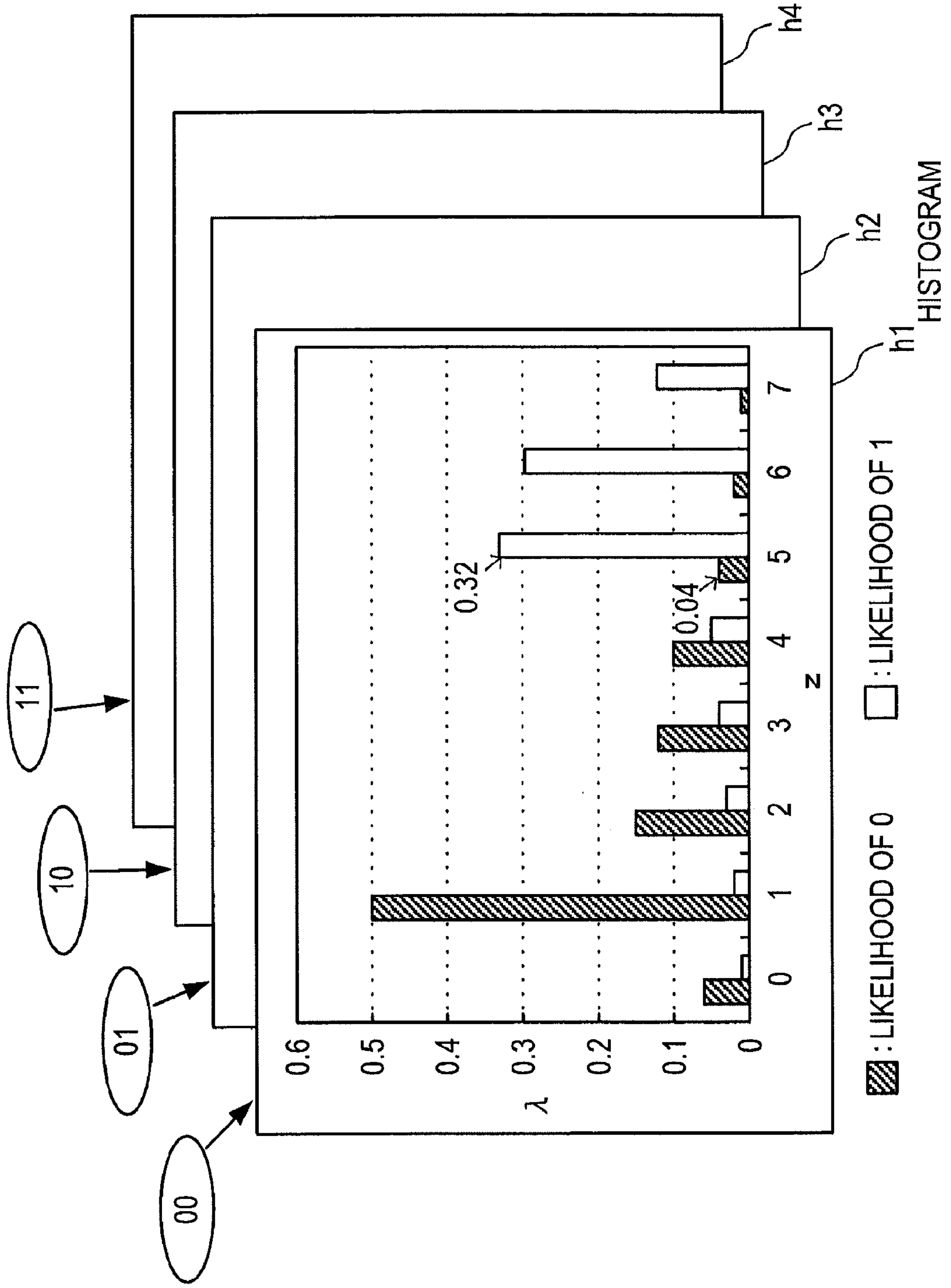
FIG. 4 is a diagram illustrating a histogram.

FIG. 4 is a diagram illustrating a histogram. The ordinate represents likelihood λ and the abscissa represents quantization value z. It is assumed that 8-bit quantization is to be performed and the quantization value z is to range between 0 and 7. Histograms h1 to h4 correspond to respective states (00), (01), (10), and (11). A histogram of a single state illustrates, for each quantization value, a likelihood distribution that a value of 0 is to be taken and a likelihood distribution that a value of 1 is to be taken. Hereinafter, whenever a histogram is to be illustrated, a likelihood that a value of 0 is to be taken shall be depicted by a hatched bar graph and a likelihood that a value of 1 is to be taken shall be depicted by an outlined bar graph.

Histogram h1 illustrates a likelihood that a value of 0 is to be taken and a likelihood that a value of 1 is to be taken for quantization values z=0 to 7 when the bit sequence state is (00). In addition, for example, when focusing on quantization value z=5 in histogram h1, it is shown that the likelihood that a value of 0 is to be taken is likelihood λ (00, 0)=0.04 and that the likelihood that a value of 1 is to be taken is likelihood λ (00, 1)=0.32. Therefore, from likelihood λ (00, 1)>likelihood λ (00, 0), the value of the bit of quantization value z=5 is estimated to be 1 (correspondence to FIG. 3 implies that a pathway of a transition from the state (00) to the state (01) is to be selected).

Next, state transition using a trellis diagram will be described. Along with the transition of bit sequence states illustrated in FIG. 3, the process of selecting a next pathway (a next state) can be represented by a trellis diagram.

Figure 5:
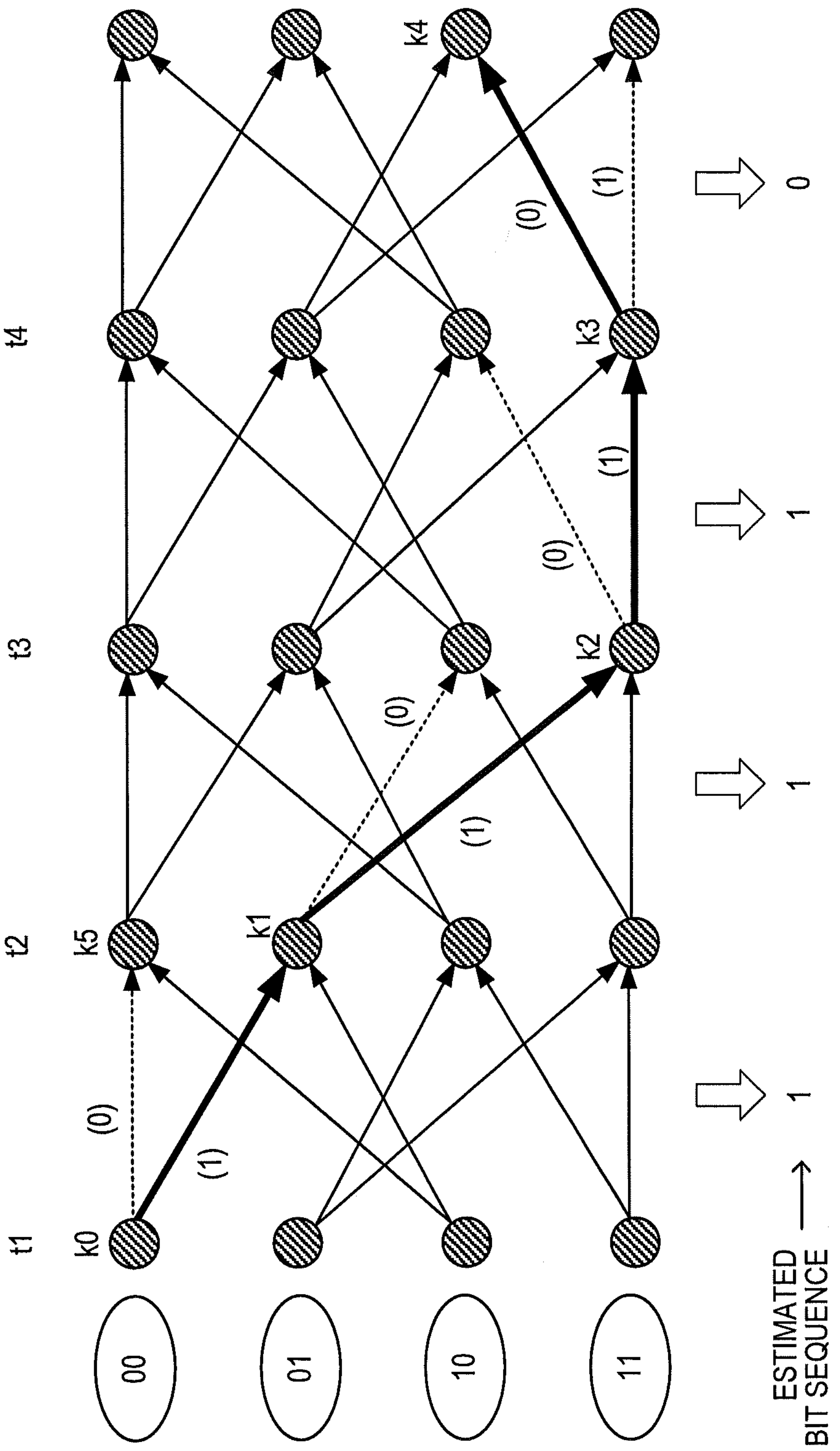
FIG. 5 is a trellis diagram.

FIG. 5 is a trellis diagram. The vertical direction of the trellis diagram represents a bit sequence state which may take any of the following four states: (00), (01), (10), and (11). In addition, the horizontal direction of the trellis diagram represents state transitions per time.

Numerical values (0) or (1) indicated above the arrows in the trellis diagram represent bit values. The arrows in the trellis diagram represent directions of pathway selection in accordance with estimated bit values. For example, at a grid point k0, a transition is made to a grid point k5 when the value of the bit is estimated to be 0 and a transition is made to a grid point k1 when the value of the bit is estimated to be 1.

Figure 6:
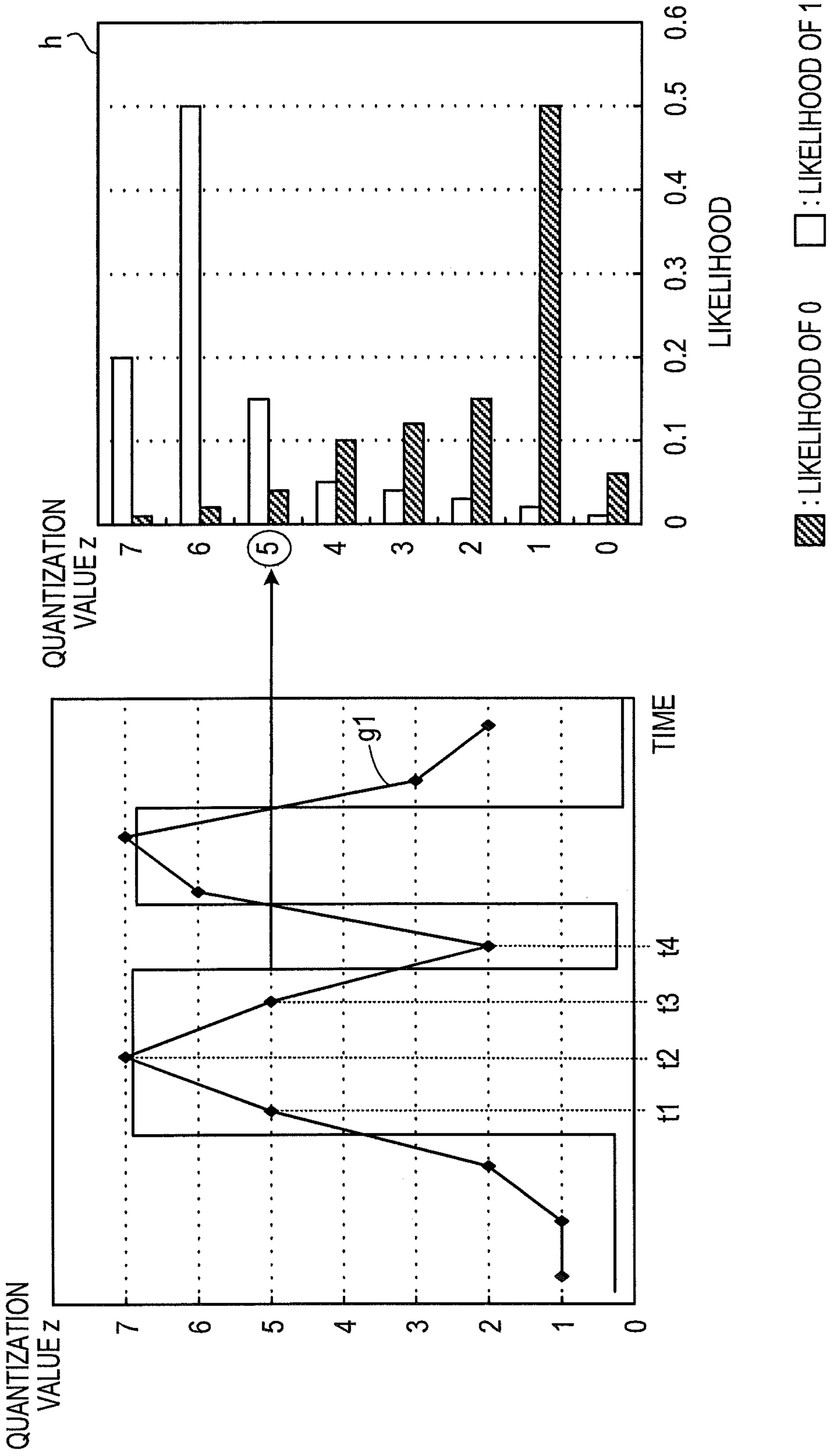
FIG. 6 is a diagram illustrating a temporal displacement of a quantization value and a histogram.

FIG. 6 is a diagram illustrating a temporal displacement of a quantization value and a histogram. A quantization value graph g1 illustrates a temporal displacement of a quantization value with respect to a received signal, where the ordinate represents quantization value z and the abscissa represents time. The square wave illustrated in the graph g1 is a digital waveform representation of the received signal. In addition, a histogram h represents a likelihood distribution corresponding to the quantization value z.

A flow of pathway selection using a trellis diagram will now be described with reference to FIGS. 5 and 6 (in the following description of the pathway selection flow, technically, although the four histograms h1 to h4 respectively corresponding to the states (00), (01), (10), and (11) should be described, the description will be given instead by having a single histogram h represent the four histograms h1 to h4).

At time t1, the quantization value z=5 is derived from the graph g1. Assume that the present state of the quantization value z=5 is (00) and that the point of departure of pathway selection is the grid point k0 of the trellis diagram.

[Time t1] From the graph g1, it is derived that the quantization value z=5. Since it is derived from the histogram h (in reality, the histogram h1 corresponding to the state (00) is to be used) that the likelihood of the quantization value z=5 at the grid point k0 of the state (00) is likelihood λ (00, 1)>likelihood λ (00, 0), it is estimated that the bit value=1. The pathway selection flow then transitions to the grid point k1.

[Time t2] From the graph g1, it is derived that the quantization value z=7. Since it is derived from the histogram h (in reality, the histogram h2 corresponding to the state (01) is to be used) that the likelihood of the quantization value z=7 at the grid point k1 of the state (01) is likelihood λ (01, 1)>likelihood λ (01, 0), it is estimated that the bit value=1. The pathway selection flow then transitions to the grid point k2.

[Time t3] From the graph g1, it is derived that the quantization value z=5. Since it is derived from the histogram h (in reality, the histogram h4 corresponding to the state (11) is to be used) that the likelihood of the quantization value z=5 at the grid point k2 of the state (11) is likelihood k (11, 1)>likelihood λ (11, 0), it is estimated that the bit value=1. The pathway selection flow then transitions to the grid point k3.

[Time t4] From the graph g1, it is derived that the quantization value z=2. Since it is derived from the histogram h (in reality, the histogram h4 corresponding to the state (11) is to be used) that the likelihood of the quantization value z=2 at the grid point k3 of the state (11) is likelihood λ (11, 0)>likelihood λ (11, 1), it is estimated that the bit value=0. The pathway selection flow then transitions to the grid point k4.

Therefore, the bit values of the respective quantization values at time t1 to time t4 are sequentially estimated as being 1, 1, 1, and 0. In other words, the digital values of signals received at time t1 to t4 is recognized as being 1, 1, 1, and 0.

Figure 8:
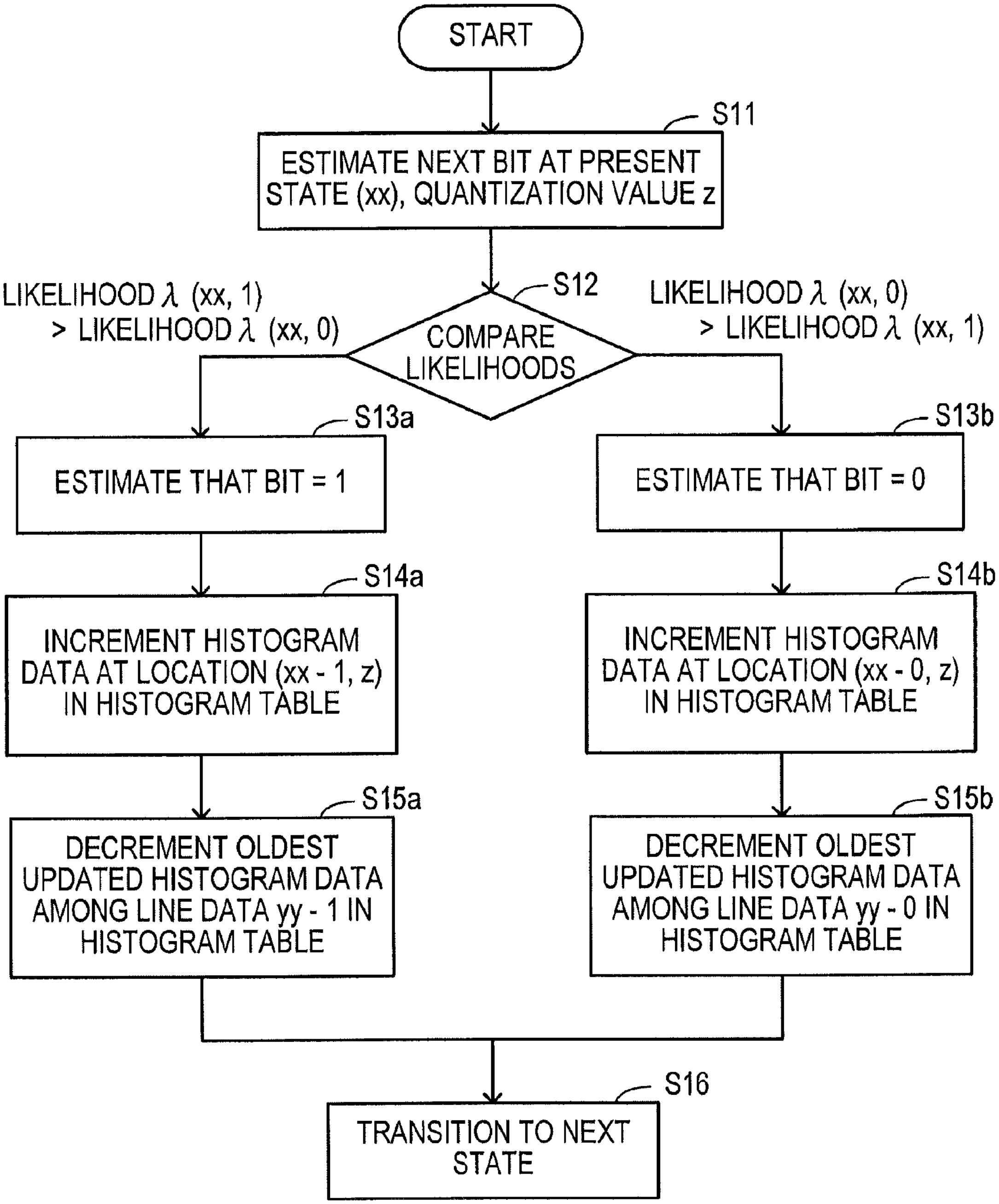
FIG. 8 is a flowchart illustrating an update procedure of histogram data.

Next, a management configuration and update processing of histogram data will be described with reference to FIGS. 7 to 9. FIG. 7 is a diagram illustrating a management configuration example of histogram data. A histogram table T1 is table information managed by the likelihood information managing unit 13*a*, whose horizontal direction corresponds to the histograms h1 to h4 and vertical direction corresponds to the quantization value z. The numerical values in the table illustrated in the diagram represent histogram data values prior to update.

00-0 in the diagram indicates a likelihood that a value of 0 is to be taken in the histogram h1 in state (00), while 00-1 indicates a likelihood that a value of 1 is to be taken in the histogram h1 in state (00). 01-0 in the diagram indicates a likelihood that a value of 0 is to be taken in the histogram h2 in state (01), while 01-1 indicates a likelihood that a value of 1 is to be taken in the histogram h2 in state (01).

In addition, 10-0 in the diagram indicates a likelihood that a value of 0 is to be taken in the histogram h3 in state (10), while 10-1 indicates a likelihood that a value of 1 is to be taken in the histogram h3 in state (10). 11-0 in the diagram indicates a likelihood that a value of 0 is to be taken in the histogram h4 in state (11), while 11-1 indicates a likelihood that a value of 1 is to be taken in the histogram h4 in state (11).

Moreover, b1b2-0 (where b1=0 or 1, b2=0 or 1) denotes that the bit sequence state estimated up to now is b1, b2 and that the bit value to be next estimated takes a value of 0. In addition, b1b2-1 indicates that the bit sequence state estimated up to now is b1, b2 and that the bit value to be next estimated takes a value of 1.

Here, it is shown that the 00-0 field of the table T1 assumes the values of 6, 50, 15, 12, 10, 4, 2, and 1 for the respective quantization values z=0 to 7, and values that are hundredth parts thereof are depicted as the bar graphs of the likelihood that a value of 0 is to be taken in the histogram h1 illustrated in FIG. 4. In addition, it is shown that the 00-1 field of the table T1 takes the values of 1, 3, 5, 7, 10, 32, 30, and 12 for the respective quantization values z=0 to 7, and values that are hundredth parts thereof are depicted as the bar graphs of the likelihood that a value of 1 is to be taken in the histogram h1 illustrated in FIG. 4. Numerical values in the other fields of the table T1 are displayed as histograms in a similar manner.

Next, updating of histogram data will be described. FIG. 8 is a flowchart illustrating an update procedure of histogram data.

[S11] A next bit estimation is performed when the present state is (xx) (where x=0 or 1) and the quantization value is z (where z is any value between 0 and 7).

[S12] Using the histogram of the state (xx), a likelihood comparison of the quantization value z is performed. If likelihood λ (xx, 1)>likelihood λ (xx, 0), the procedure proceeds to step S13*a*, while if likelihood λ (xx, 0)>likelihood λ (xx, 1), the procedure proceeds to step S13*b*.

[S13*a*] The next bit is estimated to be 1.

[S14*a*] Histogram data included in an area where the vertical direction of the histogram table T1 is xx−1 and the horizontal direction thereof is the quantization value z is incremented (increased by 1).

[S15*a*] Oldest updated histogram data among line data yy−1 (where y=0 or 1) of the histogram table T1 is decremented (decreased by 1).

[S13*b*] The next bit is estimated to be 0.

[S14*b*] Histogram data included in an area where the vertical direction of the histogram table T1 is xx−0 and the horizontal direction thereof is the quantization value z is incremented.

[S15*b*] Oldest updated histogram data among line data yy−0 (where y=0 or 1) of the histogram table T1 is decremented.

[S16] A transition is made from the present state (xx) to a next state.

Figure 9:
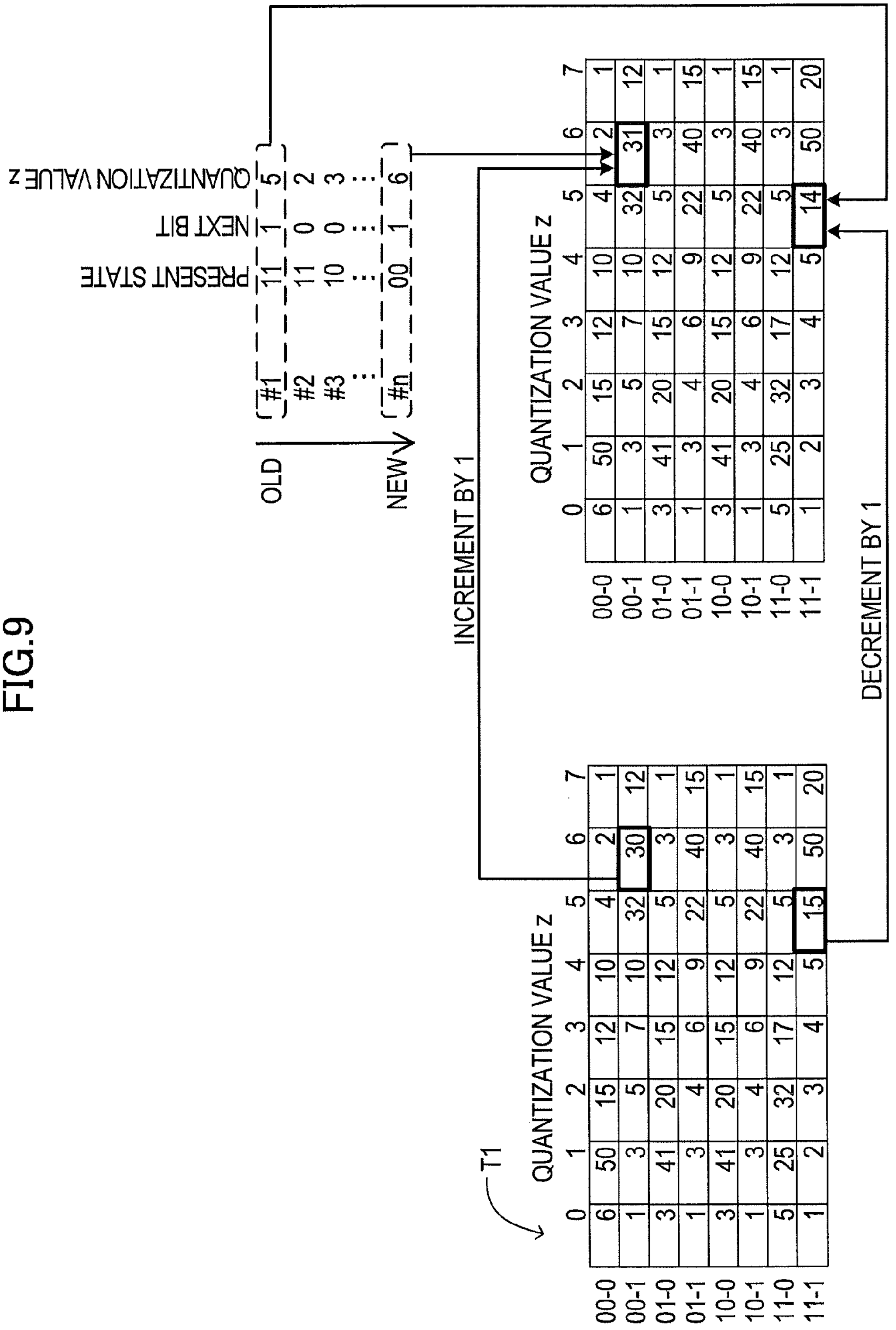
FIG. 9 is a diagram illustrating an update example of histogram data.

FIG. 9 is a diagram illustrating an update example of histogram data. Assuming that a bit estimation is to be performed for a present state (00) and a quantization value z=6, since the likelihood comparison result of the quantization value z=6 shown in the histogram h1 illustrated in FIG. 4 is likelihood λ (00, 1)>likelihood λ (00, 0), it is estimated that the next bit=1.

Updating the histogram table T1 at this point involves incrementing histogram data 30 in an area where the vertical direction of the histogram table T1 is 00-1 and the horizontal direction thereof is the quantization value z=6 to 31.

Subsequently, the oldest updated histogram data among line data yy−1 (where y=0 or 1) of the histogram table T1 is decremented. In this case, assuming that a value of 15 corresponding to a quantization value z=5 in line data 11-1 is the oldest updated value, 15 is decremented to 14.

As shown, update processing of histogram data is executed upon bit estimation by first incrementing histogram data and then decrementing the oldest updated histogram data so that the data amount of the entire histogram data becomes constant.

Figure 10:
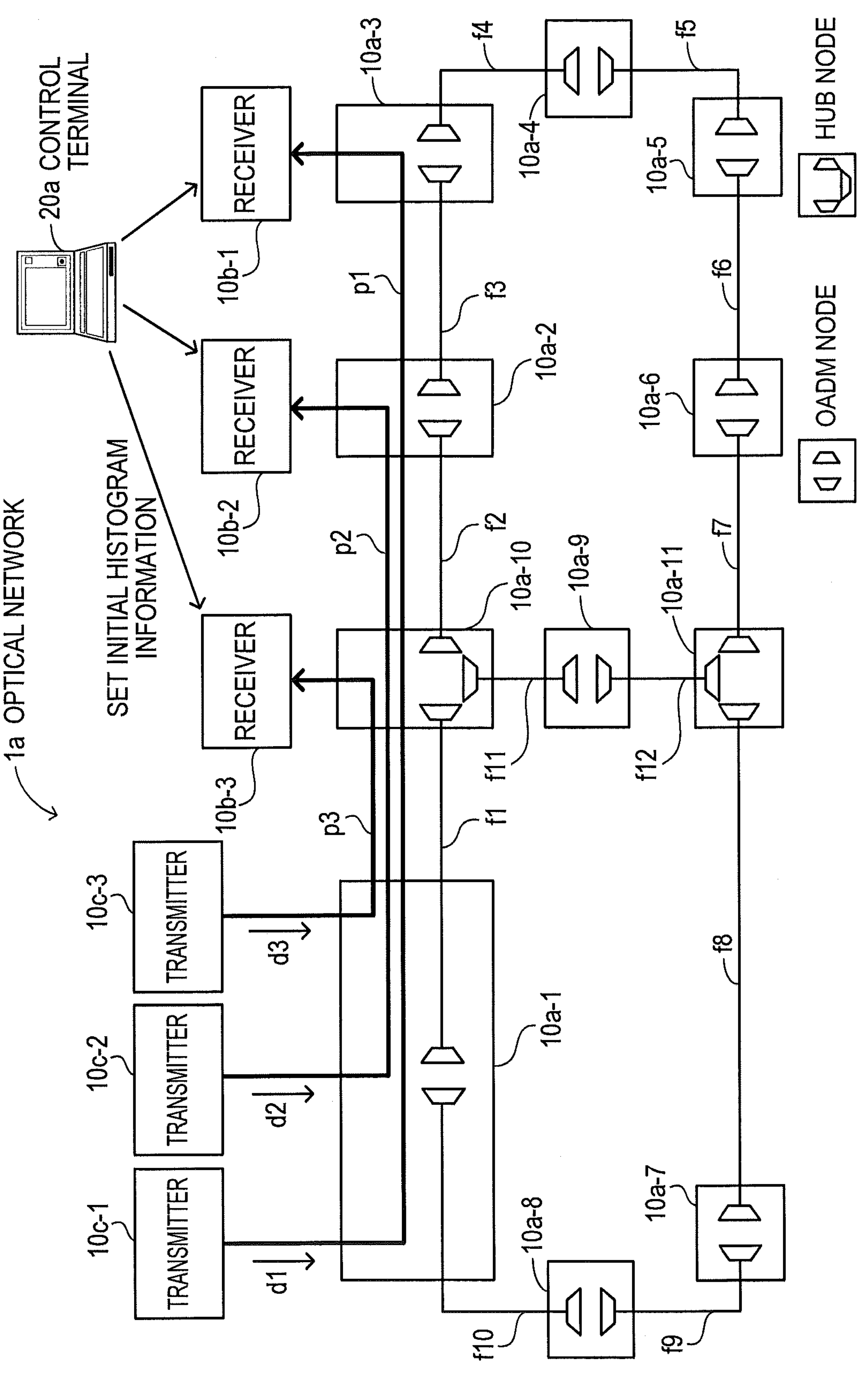
FIG. 10 is a diagram illustrating a configuration of an optical network.

Next, a description will be given on a configuration example of a network to which the communication system 1 is to be applied. FIG. 10 is a diagram illustrating a configuration of an optical network. An optical network 1*a* includes the respective components of: OADM (Optical Add and Drop Multiplexing) nodes 10*a*-1 to 10*a*-9; hub nodes 10*a*-10 and 10*a*-11; transmitters 10*c*-1 to 10*c*-3; receivers 10*b*-1 to 10*b*-3; and a control terminal 20*a*, and is an optical communication network that performs WDM (Wavelength Division Multiplexing) communication.

A WDM signal in which a plurality of mutually different wavelengths is multiplexed flows through optical fibers f1 to f12 which connect the respective nodes. The OADM nodes 10*a*-1 to 10*a*-9 are provided with an OADM function involving adding (inserting) an optical signal transmitted from a tributary to an WDM signal and dropping (branching) an optical signal separated from an WDM signal to a tributary. The hub nodes 10*a*-10 and 10*a*-11 have an OADM function and provides connection among the OADM nodes.

Note that tributary-side devices such as the transmitters and the receivers together with optical transmission nodes such as the OADM nodes and the hub nodes collectively correspond to the transmission device illustrated in FIG. 1. For example, the receiver 10*b*-1 and the OADM node 10*a*-3 correspond to the transmission device 10-1, the receiver 10*b*-2 and the OADM node 10*a*-2 correspond to the transmission device 10-2, and the receiver 10*b*-3 and the hub node 10*a*-10 correspond to the transmission device 10-3. In addition, the control terminal 20*a* corresponds to a network design tool or the like and includes the functions of the control device 20 illustrated in FIG. 1.

As for the relationship of connections among the respective components, the transmitters 10*c*-1 to 10*c*-3 are connected to the tributary side of the OADM node 10*a*-1. In addition, the OADM node 10*a*-1 is connected to the hub node 10*a*-10 via the optical fiber f1 and to the OADM node 10*a*-8 via the optical fiber f10.

The receiver 10*b*-3 is connected to the tributary side of the hub node 10*a*-10. In addition, the hub node 10*a*-10 is connected to the OADM node 10*a*-2 via the optical fiber f2 and to the OADM node 10*a*-9 via the optical fiber f11.

The receiver 10*b*-2 is connected to the tributary side of the OADM node 10*a*-2. In addition, the OADM node 10*a*-2 is connected to the OADM node 10*a*-3 via the optical fiber f3. The receiver 10*b*-1 is connected to the tributary side of the OADM node 10*a*-3. In addition, the OADM node 10*a*-3 is connected to the OADM node 10*a*-4 via the optical fiber f4.

The OADM node 10*a*-4 is connected to the OADM node 10*a*-5 via the optical fiber f5, the OADM node 10*a*-5 is connected to the OADM node 10*a*-6 via the optical fiber f6, and the OADM node 10*a*-6 is connected to the hub node 10*a*-11 via the optical fiber f7.

The hub node 10*a*-11 is connected to the OADM node 10*a*-9 via the optical fiber f12 and to the OADM node 10*a*-7 via the optical fiber f8. The OADM node 10*a*-7 is connected to the OADM node 10*a*-8 via the optical fiber f9.

The control terminal 20*a* need only be connected to any one node among the OADM nodes 10*a*-1 to 10*a*-9 and the hub nodes 10*a*-10 and 10*a*-11. In addition, the control terminal 20*a* may be connected to any of the transmitters 10*c*-1 to 10*c*-3, or if the receivers 10*b*-1 to 10*b*-3 are equipped with a function for transmitting to other nodes, the control terminal 20*a* may be connected to any of the receivers 10*b*-1 to 10*b*-3.

In such a network topology, an optical signal d1 transmitted from the transmitter 10*c*-1 arrives at the receiver 10*b*-1 via a path p1 (a communication pathway through which an optical signal flows in the sequence of the OADM node 10*a*-1→ the optical fiber f1→ the hub node 10*a*-10→ the optical fiber f2→ the OADM node 10*a*-2→ the optical fiber f3→ the OADM node 10*a*-3).

An optical signal d2 transmitted from the transmitter 10$c$-2 arrives at the receiver 10$b$-2 via a path p2 (a communication pathway through which an optical signal flows in the sequence of the OADM node 10$a$-1→ the optical fiber f1→ the hub node 10$a$-10→ the optical fiber f2→ the OADM node 10$a$-2).

An optical signal d3 transmitted from the transmitter 10$c$-3 arrives at the receiver 10$b$-3 via a path p3 (a communication pathway through which an optical signal flows in the sequence of the OADM node 10$a$-1→ the optical fiber f1→ the hub node 10$a$-10).

The control terminal 20$a$ collects network information regarding the path p1 and obtains initial histogram information corresponding to the path p1 from the network information in advance, and sets the initial histogram information upon initial operation of the receiver 10$b$-1.

Network information regarding the path p1 includes: state values of optical fiber transmission channels such as fiber types, distances, and losses of the optical fibers f1, f2, and f3; and node state values such as OSNR (Optical Signal to Noise Ratio) values of optical amplifiers in the OADM nodes 10$a$-1, 10$a$-2, and 10$a$-3, and the hub node 10$a$-10.

In addition, the control terminal 20$a$ collects network information regarding the path p2 and obtains initial histogram information corresponding to the path p2 from the network information in advance, and sets the initial histogram information upon initial operation of the receiver 10$b$-2.

Network information regarding the path p2 includes: state values of optical fiber transmission channels of the optical fibers f1 and f2 such as those described above; and node state values of the OADM nodes 10$a$-1 and 10$a$-2 and the hub node 10$a$-10 such as those described above.

Furthermore, the control terminal 20$a$ collects network information regarding the path p3 and obtains initial histogram information corresponding to the path p3 from the network information in advance, and sets the initial histogram information upon initial operation of the receiver 10$b$-3.

Network information regarding the path p3 includes: state values of an optical fiber transmission channel of the optical fiber f1 such as those described above; and node state values of the OADM node 10$a$-1 and the hub node 10$a$-10 such as those described above.

Figure 11:
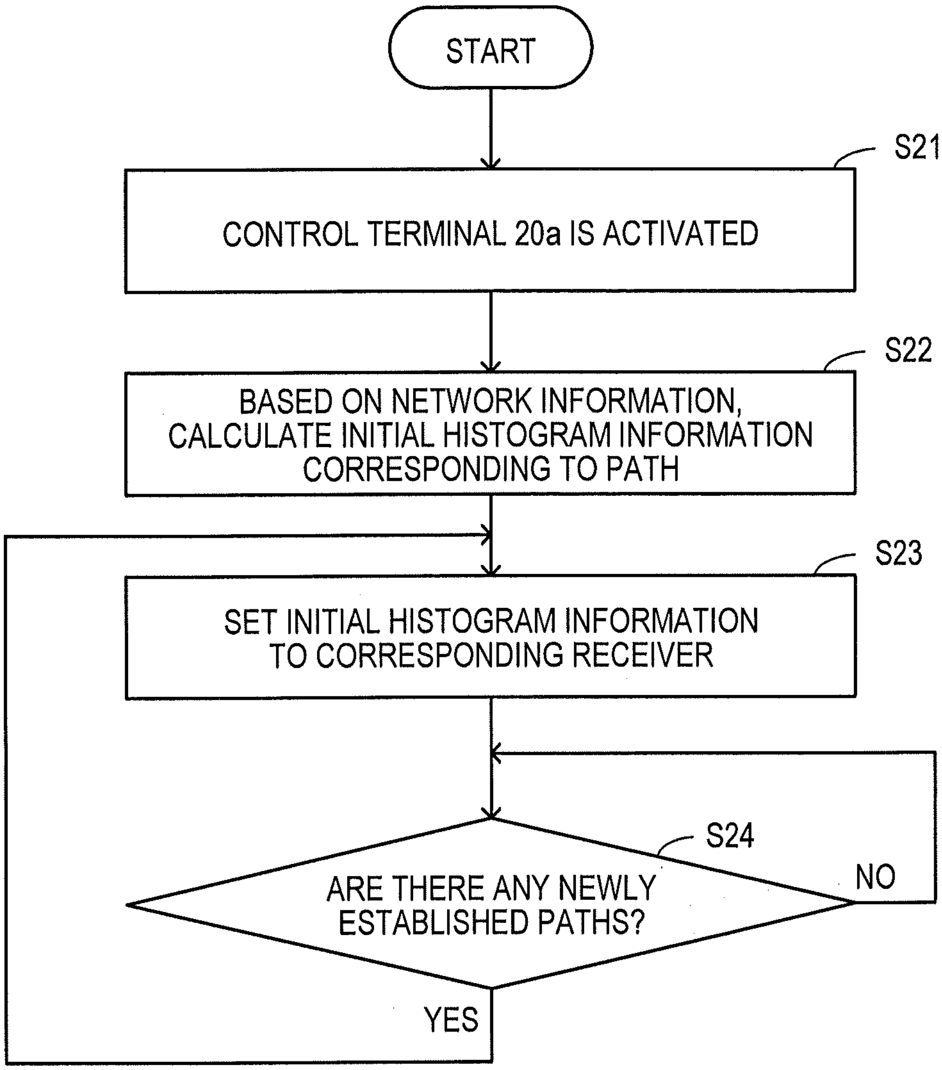
FIG. 11 is a flowchart illustrating basic operations of a control terminal.

Any combinations of one or more of the example network information can be used, as well as any other network information that can affect data communication on a data communication path. Next, a summary of operations of the control terminal 20$a$ and the receivers will be described with reference to the flowcharts. FIG. 11 is a flowchart illustrating basic operations of the control terminal 20$a$.

[S21] The control terminal 20$a$ is activated.

[S22] Based on network information, the control terminal 20$a$ calculates initial histogram information corresponding to paths.

[S23] Upon recognizing the activation of a receiver, the control terminal 20$a$ sets the initial histogram information calculated for each path to a corresponding receiver that receives an optical signal through the path.

[S24] The control terminal 20$a$ judges whether there are newly established paths or not. If there is a newly established path, the control terminal 20$a$ returns to step S23 (so as to calculate initial histogram information of each path assumed in advance in the control terminal 20$a$), and if there are no newly established paths, the control terminal 20$a$ repeats step S24.

Figure 12:
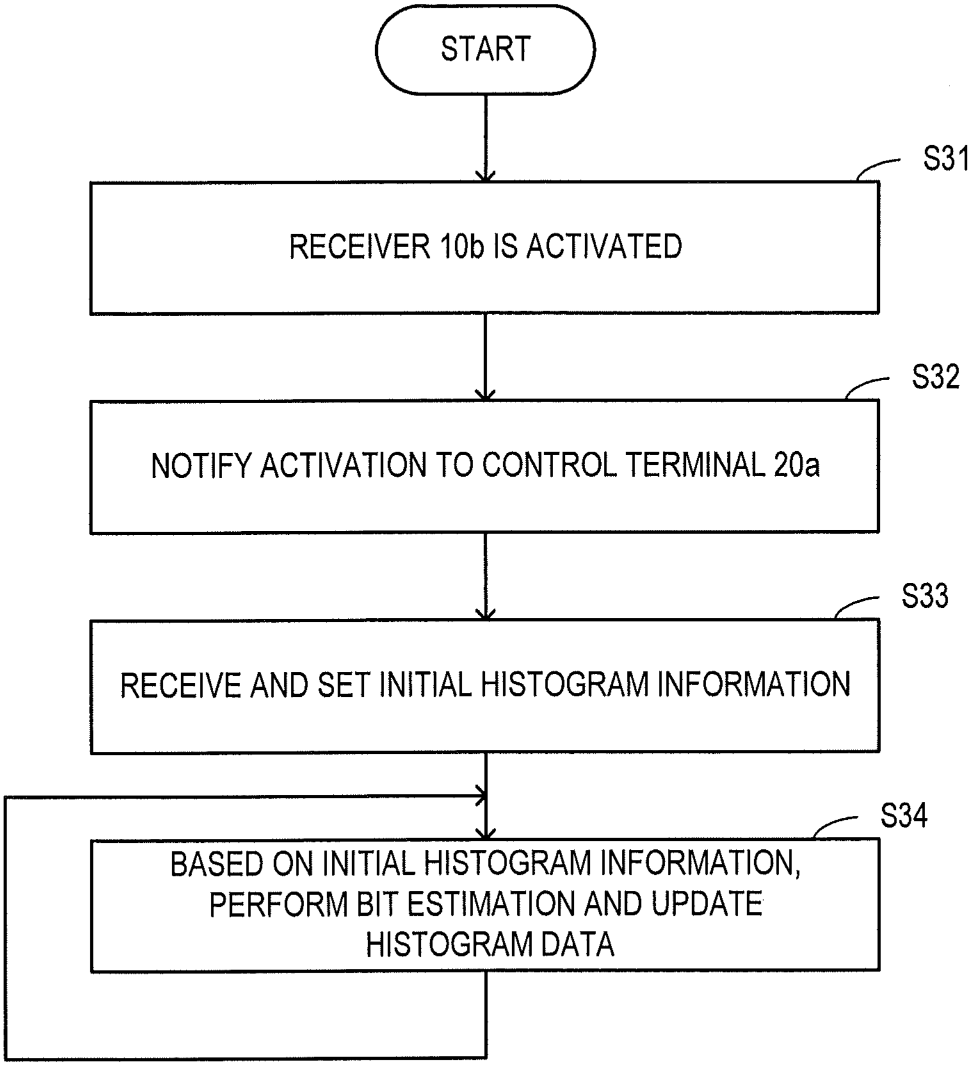
FIG. 12 is a flowchart illustrating basic operations of a receiver.

FIG. 12 is a flowchart illustrating basic operations of a receiver.

[S31] The receiver 10$b$ is activated.

[S32] The receiver 10$b$ notifies its activation to the control terminal 20$a$.

[S33] The receiver 10$b$ receives initial histogram information from the control terminal 20$a$ and sets the initial histogram information to an internal database (the likelihood information managing unit 13$a$).

[S34] Based on the initial histogram information, the receiver 10$b$ performs bit estimation processing and updates histogram data based on the estimate.

Next, a distribution operation of initial histogram information to a receiver will be described. Initial histogram information is superimposed on an OSC (Optical Supervisor Channel) signal and transmitted to another node so as to arrive at a receiver connected to the other node.

In addition to primary optical signals, WDM communication uses an optical signal referred to as an OSC signal for monitoring and control and which ranges from around 1 MHz to 150 MHz. The OSC signal is used to notify in-device operational states and error information to other stations. The OSC signal can also be used to distribute and set initial histogram information to the respective receivers.

Figure 13:
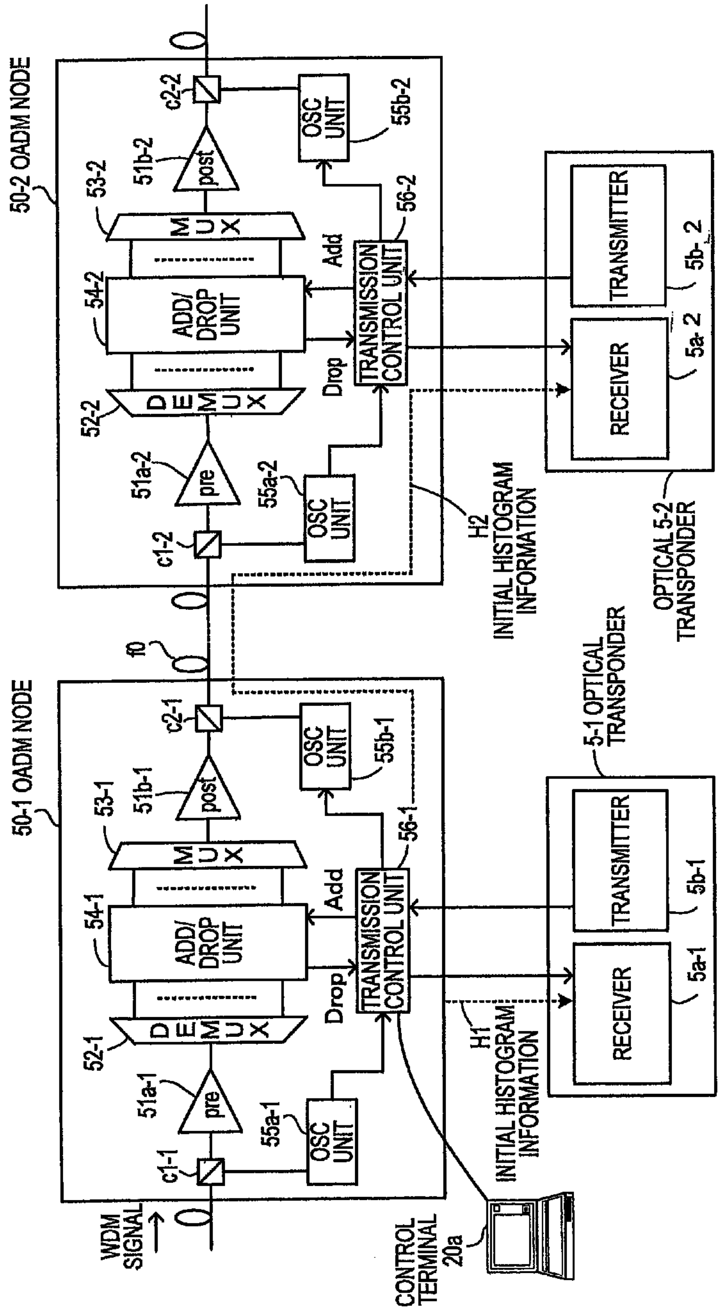
FIG. 13 is a diagram illustrating a distribution operation of initial histogram information.

FIG. 13 is a diagram illustrating a distribution operation of initial histogram information. The manner in which initial histogram information generated at the control terminal 20$a$ is distributed by an OSC signal to receivers 5$a$-1 and 5$a$-2 will now be described with reference to FIG. 13.

An OADM node 50-1 and an OADM node 50-2 are connected via an optical fiber f0 (a relay station may exist on the optical fiber f0). Optical transponders 5-1 and 5-2 with optical transmitting and receiving functions are respectively connected to the tributary-sides of the OADM nodes 50-1 and 50-2. In addition, the control terminal 20$a$ is connected to the OADM node 50-1.

The OADM node 50-1 is made up of a preamplifier 51$a$-1, a post amplifier 51$b$-1, a wavelength separating unit 52-1, a wavelength multiplexing unit 53-1, an Add/Drop unit 54-1, OSC units 55$a$-1 and 55$b$-1, a transmission control unit 56-1, and OSC couplers c1-1 and c2-1. In addition, the optical transponder 5-1 includes a receiver 5$a$-1 and a transmitter 5$b$-1.

The OADM node 50-2 is made up of a preamplifier 51$a$-2, a post amplifier 51$b$-2, a wavelength separating unit 52-2, a wavelength multiplexing unit 53-2, an Add/Drop unit 54-2, OSC units 55$a$-2 and 55$b$-2, a transmission control unit 56-2, and OSC couplers c1-2 and c2-2. In addition, the optical transponder 5-2 includes a receiver 5$a$-2 and a transmitter 5$b$-2.

First, a normal optical transmission operation will be described. For convenience, a wavelength-multiplexed optical primary signal shall be referred to as a WDM primary signal and a signal obtained by multiplexing a WDM primary signal and an OSC signal shall be referred to as a WDM signal. In addition, while only a downward device configuration from left to right is illustrated in FIG. 13, in actuality, an upward device configuration from right to left is also provided. However, since both configurations are the same, a description on the upward configuration will be omitted.

The OSC coupler c1-1 branches a received WDM signal into a WDM primary signal and an OSC signal. The WDM primary signal is sent towards the preamplifier 51$a$-1 while the OSC signal is sent towards the OSC unit 55$a$-1. The preamplifier 51$a$-1 amplifies the WDM primary signal. The wavelength separating unit 52-1 separates the WDM primary signal into wavelength units.

The transmitter 5$b$-1 in the optical transponder 5-1 transmits an optical signal to be added to the transmission control unit 56-1. In addition, the receiver 5$a$-1 receives a dropped optical signal and performs reception processing for maximum likelihood sequence estimation.

When performing add processing, the add/drop unit 54-1 in the OADM node 50-1 receives the optical signal transmitted from the transmitter 5*b*-1 via the transmission control unit 56-1, and switches the optical signal with a predetermined wavelength signal separated at the wavelength separating unit 52-1 (a wavelength signal outputted from the optical transponder 5-1 is selected). When performing drop processing, the add/drop unit 54-1 transmits a predetermined wavelength signal separated at the wavelength separating unit 52-1 to the transmission control unit 56-1. The dropped wavelength signal is transmitted to the receiver 5*a*-1 via the transmission control unit 56-1.

The wavelength multiplexing unit 53-1 multiplexes a plurality of mutually different wavelength signals outputted from the add/drop unit 54-1 and generates a new WDM primary signal. The post amplifier 51*b*-1 amplifies the WDM primary signal.

On the other hand, the OSC unit 55*a*-1 performs O/E conversion on the received OSC signal to generate an electrical signal, and transmits the electrical signal to the transmission control unit 56-1. The transmission control unit 56-1 recognizes operational states and failure states of other nodes from the received electrical signal.

In addition, the transmission control unit 56-1 generates an electrical signal to become a basis of a new OSC signal including the operational state and the failure state of its own node, and transmits the electrical signal to the OSC unit 55*b*-1. The OSC unit 55*b*-1 receives and performs E/O conversion on the electrical signal to generate a new OSC signal, and transmits the new OSC signal to the OSC coupler c2-1.

The OSC coupler c2-1 couples the WDM primary signal outputted from the post amplifier 51*b*-1 and the OSC signal outputted from the OSC unit 55*b*-1 to generate a WDM signal, and transmits the WDM signal to a next-stage OADM node 50-2 via the optical fiber f0. Since operations of the OADM node 50-2 is similar to operations of the OADM node 50-1, a description thereof will be omitted.

Next, a flow of communication of initial histogram information will be described. The control terminal 20*a* generates initial histogram information H1 to be set to the receiver 5*a*-1, and further generates initial histogram information H2 to be set to the receiver 5*a*-2. Since the control terminal 20*a* is in communication with the transmission control unit 56-1 to which the receiver 5*a*-1 is connected, the initial histogram information H1 reaches the receiver 5*a*-1 via the transmission control unit 56-1 without having to use an OSC signal.

On the other hand, upon receiving the initial histogram information H2 for the receiver 5*a*-2, the transmission control unit 56-1 inserts the initial histogram information H2 into an empty field of a format of an electrical signal for notifying an operational state and a failure state and which becomes a basis of an OSC signal, and transmits the electrical signal to the OSC unit 55*b*-1. The OSC unit 55*b*-1 performs E/O conversion on the electrical signal into which the initial histogram information H2 is inserted, and generates an OSC signal.

The OSC coupler c2-1 couples the WDM primary signal outputted from the post amplifier 51*b*-1 and the OSC signal outputted from the OSC unit 55*b*-1 to generate a WDM signal, and transmits the WDM signal to a next-stage OADM node 50-2 via the optical fiber f0.

At the OADM node 50-2, the OSC coupler c1-2 branches a received WDM signal into a WDM primary signal and an OSC signal. The WDM primary signal is sent towards the preamplifier 51*a*-2 while the OSC signal is sent towards the OSC unit 55*a*-2.

The OSC unit 55*a*-2 performs O/E conversion on the received OSC signal to generate an electrical signal, and transmits the electrical signal to the transmission control unit 56-2. The transmission control unit 56-2 recognizes that initial histogram information H2 corresponding to the receiver 5*a*-2 is inserted in the received electrical signal.

The transmission control unit 56-2 performs E/O conversion on the initial histogram information H2, and subsequently transmits the initial histogram information H2 to the receiver 5*a*-2. The receiver 5*a*-2 performs O/E conversion on the initial histogram information H2 and saves the initial histogram information H2 onto a database.

As shown, initial histogram information is inserted into an OSC signal and transmitted to a desired receiver. In addition, since initial histogram information is transmitted using an OSC signal, the control terminal 20*a* may be connected to any node as long as the node is capable of transmitting and receiving OSC signals.

Figure 14:
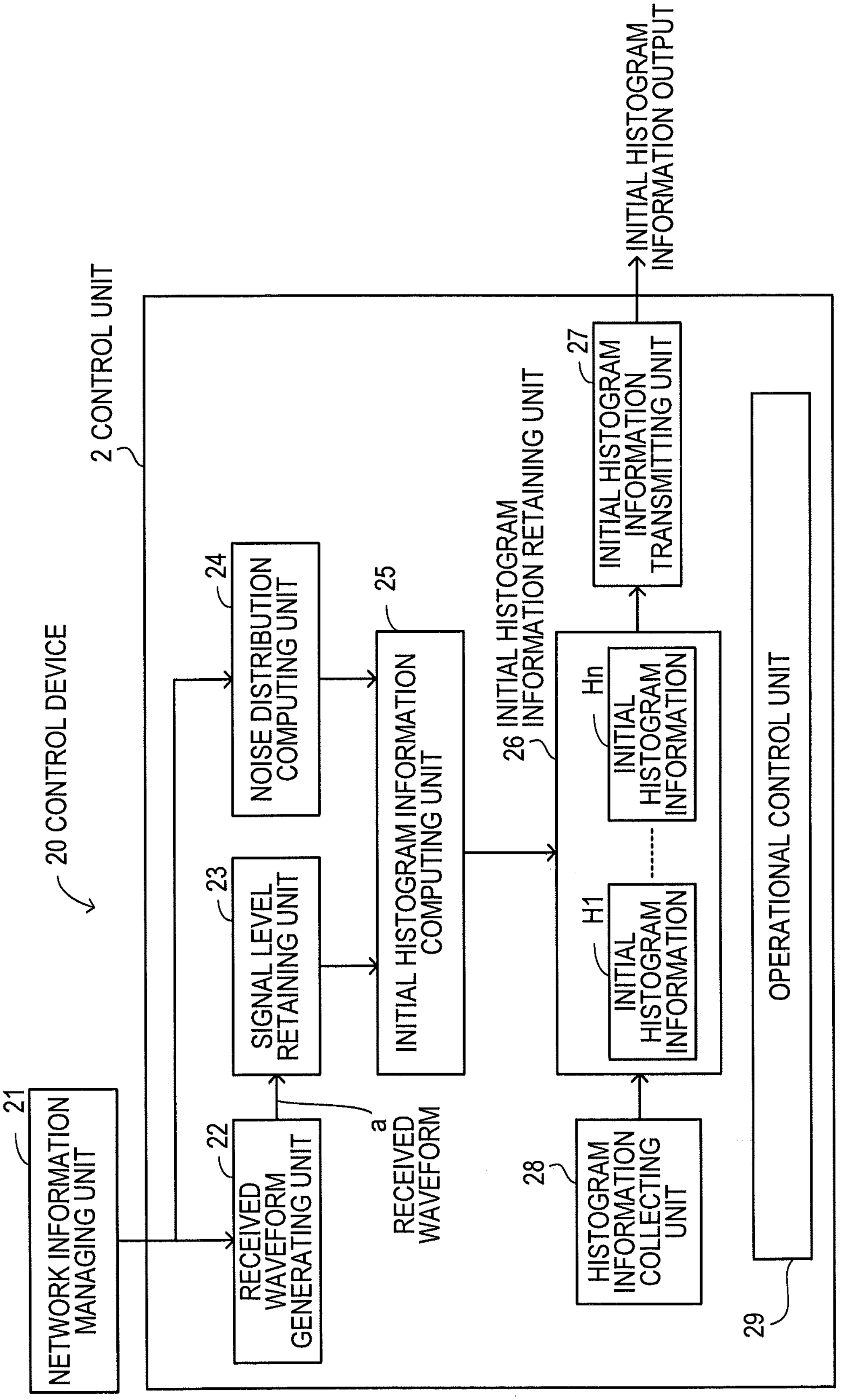
FIG. 14 is a diagram illustrating a configuration of a control device.

Next, a configuration of the control device 20 will be described. FIG. 14 is a diagram illustrating a configuration of the control device 20. The control device 20 is made up of a network information managing unit 21 and a control unit 2. The control unit 2 includes a received waveform generating unit 22, a signal level retaining unit 23, a noise distribution computing unit 24, an initial histogram information computing unit 25, an initial histogram information retaining unit 26, an initial histogram information transmitting unit 27, a histogram information collecting unit 28, and an operational control unit 29.

The network information managing unit 21 manages as network information, on a per-path basis, one or more of an optical fiber type, a distance, an optical loss value, as well as attribute values (state information) such as OSNR or the like occurring at an optical amplifier in an OADM node or a hub node of an optical fiber transmission channel. Such network information is registered per path in advance in the network information managing unit 21 by the user and/or automatically determined according to application criteria.

Based on network information, the received waveform generating unit 22 calculates, per path, a waveform distortion that occurs due to a nonlinear effect such as wavelength dispersion and polarization mode dispersion (PMD), and performs a waveform simulation to obtain a received waveform "a".

In other words, a waveform simulation is performed using per-path network information to determine what degree of waveform distortion is caused by an optical signal having flowed through the path. Methods for calculating the propagation of an optical signal through an optical fiber includes known techniques such as the split-step Fourier transform method. The waveform simulation can be performed using such a computation method.

The signal level retaining unit 23 retains a signal level from the received waveform "a" obtained through the wavelength simulation performed by the received waveform generating unit 22. For example, when a state bit N takes a value of 2, since generated histogram data can be classified into 8 patterns (00-0, 00-1, 01-0, 01-1, 10-0, 10-1, 11-0, and 11-1), signal levels for sample points on the received waveform "a" corresponding to the respective patterns are retained (to be described later with reference to FIG. 15).

Based on the network information, the noise distribution computing unit 24 performs computation for determining a standard deviation to be used as an index indicating the degree of distributive spread (dispersion) of noise distribution. Specifically, the noise distribution computing unit 24 calculates a Q value of an object (target) path from OSNR information or the like in the network information, and from the Q value, calculates a standard deviation based on the assumption that the noise distribution is a normal distribution.

A Q value is an index used to evaluate optical transmission quality. A Q value refers to a value that quantitatively indicates an influence over noise in the amplitude direction, and indicates that the greater the value, the higher the transmission quality (details of standard deviation calculation will be described later).

The initial histogram information computing unit 25 calculates likelihoods of respective quantization values being taken based on the noise distribution having a standard deviation calculated by the noise distribution computing unit 24, and generates data values appropriately normalizing results of the calculation as initial histogram information.

There are two processing scenarios for generating initial histogram information, which can be arbitrarily chosen. In the first scenario, initial histogram information is generated by reflecting the two types of information of: a waveform distortion that occurs on an optical fiber transmission channel due to a nonlinear optical phenomenon such as wavelength dispersion or PMD; and noise deterioration (OSNR value) that occurs on an optical fiber transmission channel or in a via node (OSNR node, hub node, or the like) (hereinafter referred to as first computation).

In the second scenario, initial histogram information is generated without taking waveform distortion into consideration by reflecting only noise deterioration (OSNR value) that occurs on an optical fiber transmission channel or in a via node (OSNR node, hub node, or the like) (hereinafter referred to as second computation).

In addition, in the former scenario in which the first computation is to be performed, initial histogram information is to be generated with respect to the received waveform "a" obtained through waveform simulation based on a noise distribution superimposed for each signal level of the received waveform "a".

In the latter scenario in which the second computation is to be performed, waveform simulation is not required, and initial histogram information is to be generated based on a noise distribution at bit 1 and a noise distribution at bit 0 (details of initial histogram information generation processing will be described later).

In this case, since the first computation calculates initial histogram information based on the received waveform "a" obtained by performing a waveform simulation of an object path, initial histogram information reflecting information on the actual transmission state over the network can be generated. Therefore, the first computation is selected for paths on which significant waveform degradation and noise deterioration are envisaged.

However, for paths on which waveform degradation and noise deterioration do not occur as prominently (for example, a path whose transmission segment is short), initial histogram information may be generated by selecting the more simpler second computation in which waveform simulation is not performed (obviously, the first computation may also be selected).

In addition, while the selection of either the first computation or the second computation can be made by a manual instruction issued by a user, selection control can also be executed automatically based on the network information of the object path.

Specifically, the initial histogram information computing unit 25 extracts information on the transmission distance of the object path from network information, and when the extracted transmission distance exceeds a preset threshold, the initial histogram information computing unit 25 assumes the object path is susceptible to waveform degradation and the like and automatically selects the first computation. In addition, when the transmission distance does not exceed the threshold, the initial histogram information computing unit 25 automatically selects the second computation. Performing such control enables improvement of maintenance efficiency.

On the other hand, the initial histogram information retaining unit 26 retains initial histogram information H1 to Hn generated per object path. The initial histogram information transmitting unit 27 transmits the initial histogram information H1 to Hn to nodes (OADM nodes or hub nodes) to which the control device 20 is connected.

Added to initial histogram information is an identifier indicating which path the initial histogram information corresponds to. Therefore, when initial histogram information is transmitted to nodes to which the control device 20 is connected, the initial histogram information is inserted into OSC signals, whereby the initial histogram information-inserted OSC signals are communicated to the respective nodes. At each node, initial histogram information is dropped to a receiver corresponding to the identifier and which is connected to the node. Subsequently, the initial histogram information is to be set to the receiver.

On the other hand, the histogram information collecting unit 28 collects histogram information updated at the receivers at constant intervals (to be described later with reference to FIGS. 41 and 42). The operational control unit 29 performs overall control of the respective components in the device. The operational control unit 29 also includes functions for recognizing the establishment of a new path within the network and for connecting to a terminal to provide a user interface.

Next, initial histogram information generation processing will be described in detail. First, operations up to retaining a signal level with respect to a signal waveform obtained through waveform simulation will be described.

Figure 15:
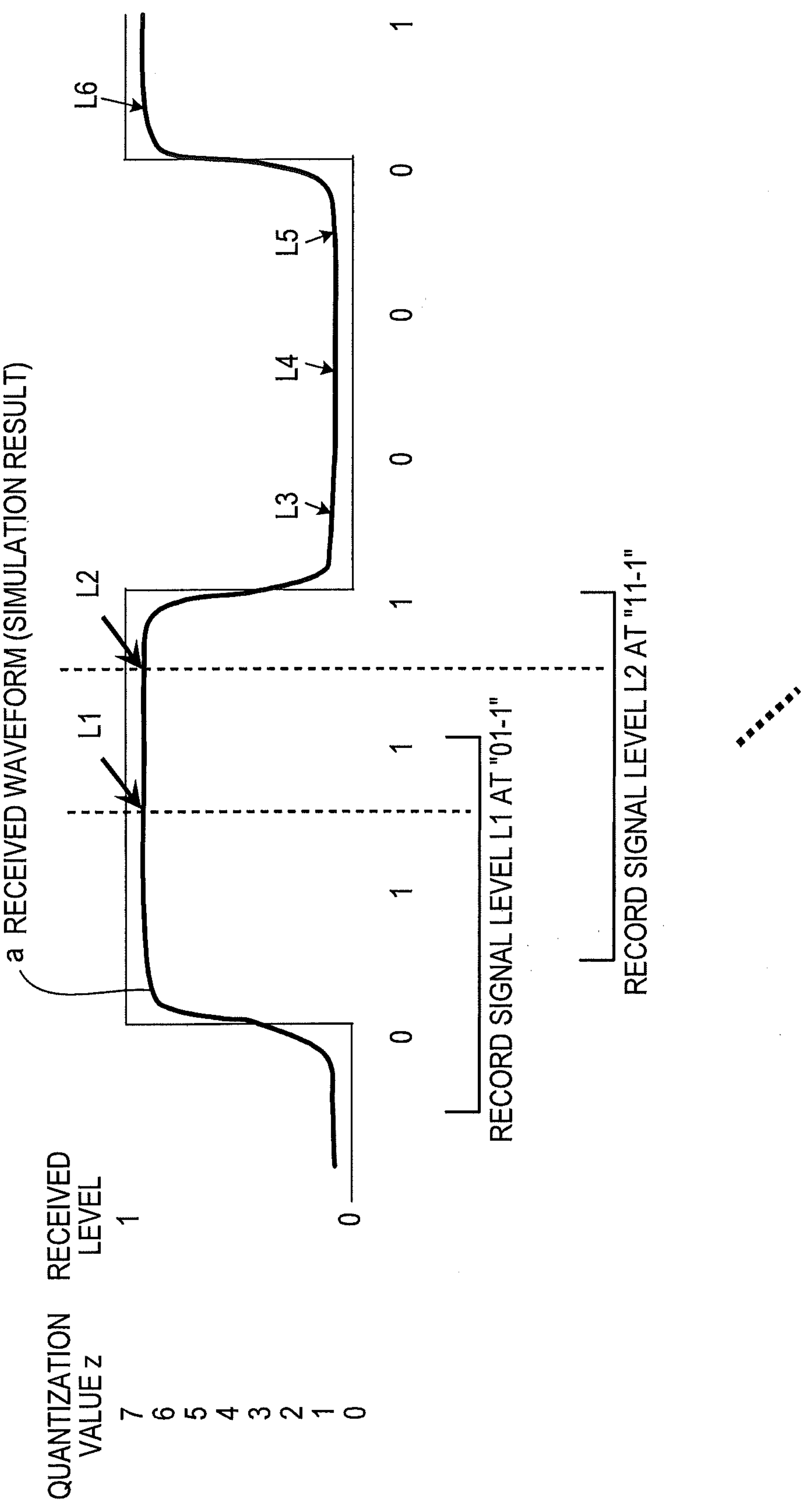
FIG. 15 is a diagram illustrating a received waveform.

FIG. 15 is a diagram illustrating a received waveform "a". The received waveform "a" is generated through a waveform simulation performed by the received waveform generating unit 22. In addition, with respect to the received waveform "a" obtained through the waveform simulation, the signal level retaining unit 23 retains signal levels classified into combination patterns of values of a present state bit and a next bit.

Since it is assumed that the state bit N=2, there are 8 combination patterns (00-0, 00-1, 01-0, 01-1, 10-0, 10-1, 11-0, and 11-1). Therefore, a signal level is to be retained for each of the 8 patterns.

For example, in FIG. 15, let L1 denote a signal level of the received waveform "a" at 01-1 where the value of the next bit is to be 1 in a present state 01 (assume that L1 level value=0.91) and L2 denote a signal level of the received waveform "a" at 11-1 where the value of the next bit is to be 1 in a present state 11 (assume that L2 level value=0.89).

In addition, let L3 denote a signal level of the received waveform "a" at 11-0 where the value of the next bit is to be 0 in the present state 11 (assume that L3 level value=0.20) and L4 denote a signal level of the received waveform "a" at 10-0 where the value of the next bit is to be 0 in a present state 10 (assume that L4 level value=0.15).

Furthermore, let L5 denote a signal level of the received waveform "a" at 00-0 where the value of the next bit is to be 0 in a present state 00 (assume that L5 level value=0.18) and L6 denote a signal level of the received waveform "a" at 00-1 where the value of the next bit is to be 1 in the present state 00 (assume that L6 level value=0.90).

The signal level retaining unit 23 retains values of the signal levels L1 to L6 (although, in reality, signal levels of the received waveform "a" at the remaining patterns of 01-0 and 10-1 are also obtained, descriptions thereof will be omitted and the following description will only concern the signal levels L1 to L6). FIG. 16 collectively illustrates signal levels L1 to L6 obtained from the received waveform "a".

Next, operations of the noise distribution computing unit 24 will be described. First, a received OSNR that is an OSNR value of an object path and a transmission penalty of the object path are extracted from network information, and a received Q value that is a Q value of the object path is calculated.

The received OSNR is an OSNR value that also includes noise generated at optical amplifiers in nodes disposed on the object path as well as noise occurring on the optical fiber transmission channel. In addition, a transmission penalty is a value indicating the degree of deterioration of a received signal caused by wavelength dispersion, PMD, or the like on the object path.

The received Q value is calculated using the following equation (1). In the equation, C denotes a conversion coefficient for converting an OSNR parameter value into a Q parameter value (C=OSNR/Q conversion coefficient).

$$\text{Received } Q \text{ value} = \text{received } OSNR + C - \text{transmission penalty} \quad (1)$$

Generally, a Q value may be defined by the following equation (2) by letting $\mu_1$ denote a mark that is an average level value of a noise distribution on a level "1" side of a signal waveform, $\mu_0$ denote a space that is an average level value of a noise distribution on a level "0" side of the signal waveform, $\sigma 1$ denote a standard deviation representing a distributive spread of the noise distribution on the level "1" side, and $\sigma 0$ denote a standard deviation representing a distributive spread of the noise distribution on the level "0" side.

$$Q \text{ value} = |\mu_1 - \mu_0| / (\sigma 0 + \sigma 1) \quad (2)$$

Figure 17:
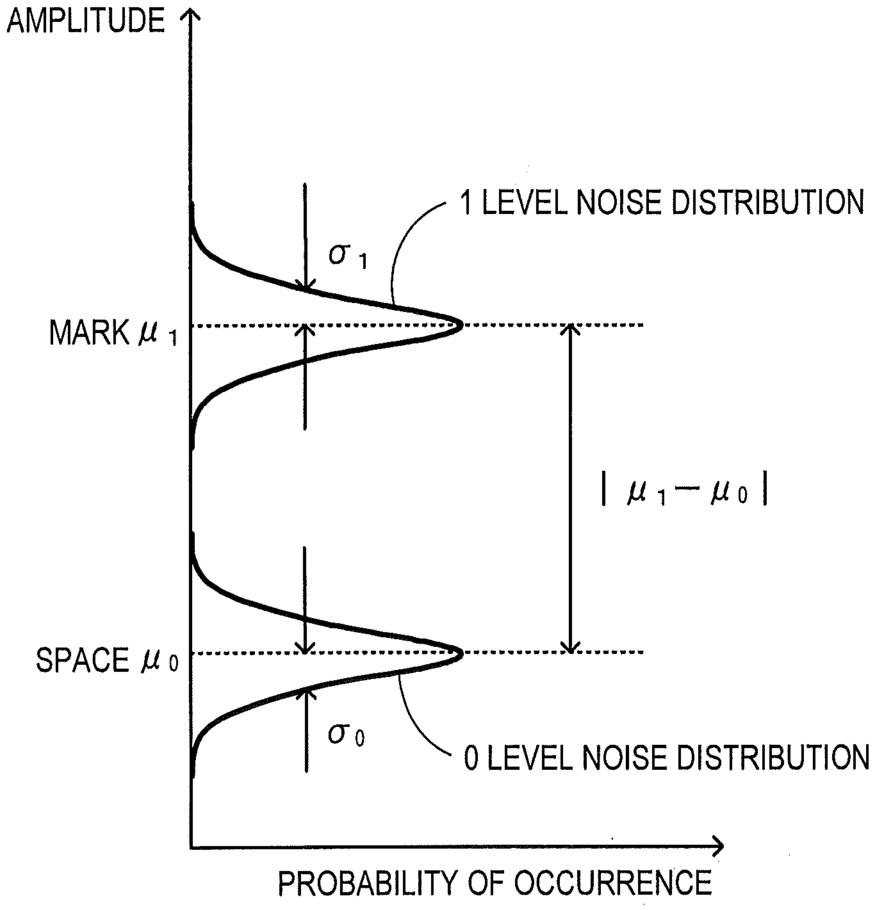
FIG. 17 is a diagram illustrating a noise distribution of a level "0" side and a noise distribution of a level "1" side of a signal waveform.

FIG. 17 is a diagram illustrating a noise distribution of the level "0" side and a noise distribution of the level "1" side of a signal waveform. The ordinate represents amplitude and the abscissa represents probability of occurrence. FIG. 17 is a diagrammatic representation of the contents of equation (2) when assuming that the noise distribution takes the form of a normal distribution. As waveform degradation increases, distributive spread increases while the Q value decreases. In addition, as waveform degradation decreases, distributive spread decreases while the Q value increases.

On the other hand, the mark $\mu_1$ and the space $\mu_0$ may be expressed by the following equations (3a) and (3b). In the equations, $\mu_{ave}$ denotes an average value of $\mu_0$ and $\mu_1$, while Coeff denotes an adjustment factor. $\mu_{ave}$ and Coeff, for example, can be set in advance as fixed values and registered as network information.

$$\mu_1 = \mu_{ave} + (Q \text{ value} \times \text{Coeff}) \quad (3a)$$

$$\mu_0 = \mu_{ave} - (Q \text{ value} \times \text{Coeff}) \quad (3b)$$

In addition, assuming that $\sigma 0 = \sigma 1$, the following equation (4) can be derived from equation (2).

$$\sigma 0 = \sigma 1 = |\mu_1 - \mu_0| / (2 \times Q \text{ value}) \quad (4)$$

At this point, since the Q value is obtained from equation (1) and $\mu_{ave}$ and Coeff are known, substituting these values into equations (3a), (3b), and (4) enables the noise distribution computing unit 24 to obtain the standard deviation $\sigma$ ($=\sigma 0=\sigma 1$) of the noise distribution.

Figure 18:
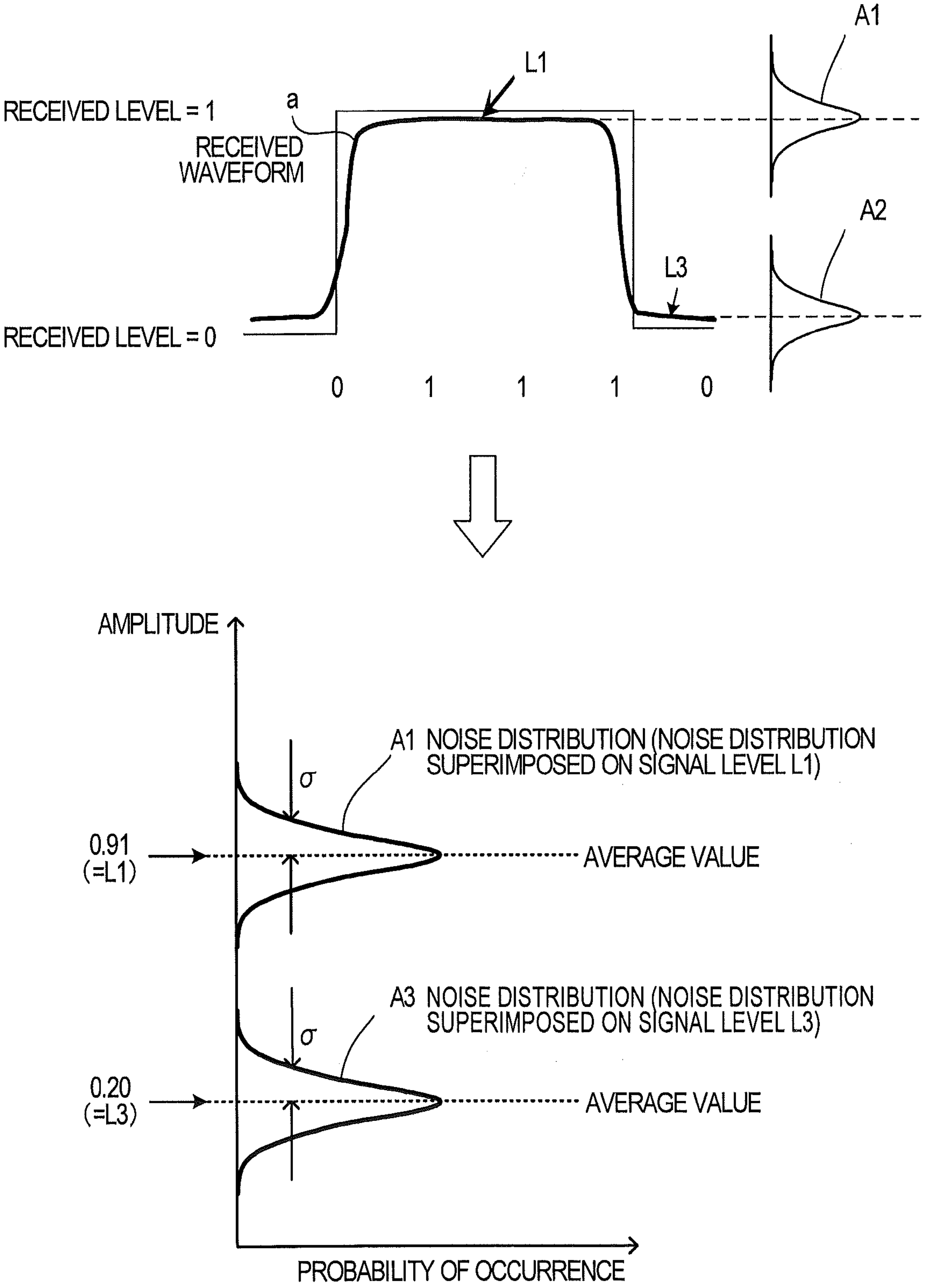
FIG. 18 is a diagram illustrating a noise distribution superimposed on a signal level of a received waveform.

FIG. 18 is a diagram illustrating a noise distribution superimposed on a signal level of the received waveform "a". The ordinate represents amplitude and the abscissa represents probability of occurrence. FIG. 18 illustrates, as examples, a noise distribution A1 superimposed on the signal level L1 of the received waveform "a" and a noise distribution A3 superimposed on the signal level L3 thereof.

Note that "superimposing a noise distribution having a standard deviation a on a given signal point" means that, taking the level value of the signal point as an average value, a distribution (=noise distribution) having a spread of a standard deviation a is to be formed on the signal point. The noise distribution represents an amplitude distribution including the influence of noise at the signal point.

The noise distribution A1 at the signal level L1 has an average value of 0.91 (=L1) and is a normal distribution with a standard deviation of (Y. In addition, the noise distribution A3 at the signal level L3 has an average value of 0.20 (=L3) and is a normal distribution with a standard deviation of a.

As shown, the noise distribution computing unit 24 acquires information on an OSNR and a transmission penalty of an object path from network information, and based on the equations (1) to (4) above, obtains a standard deviation of a noise distribution.

Next, operations of the initial histogram information computing unit 25 will be described. Since initial histogram information generation can be performed according to two scenarios, namely, a scenario using the first computation and a scenario using the second computation, the first computation will be described with reference to FIGS. 19 to 29 and the second computation will be described with reference to FIGS. 30 to 38.

The first computation will now be described. FIG. 19 is a diagram illustrating the probabilities of occurrence of received levels in the signal levels L1 to L6. The numerical values listed in row r1 denote quantization value z=0 to 7. The numerical values listed in row r2 indicate intermediate values of the quantization value z (hereinafter referred to as quantization intermediate values), and represent values that can be expressed as z+0.5 with 7 as an upper limit thereof.

In addition, the normalized received level in row r3 refers to discrete values obtained by normalizing the level range of 0.00 to 1.00 so as to correspond to the nine respective quantization intermediate values. That is, by dividing the respective quantization intermediate values by 7 (=the maximum value among the quantization intermediate values) corresponding to level 1.00, discrete level values corresponding to the respective quantization intermediate values can be obtained in the level range of 0.00 to 1.00.

For example, a normalized received level 1.00 is a value obtained by dividing a quantization intermediate value 7 by the maximum value 7 among the quantization intermediate values (1.00=7/7). A normalized received level 0.93 is a value obtained by dividing quantization intermediate value 6.5 by the maximum value 7 among the quantization intermediate values (0.93=6.5/7). A normalized received level 0.79 is a value obtained by dividing a quantization intermediate value 5.5 by the maximum value 7 among the quantization intermediate values (0.79=5.5/7). The other normalized received levels are calculated in a similar manner.

To generalize the contents described above, when the value of the bit of a quantization value is an (n+1) bit of quantization values 0 to n (where n=0, 1, 2, . . . ), if an intermediate value of the quantization values is assumed to be a quantization intermediate value Mk (where $0 \leq k \leq n+1$; k is an integer), it is calculated that Mk=M0=0 when k=0, Mk=(k+(k−1))/2 when $1 \leq k \leq n$, and Mk=Mn+1=n when k=n+1. In addition, a normalized received level Sk is to be a value obtained by dividing the quantization intermediate value Mk by n (Sk=Mk/n) and which represents a range of the signal received levels by a discrete value.

On the other hand, a probability of occurrence table T2 represents the probabilities of occurrence that the signal levels L1 to L6 take normalized received levels. Hereinafter, the significance of the numerical values described in the probability of occurrence table T2 will be described.

For the sake of the following description, it is assumed that received Q value=13.0 dB, $\mu_{ave}$=0.54, Coeff=0.0277, and that the noise distribution computing unit 24 has calculated that $\mu_0$=0.18 and $\mu_1$=0.90 from equations (3a) and (3b) and a standard deviation σ=0.028 from equation (4).

The initial histogram information computing unit 25 calculates a probability of occurrence that a probability variable in a noise distribution superimposed on a signal level equals or falls below a given normalized received level. The probability of occurrence table T2 describes a value of a probability of occurrence individually calculated for each normalized received level.

Taking the example of the signal level L1, the numerical value of "1" described in the field of the signal level L1 represents the probability that a probability variable of a noise distribution (a normal distribution whose average value is 0.91 and which has a standard deviation a) of the signal level L1 equals or falls below a given normalized received level (corresponding to 1.00).

Figure 20:
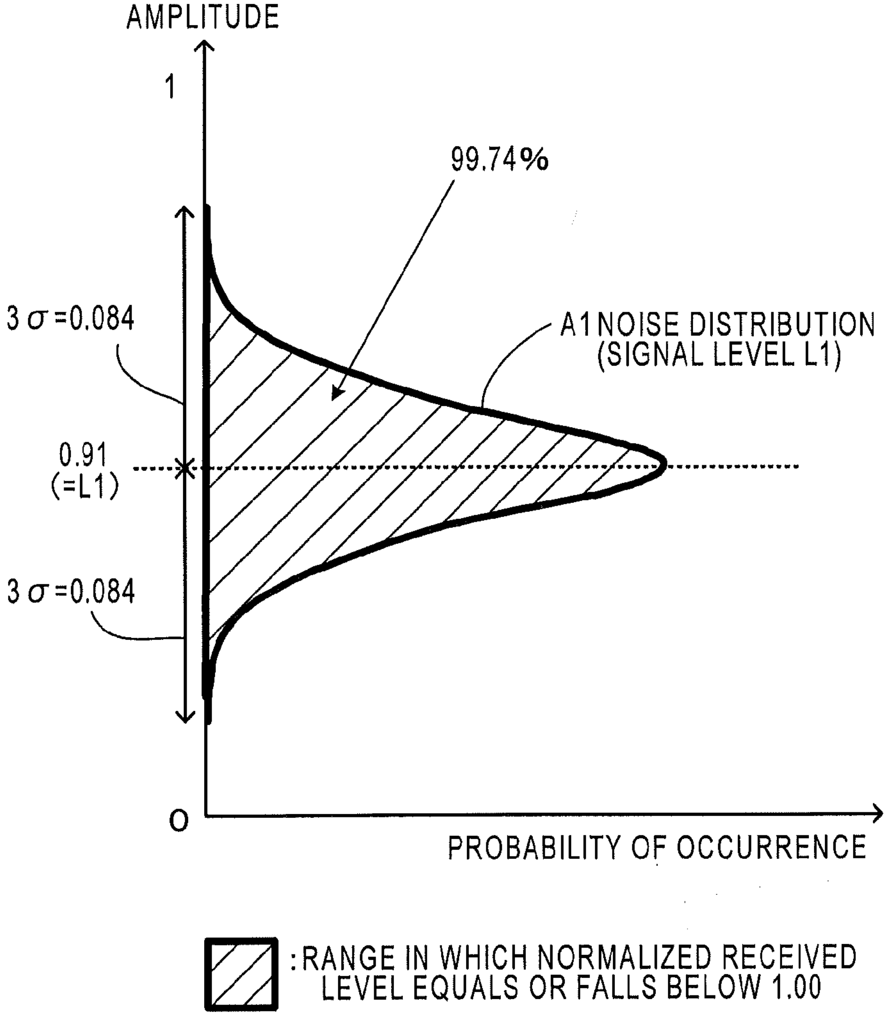
FIG. 20 is a diagram illustrating a range in which a normalized received level of a noise distribution superimposed on a signal level equals or falls below 1.00.
Figure 20:
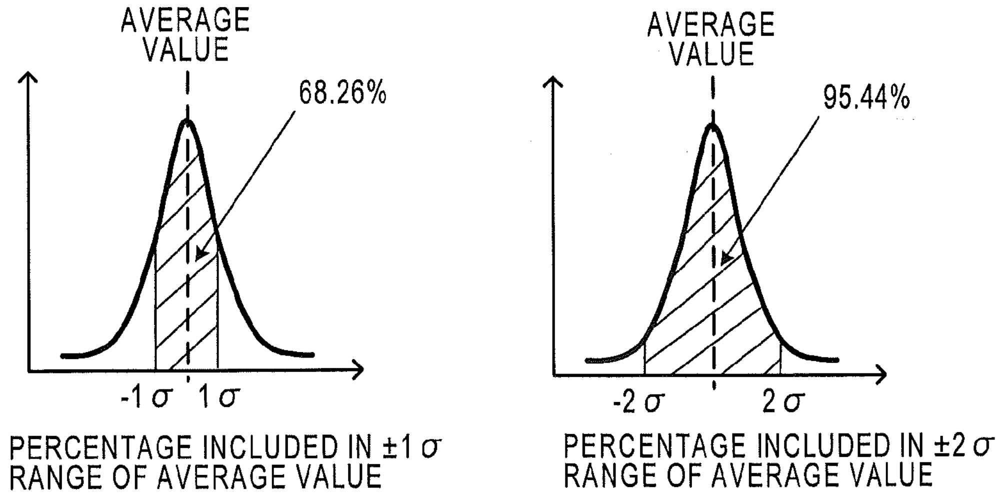

FIG. 20 is a diagram illustrating a range in which a normalized received level of a noise distribution superimposed on the signal level L1 equals or falls below 1.00. The ordinate represents amplitude and the abscissa represents probability of occurrence. A noise distribution A1 superimposed on the signal level L1 is a normal distribution with an average value=0.91 and a standard deviation σ=0.028, and indicates a distribution of ±3σ.

When samples of given data form a normal distribution whose vertex is an average value, the significance of a standard deviation σ is as follows. For example, data that takes a value within ±1σ of a central average value makes up 68.26% of all values, data that takes a value within ±2σ of the central average value makes up 95.44% of all values, and data that takes a value within ±3σ of the central average value makes up 99.74% of all values. The following description assumes that data takes a value within ±3*a*.

Since the noise distribution A1 is a probability distribution, the area of the entire region within the noise distribution A1 is 1. Therefore, in the noise distribution A1, the probability that the normalized received level equals or falls below 1.00 is "1" because the entire region in the noise distribution A1 is to be included (this is self-evident as it has been stated that the probability of the received level equaling or falling below 1 is 1). This "1" is described in a corresponding field of the signal level L1 in the probability of occurrence table T2.

In addition, the numerical value "0.7477878" described in the field of the signal level L1 signifies the probability that the probability variable in the noise distribution A1 superimposed on the signal level L1 equals or falls below a given normalized received level (corresponding to 0.93).

Figure 21:
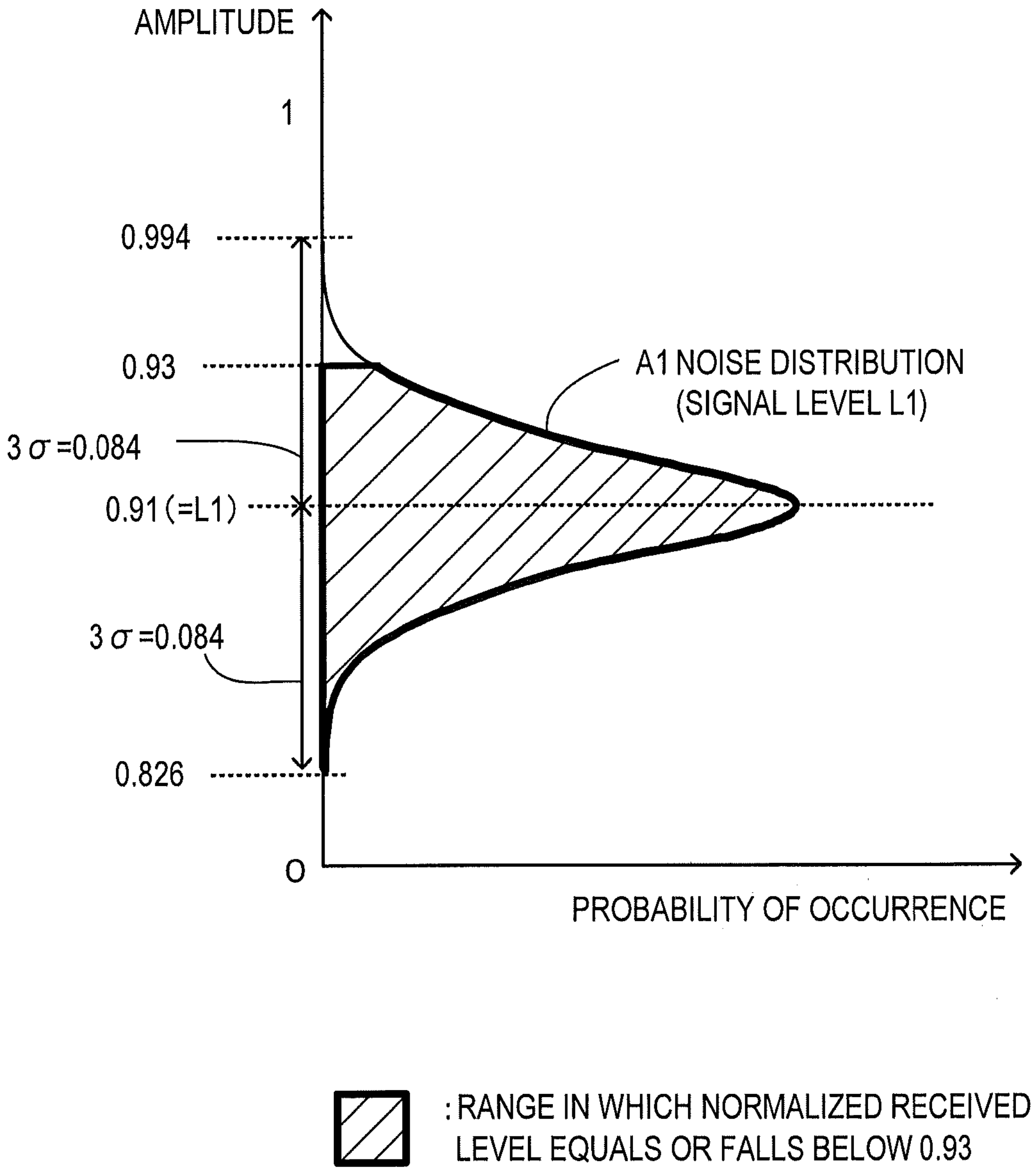
FIG. 21 is a diagram illustrating a range in which a normalized received level of a noise distribution superimposed on a signal level equals or falls below 0.93.

FIG. 21 is a diagram illustrating a range in which the normalized received level of the noise distribution A1 superimposed on the signal level L1 equals or falls below 0.93. The ordinate represents amplitude and the abscissa represents probability of occurrence. In the noise distribution A1 superimposed on the signal level L1, the probability that the normalized received level equals or falls below 0.93 is represented by the area of a hatched region within the noise distribution A1. By calculating the value (integral value) of the area, 0.7477878 is obtained, which is precisely the value described in the corresponding field of the signal level L1 in the probability of occurrence table T2. In a similar manner, a probability of occurrence is calculated for other normalized received levels of the signal level L1.

Moreover, in the noise distribution A1, a minimum amplitude can substantially be assumed as being 0.826 (=0.91−0.028×3), and the probability of occurrence of a normalized received level smaller than 0.826 takes a value extremely close to 0. For example, the probability of occurrence corresponding to the normalized received level 0.79 of the noise distribution A1 is 3.959E−06 (=3.959-06) which is a value extremely close to 0 (in addition, since an amplitude value of 0.79 that is smaller than the minimum amplitude value of 0.826 will never appear, the probability can safely be determined to be 0). Among the numerical values in the table, while the numerical values expressed as xxE−yy are assumed to be values in which a significant digit thereof is truncated to six decimal places, the values may be assumed to be substantially 0.

Next, taking the example of signal level L3, the numerical value of "1" described in the field of the signal level L3 represents the probability that a probability variable of a noise distribution (a normal distribution whose average value=0.20 and standard deviation σ=0.028) superimposed on the signal level L3 equals or falls below a given normalized received level (corresponding to 1.00).

Figure 22:
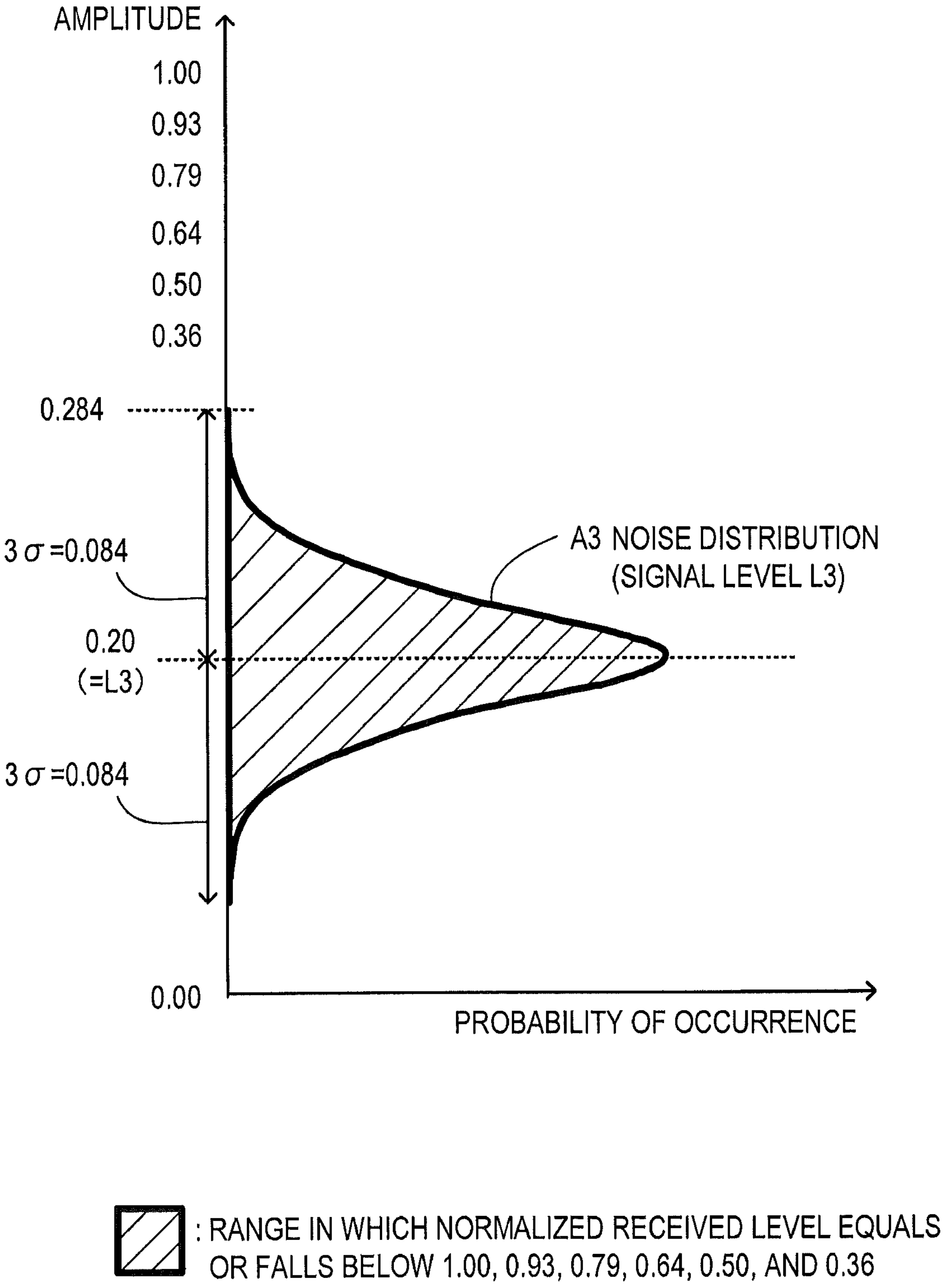
FIG. 22 is a diagram illustrating a range in which a normalized received level of a noise distribution superimposed on a signal level equals or falls below 1.00.

FIG. 22 is a diagram illustrating a range in which a normalized received level of a noise distribution superimposed on the signal level L3 equals or falls below 1.00. The ordinate represents amplitude and the abscissa represents probability of occurrence. The noise distribution A3 superimposed on the signal level L3 is a normal distribution whose average value=0.20 and σ=0.028.

Since the noise distribution A3 is a probability distribution, the area of the entire region within the noise distribution A3 is 1. Therefore, the probability that the normalized received level in the noise distribution A3 equals or falls below 1.00 is "1" because the entire region within the noise distribution A3 is included.

In addition, since the maximum amplitude value of the noise distribution A3 can substantially be assumed as being 0.284 (=0.20+0.028×3), the probabilities that the normalized received level of the signal level L3 equals or falls below not only 1.00 but also 0.93, 0.79, 0.64, 0.50, and 0.36 are also "1" because the entire region within the noise distribution A3 is included in the respective normalized received levels.

In addition, the numerical value "0.6961977" described in the field of the signal level L3 signifies the probability that the probability variable in the noise distribution A3 superimposed on the signal level L3 equals or falls below a given normalized received level (corresponding to 0.21).

Figure 23:
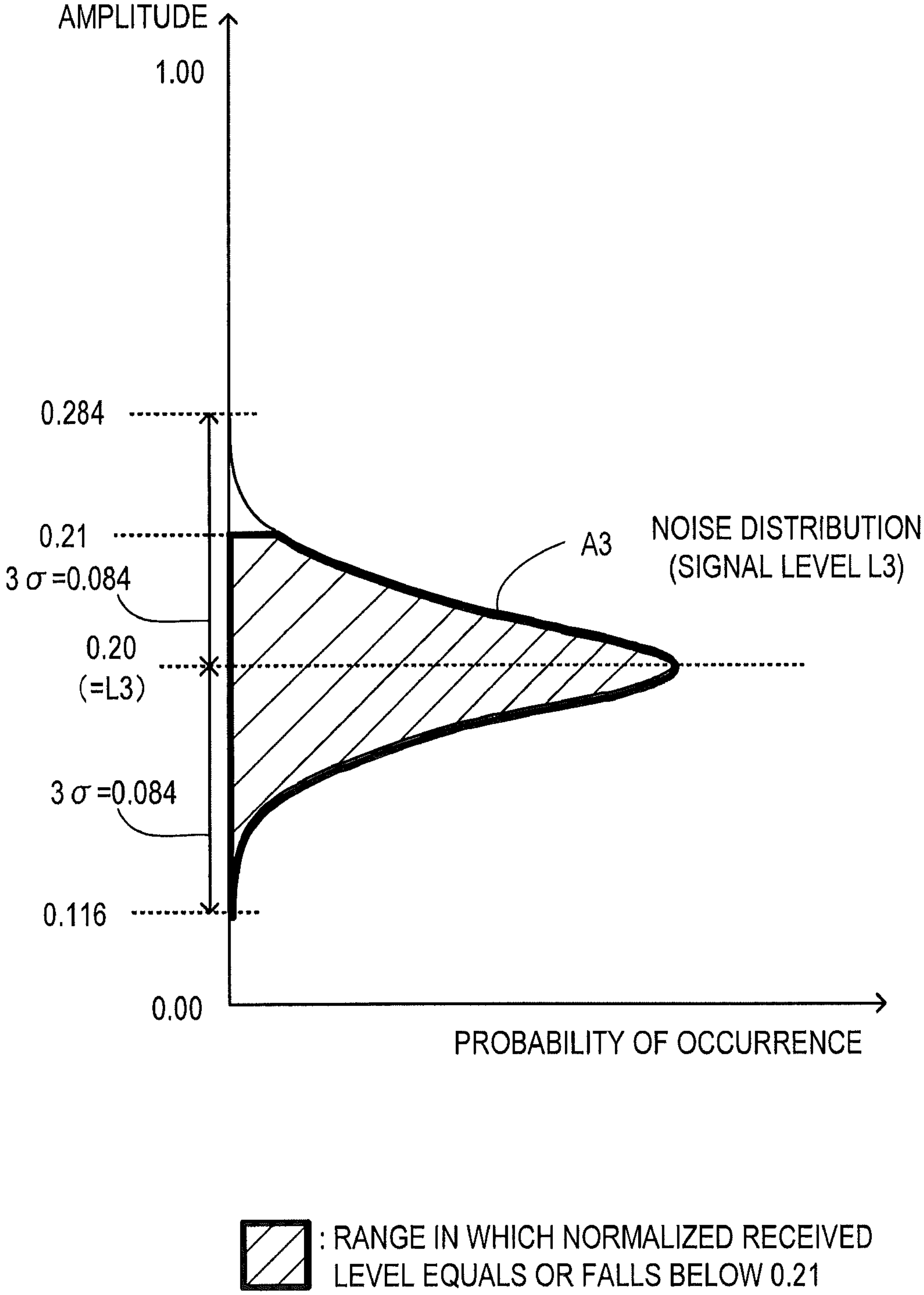
FIG. 23 is a diagram illustrating a range in which a normalized received level of a noise distribution superimposed on a signal level equals or falls below 0.21.

FIG. 23 is a diagram illustrating a range in which the normalized received level of the noise distribution A3 superimposed on the signal level L3 equals or falls below 0.21. The ordinate represents amplitude and the abscissa represents probability of occurrence. In the noise distribution A3, the probability that the normalized received level equals or falls below 0.21 is represented by the area of a hatched region within the noise distribution A3. By calculating the value (integral value) of the area, 0.6961977 is obtained, which is precisely the value described in the corresponding field of the signal level L3 in the probability of occurrence table T2. In a similar manner, probabilities of occurrence are calculated for other normalized received levels of the signal level L3.

Moreover, since the minimum amplitude value of the noise distribution A3 can substantially be assumed as being 0.116 (=0.20−0.028×3), the probability of occurrence of a normalized received level smaller than 0.116 can be assumed to be 0 (the probabilities of occurrence of the normalized received levels 0.07 and 0.00 can be assumed to be 0).

Next, probabilities of occurrence of respective quantization values for signal levels L1 to L6 will be described. In the description above, a probability of occurrence of a normalized received level equaling or falling below a given normalized received level for signal levels L1 to L6 has been obtained for each individual normalized received level. For next processing, a probability of occurrence for a quantization value in a signal level is to be obtained (a probability of occurrence for each individual quantization value shall be referred to as a frequency).

FIG. 24 is a diagram illustrating a frequency table. A frequency table T3 represents a frequency for each quantization value in signal levels L1 to L6. A description will be given taking the signal level L1 as an example. As described earlier, in the noise distribution A1 of the signal level L1, the probability of occurrence that the normalized received level equals or falls below 1.00 is 1 and the probability of occurrence that the normalized received level equals or falls below 0.93 is 0.7477878.

In addition, as is apparent from the probability of occurrence table T2, the normalized received level 1.00 corresponds to the quantization value z=7 and the normalized received level 0.93 corresponds to the quantization value z=6. Therefore, the probability of occurrence of the quantization value z=7 or lower is 1 and the probability of occurrence of the quantization value z=6 or lower is 0.7477878.

Since the probability (frequency) that the quantization value z=7 is conceivably obtained by subtracting the probability of occurrence of the quantization value z=6 or smaller from the probability of occurrence of the quantization value z=7 or smaller, the frequency that the quantization value z=7 is 0.2522 (=1-0.7477878).

In addition, since the frequency that the quantization value z=6 is conceivably obtained by subtracting the probability of occurrence of the quantization value z=5 or smaller from the probability of occurrence of the quantization value z=6 or smaller, the frequency that the quantization value z=6 is 0.7478 (=0.7477878-0) (while a description more faithful to the description in the probability of occurrence table T2 is 0.7477878-3.959E-06, 0.7477878-0 shall suffice). In addition, by performing similar calculations for the signal level L1, it is found that the frequencies of other quantization values are 0.

In a similar manner, a description will be given taking the signal level L3 as an example. As described earlier, in the noise distribution A3 of the signal level L3, the probability of occurrence that the normalized received level equals or falls below 0.36 is 1 and the probability of occurrence that the normalized received level equals or falls below 0.21 is 0.6961977.

In addition, as is apparent from the probability of occurrence table T2, the normalized received level 0.36 corresponds to the quantization value z=2 and the normalized received level 0.21 corresponds to the quantization value z=1. Therefore, the probability of occurrence of the quantization value z=2 or lower is 1 and the probability of occurrence of the quantization value z=1 or lower is 0.6961977.

Since the probability (frequency) that the quantization value z=2 is conceivably obtained by subtracting the probability of occurrence of the quantization value z=1 or smaller from the probability of occurrence of the quantization value z=2 or smaller, the frequency that the quantization value z=2 is 0.3038 (=1-0.6961977).

Figure 25:
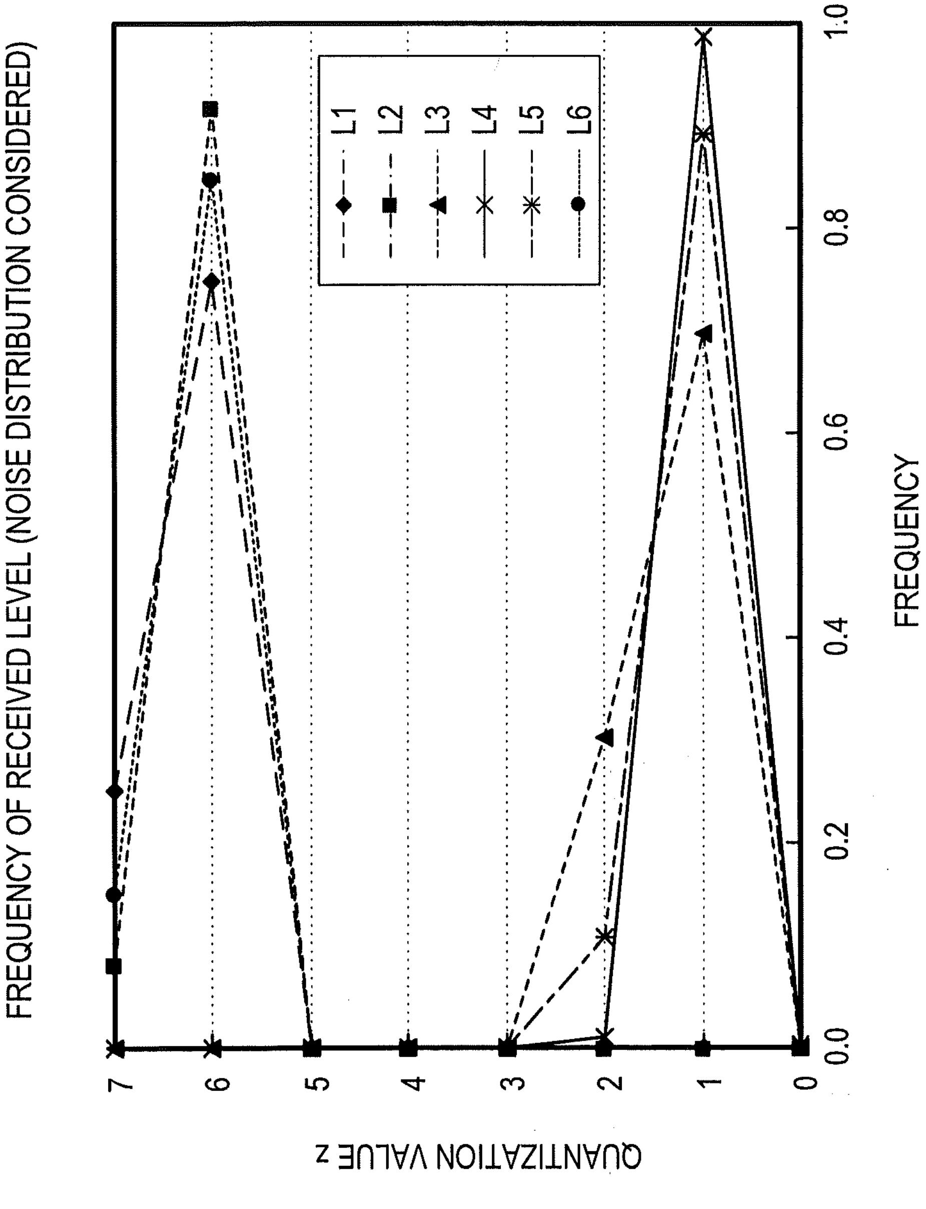
FIG. 25 is a diagram illustrating a frequency graph.

In addition, since the frequency that the quantization value z=1 is conceivably obtained by subtracting the probability of occurrence of the quantization value z=0 or smaller from the probability of occurrence of the quantization value z=1 or smaller, the frequency that the quantization value z=1 is 0.6962 (=0.6961977-0) (while a description more faithful to the description in the probability of occurrence table T2 is 0.6961977-1.905E-06, 0.6961977-0 shall suffice). In addition, by performing similar calculations for the signal level L3, it is found that the frequencies of other quantization values are 0. A frequency graph is illustrated in FIG. 25. The ordinate represents quantization value z and the abscissa represents frequency. The frequency graph illustrates the numerical values described in the frequency table T3 as a line plot of each signal level L1 to L6.

For next processing, values illustrated in the frequency table T3 are normalized by normalizing the respective frequencies to integers for each signal level L1 to L6 so that the totals come to 10, whereby the normalized values are to be used as histogram data.

FIG. 26 is a diagram illustrating a histogram table. Described in a histogram table T1*a* are integer conversions of values indicated in the frequency table T3. For example, with the signal level L1 in the frequency table T3, since the frequency of the quantization value z=7 is 0.2522 and the frequency of the quantization value z=6 is 0.7478, a normalized value of 3 of the frequency of the quantization value z=7 and a normalized value of 7 of the frequency of the quantization value z=6 are registered in the histogram table T1*a*. Normalized values are to be registered for other quantization values in a similar manner.

FIGS. 27 to 29 are diagrams illustrating a registration process of initial histogram data to histogram tables. In FIG. 27, a histogram table T1*a*-0 represents a state where no values have been registered. In a histogram table T1*a*-1, data values of 7 as the frequency of the quantization value z=6 and 3 as the frequency of the quantization value z=7 are registered as initial histogram data of 01-1 (signal level L1).

In a histogram table T1*a*-2, data values of 9 as the frequency of the quantization value z=6 and 1 as the frequency of the quantization value z=7 are registered as initial histogram data of 11-1 (signal level L2).

In FIG. 28, in a histogram table T1*a*-3, data values of 7 as the frequency of the quantization value z=1 and 3 as the frequency of the quantization value z=2 are registered as initial histogram data of 11-0 (signal level L3). In a histogram table T1*a*-4, a data value of 10 as the frequency of the quantization value z=1 is registered as initial histogram data of 10-0 (signal level L4).

In FIG. 29, in a histogram table T1*a*-5, data values of 9 as the frequency of the quantization value z=1 and 1 as the frequency of the quantization value z=2 are registered as initial histogram data of 00-0 (signal level L5). In a histogram table T1*a*-6, data values of 8 as the frequency of the quantization value z=6 and 2 as the frequency of the quantization value z=7 are registered as initial histogram data of 00-1 (signal level L6).

A generalization of the first computation can be described as: if signal levels L1 to Lp (where p=1, 2, . . . ) denote signal levels of a received waveform "a", a probability of occurrence Pk is calculated in which a probability variable of a noise distribution superimposed on a signal level Lr (where $1 \le r \le p$; r is an integer) equals or falls below the value of a normalized received level Sk.

In this case, with respect to a quantization value k−1 (where 1≤k≤n+1) corresponding to the normalized received level Sk and a quantization value k−2 (where 2≤k≤n+1) corresponding to a normalized received level Sk−1, a frequency that is a probability that the signal level Lr equals the quantization value k−1 is obtained by subtracting a probability of occurrence Pk−1 that the signal level Lr equals or falls below the quantization value k−2 from a probability of occurrence Pk that the signal level Lr equals or falls below the quantization value k−1. However, when k takes the value of 1, a frequency that is a probability that the signal level Lr equals a quantization value 0 is obtained by subtracting a probability of occurrence that the signal level Lr equals a normalized received level S0 from a probability of occurrence P1 that the signal level Lr equals or falls below the quantization value 0. Subsequently, frequencies of all signal levels L1 to Lp are obtained, whereby values obtained by normalizing the frequencies are to be used as data values of initial histogram information.

For example, assuming that K=8 for an r=1 signal level L1, with respect to a quantization value 7 (=8-1) corresponding to the normalized received level S8 (=1.00) and a quantization value 6 (=k−2) corresponding to a normalized received level S7 (=0.93), a frequency that is a probability that the signal level L1 equals the quantization value 7 is to be obtained by subtracting a probability of occurrence P7 (=0.7477878) that the signal level L1 equals or falls below the quantization value 6 from a probability of occurrence P8 (=1) that the signal level L1 equals or falls below the quantization value 7.

Next, the second computation will be described. For the sake of the following description, it is assumed that a received Q value=15.0 dB, $\mu_{ave}$=0.49, Coeff=0.0098, and that the noise distribution computing unit 24 has calculated that $\mu_0$=0.34 and $\mu_1$=0.64 from equations (3a) and (3b) and a standard deviation σ=0.010 from equation (4).

Figure 30:
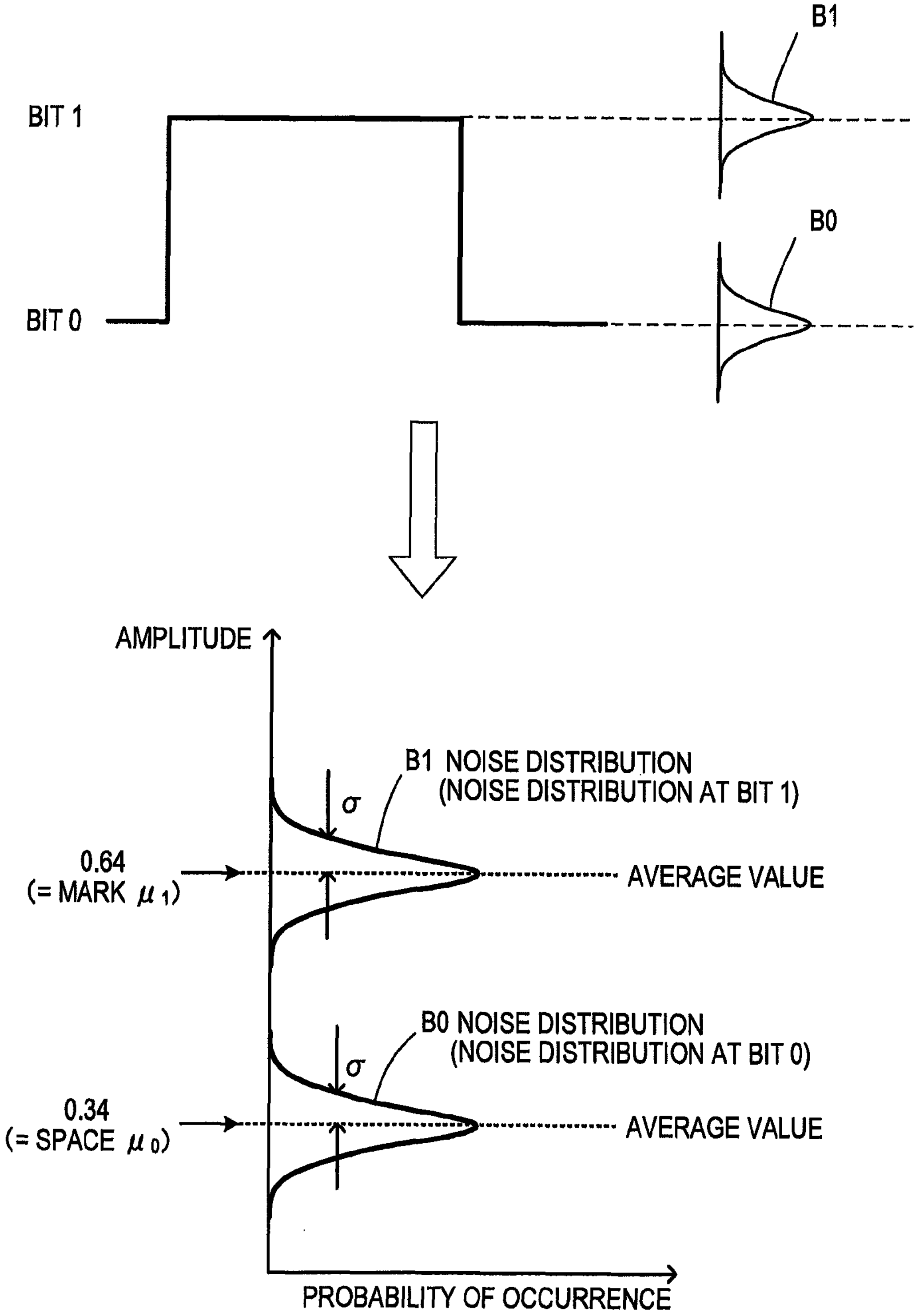
FIG. 30 is a diagram illustrating noise distributions at bits 0 and 1.

FIG. 30 is a diagram illustrating noise distributions at bits 0 and 1. The ordinate represents amplitude and the abscissa represents probability of occurrence. FIG. 30 illustrates a noise distribution B0 at bit 0 and a noise distribution B1 at bit 1. The noise distribution B0 is a normal distribution whose average value is a space $\mu_0$ and whose distributive spread is a standard deviation σ. In addition, the noise distribution B1 is a normal distribution whose average value is a mark $\mu_1$ and whose distributive spread is a standard deviation σ.

FIG. 31 is a diagram illustrating the probabilities of occurrence of received levels at bits 0 and 1. Rows r1 to r3 are the same as those illustrated in FIG. 19. A probability of occurrence table T4 represents probabilities of occurrence when the bits 0 and 1 take normalized received levels. Hereinafter, the significance of the numerical values described in the probability of occurrence table T4 will be described.

The initial histogram information computing unit 25 calculates a probability of occurrence that a probability variable in a noise distribution superimposed on bits 0 and 1 equals or falls below a given normalized received level. The probability of occurrence table T4 describes a value of a probability of occurrence individually calculated for each normalized received level.

Taking the example of bit 1, the numerical value of "1" described in the field of bit 1 represents the probability that a probability variable of a noise distribution of bit 1 (a normal distribution whose average value=$\mu_1$=0.64 and whose standard deviation σ=0.01) equals or falls below a given normalized received level (corresponding to 1.00).

Figure 32:
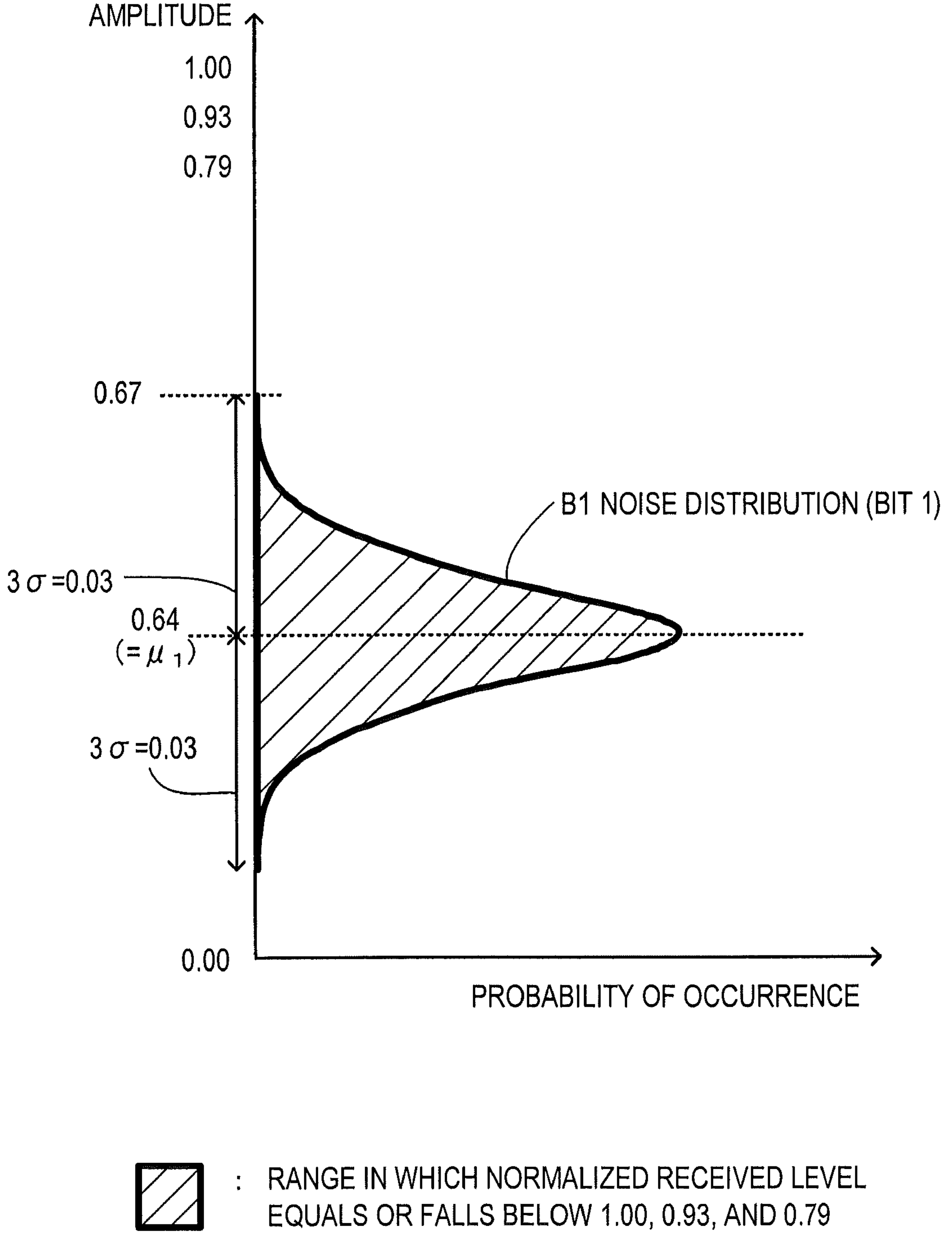
FIG. 32 is a diagram illustrating a range in which a normalized received level of a noise distribution at bit 1 equals or falls below 1.00.

FIG. 32 is a diagram illustrating a range in which a normalized received level of a noise distribution at bit 1 equals or falls below 1.00. The ordinate represents amplitude and the abscissa represents probability of occurrence. The noise distribution B1 at bit 1 is a normal distribution whose average value is mark $\mu_1$ and therefore 0.64 and whose standard deviation σ=0.01.

Since the noise distribution B1 is a probability distribution, the area of the entire region within the noise distribution B1 is 1. Therefore, the probability that the normalized received level in the noise distribution B1 equals or falls below 1.00 is "1" because the entire region within the noise distribution B1 is included. This "1" is described in a corresponding field of bit 1 in the probability of occurrence table T2.

In addition, since the maximum amplitude value of the noise distribution B1 can substantially be assumed as being 0.67 (=0.64+0.01×3), the probabilities that the normalized received level of bit 1 equals or falls below not only 1.00 but also 0.93 and 0.79 are also "1" because the entire region within the noise distribution B1 is included in the respective normalized received levels.

On the other hand, the numerical value "0.7249691" described in the field of bit 1 signifies the probability that the probability variable in the noise distribution B1 of bit 1 equals or falls below a given normalized received level (corresponding to 0.64).

Figure 33:
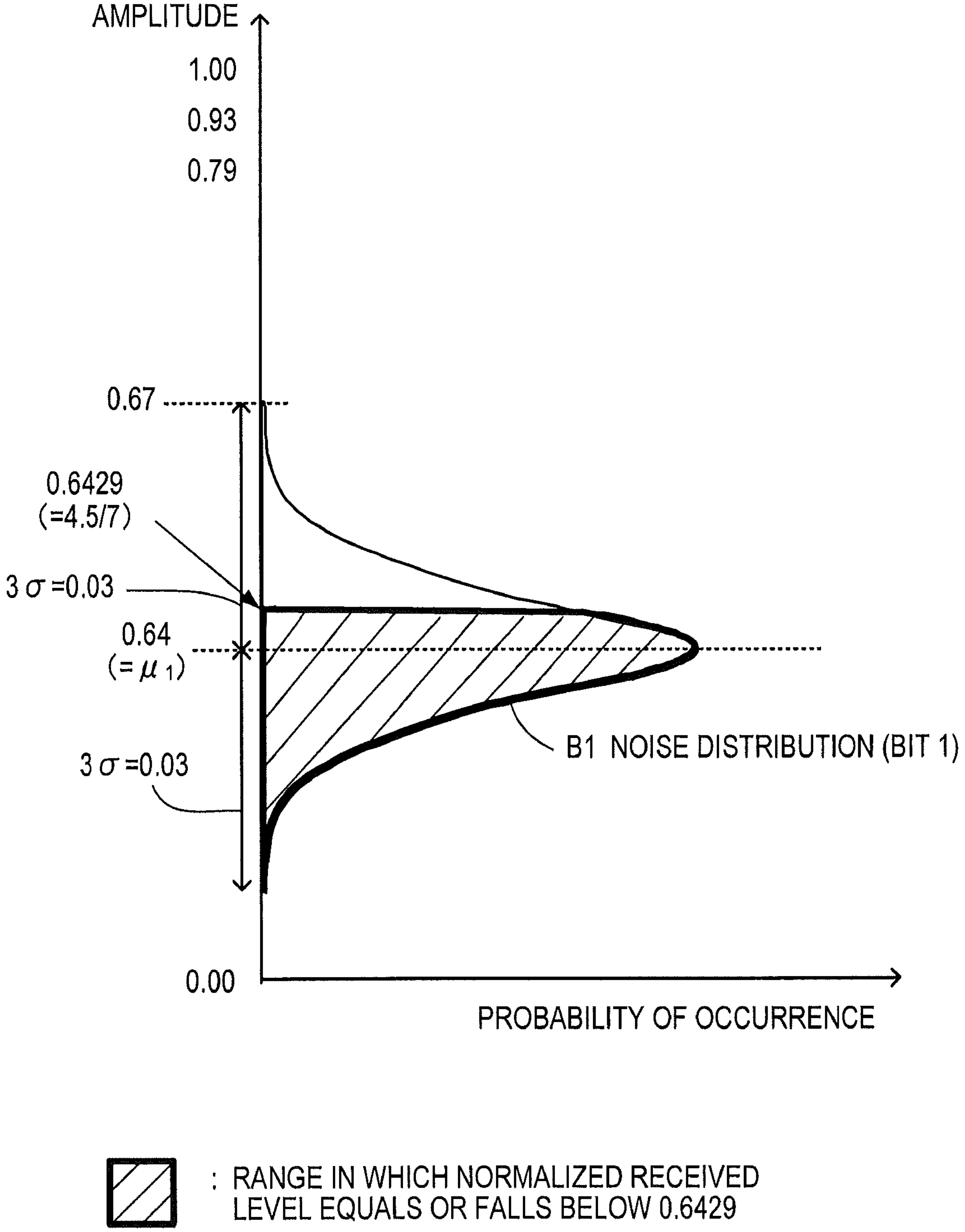
FIG. 33 is a diagram illustrating a range in which a normalized received level of a noise distribution at bit 1 equals or falls below 0.6429.

FIG. 33 is a diagram illustrating a range in which a normalized received level of the noise distribution B1 at bit 1 equals or falls below 0.6429. The ordinate represents amplitude and the abscissa represents probability of occurrence. In the noise distribution B1, the probability that the normalized received level equals or falls below 0.6429 is represented by the area of a hatched region within the noise distribution B1. By calculating the value (integral value) of the area, 0.7249691 is obtained, which is precisely the value described in the corresponding field of bit 1 in the probability of occurrence table T4. In a similar manner, probabilities of occurrence are calculated for other normalized received levels of bit 1. Moreover, since the minimum amplitude value of the noise distribution B1 can be assumed as being 0.61 (=0.64−0.01×3), the probability of occurrence of a normalized received level smaller than 0.61 can be assumed to be 0.

Next, in describing bit 0, the numerical value of "1" described in the field of bit 0 represents the probability that a probability variable of a noise distribution of bit 0 (a normal distribution whose average value=$\mu_0$=0.34 and whose standard deviation σ=0.01) equals or falls below a given normalized received level (corresponding to 1.00).

Figure 34:
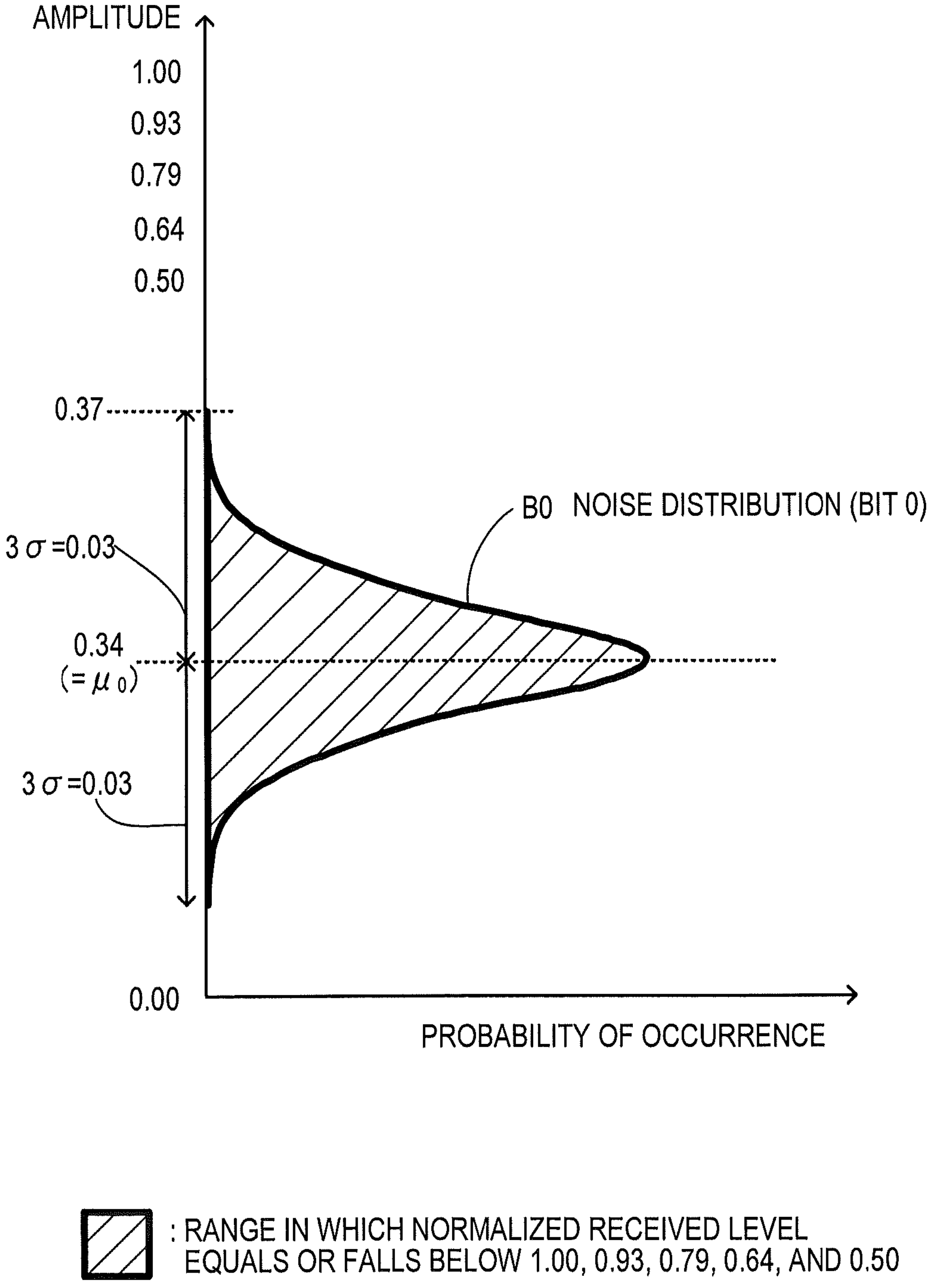
FIG. 34 is a diagram illustrating a range in which a normalized received level of a noise distribution at bit 0 equals or falls below 1.00.

FIG. 34 is a diagram illustrating a range in which a normalized received level of the noise distribution at bit 0 equals or falls below 1.00. The ordinate represents amplitude and the abscissa represents probability of occurrence. The noise distribution B0 at bit 0 is a normal distribution whose average value is space $\mu_0$ and therefore 0.34 and whose standard deviation σ=0.01.

Since the noise distribution B0 is a probability distribution, the area of the entire region within the noise distribution B0 is 1. Therefore, the probability that the normalized received level in the noise distribution B0 equals or falls below 1.00 is "1" because the entire region within the noise distribution B0 is included. This "1" is described in a corresponding field of bit 0 in the probability of occurrence table T4.

In addition, since the maximum amplitude value of the noise distribution B0 can substantially be assumed as being 0.37 (=0.34+0.01×3), the probabilities that the normalized received level of bit 0 equals or falls below not only 1.00 but also 0.93, 0.79, 0.64, and 0.50 are also "1" because the entire region within the noise distribution B0 is included in the respective normalized received levels.

On the other hand, the numerical value "0.9255107" described in the field of bit 0 signifies the probability that the probability variable in the noise distribution B0 of bit 0 equals or falls below a given normalized received level (corresponding to 0.36).

Figure 35:
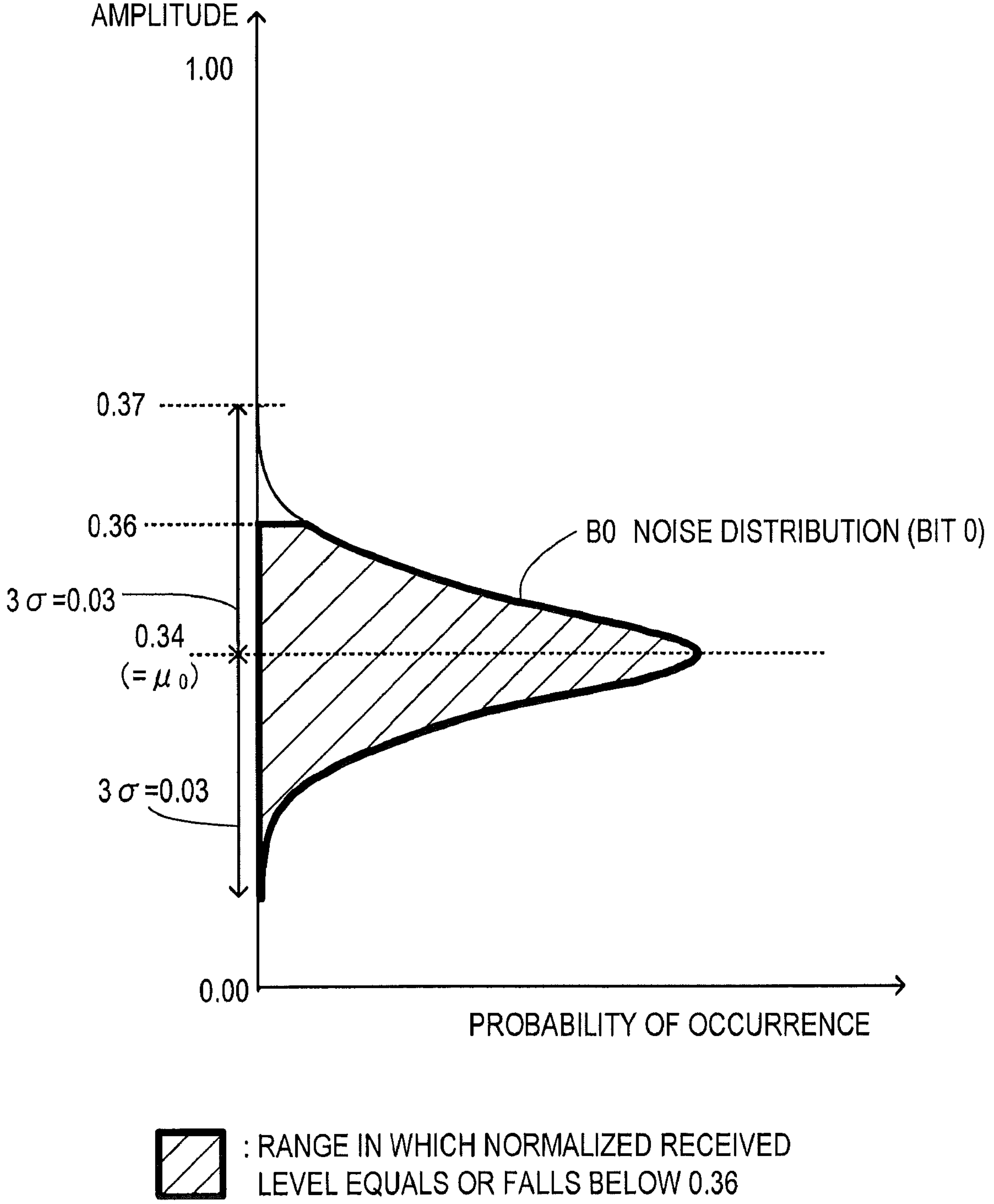
FIG. 35 is a diagram illustrating a range in which a normalized received level of a noise distribution at bit 0 equals or falls below 0.36.

FIG. 35 is a diagram illustrating a range in which a normalized received level of the noise distribution B0 at bit 0 equals or falls below 0.36. The ordinate represents amplitude and the abscissa represents probability of occurrence. In the noise distribution B0, the probability that the normalized received level equals or falls below 0.36 is represented by the area of a hatched region within the noise distribution B0. By calculating the value (integral value) of the area, 0.9255107 is obtained, which is precisely the value described in the corresponding field of bit 0 in the probability of occurrence table T4. In a similar manner, probabilities of occurrence are calculated for other normalized received levels of bit 0.

Moreover, since the minimum amplitude value of the noise distribution B0 can be assumed as being 0.31 (=0.34−0.01×3), the probability of occurrence of a normalized received level smaller than 0.31 is substantially 0.

Next, probabilities of occurrence for respective quantization values of the bits 0 and 1 will be described. In the description above, a probability of occurrence of a normalized received level equaling or falling below a given normalized received level for bits 0 and 1 has been obtained for each individual normalized received level. For next processing, a probability of occurrence (frequency) for a quantization value in bits 0 and 1 is to be obtained.

FIG. 36 is a diagram illustrating a frequency table. A frequency table T5 represents a frequency for each quantization value in bits 0 and 1. In the noise distribution B1 of bit 1, the probability of occurrence that the normalized received level equals or falls below 0.79 is 1 and the probability of occurrence that the normalized received level equals or falls below 0.64 is 0.7249691.

In addition, as is apparent from the probability of occurrence table T4, the normalized received level 0.79 corresponds to the quantization value z=5 and the normalized received level 0.64 corresponds to the quantization value z=4. Therefore, the probability of occurrence of the quantization value z=5 or lower is 1 and the probability of occurrence of the quantization value z=4 or lower is 0.7249691.

Since the probability (frequency) that the quantization value z=5 is conceivably obtained by subtracting the probability of occurrence of the quantization value z=4 or smaller from the probability of occurrence of the quantization value z=5 or smaller, the frequency that the quantization value z=5 is 0.2750 (=1-0.7249691).

In addition, since the frequency that the quantization value z=4 is conceivably obtained by subtracting the probability of occurrence of the quantization value z=3 or smaller from the probability of occurrence of the quantization value z=4 or smaller, the frequency that the quantization value z=4 is 0.7250 (=0.7249691-0) (while a description more faithful to the description in the probability of occurrence table T4 is 0.7249691-1.038E-44, 0.7249691-0 shall suffice). In addition, by performing similar calculations for bit 1, it is found that the frequencies of other quantization values are 0.

In a similar manner, in the noise distribution B0 of bit 0, the probability of occurrence that the normalized received level equals or falls below 0.50 is 1 and the probability of occurrence that the normalized received level equals or falls below 0.36 is 0.9255107.

Furthermore, as is apparent from the probability of occurrence table T4, the normalized received level 0.50 corresponds to the quantization value z=3 and the normalized received level 0.36 corresponds to the quantization value z=2. Therefore, the probability of occurrence of the quantization value z=3 or lower is 1 and the probability of occurrence of the quantization value z=2 or lower is 0.9255107.

Since the probability (frequency) that the quantization value z=3 is conceivably obtained by subtracting the probability of occurrence of the quantization value z=2 or smaller from the probability of occurrence of the quantization value z=3 or smaller, the frequency that the quantization value z=3 is 0.0745 (=1-0.9255107).

Figure 37:
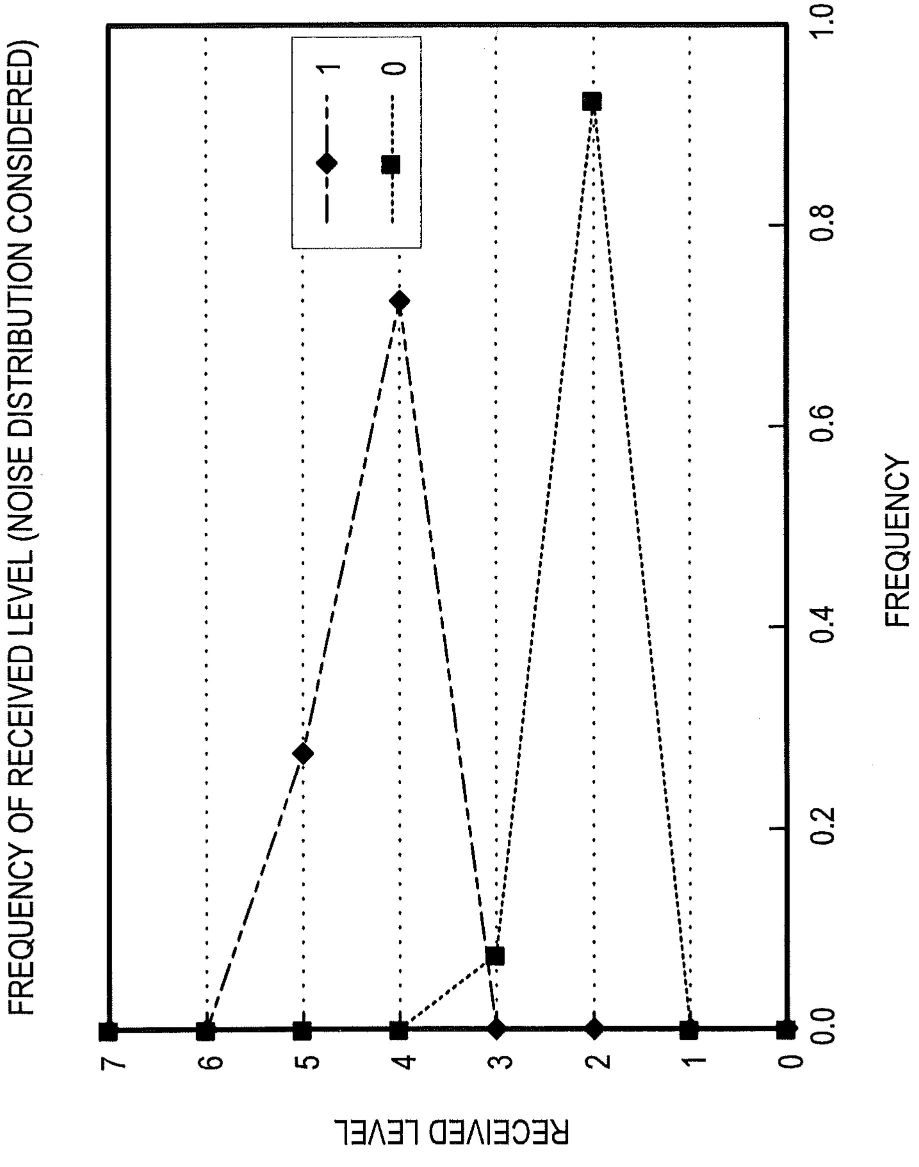
FIG. 37 is a diagram illustrating a frequency graph.

In addition, since the frequency that the quantization value z=2 is conceivably obtained by subtracting the probability of occurrence of the quantization value z=1 or smaller from the probability of occurrence of the quantization value z=2 or smaller, the frequency that the quantization value z=2 is 0.9255 (=0.9255107-0) (while a description more faithful to the description in the probability of occurrence table T4 is 0.9255107-1.05E-39, 0.9255107-0 shall suffice). In addition, by performing similar calculations for bit 0, it is found that the frequencies of other quantization values are 0. A frequency graph is illustrated in FIG. 37. The ordinate represents quantization value z and the abscissa represents frequency. The frequency graph illustrates the numerical values described in the frequency table T5 as a line plot of each of the bits 0 and 1.

For next processing, values illustrated in the frequency table T5 are normalized by normalizing the respective frequencies to integers for each of the bits 0 and 1 so that the totals come to 100, whereby the normalized values are to be used as histogram data.

FIG. 38 is a diagram illustrating a histogram table. Described in a histogram table T1*b* are integer conversions of values indicated in the frequency table T5. For example, with bit 1 in the frequency table T5, since the frequency of the quantization value z=5 is 0.2750 and the frequency of the quantization value z=4 is 0.7250, a normalized value of 28 of the frequency of the quantization value z=5 and a normalized value of 72 the frequency of the quantization value z=4 are registered in the histogram table T1*b*.

In addition, with bit 0 in the frequency table T5, since the frequency of the quantization value z=3 is 0.0745 and the frequency of the quantization value z=2 is 0.9255, a normalized value of 7 of the frequency of the quantization value z=3 and a normalized value of 93 of the frequency of the quantization value z=2 are registered in the histogram table T1*b*.

A generalization of the second computation can be described as calculating a probability of occurrence Pk that a probability variable in a noise distribution of bit 0 equals or falls below a normalized received level Sk. In this case, with respect to a quantization value k−1 (where 1≤k≤n+1) corresponding to the normalized received level Sk and a quantization value k−2 (where 2≤k≤n+1) corresponding to a normalized received level Sk−1, a frequency that is a probability that bit 0 equals the quantization value k−1 is obtained by subtracting a probability of occurrence Pk−1 that bit 0 equals or falls below the quantization value k−2 from a probability of occurrence Pk that bit 0 equals or falls below the quantization value k−1. However, when k takes the value of 1, a frequency that is a probability that bit 0 equals a quantization value 0 is obtained by subtracting a probability of occurrence that bit 0 equals a normalized received level S0 from a probability of occurrence P1 that bit 0 equals or falls below the quantization value 0.

In addition, a probability of occurrence Pk that a probability variable in a noise distribution of bit 1 equals or falls below a normalized received level Sk is calculated. In this case, with respect to a quantization value k−1 (where 1≤k≤n+1) corresponding to the normalized received level Sk and a quantization value k−2 (where 2≤k≤n+1) corresponding to a normalized received level Sk−1, a frequency that is a probability that bit 1 equals the quantization value k−1 is obtained by subtracting a probability of occurrence Pk−1 that bit 1 equals or falls below the quantization value k−2 from a probability of occurrence Pk that bit 1 equals or falls below the quantization value k−1. Subsequently, normalized values of the frequencies of bit 0 and bit 1 are to become data values of initial histogram information.

Next, a configuration in a case where functions of the control device 20 are disposed within an optical node will be described. While the control device 20 has been described above as a function of a network design tool terminal, the functions of the control device 20 may be disposed at a transmission control unit in a node.

Figure 39:
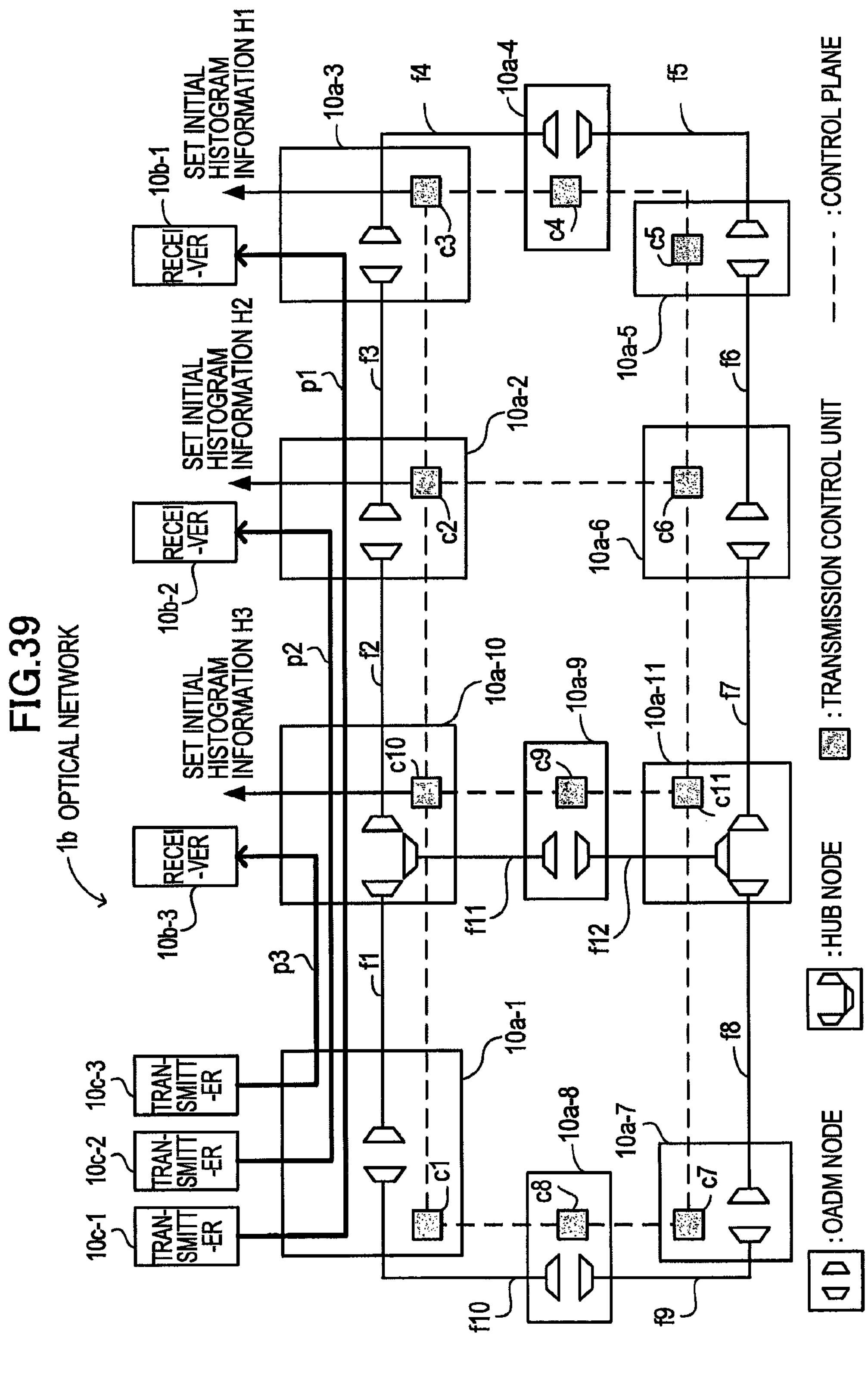
FIG. 39 is a diagram illustrating a configuration of an optical network.

FIG. 39 is a diagram illustrating a configuration of an optical network. An optical network 1*b* is basically configured the same as the optical network 1*a* described earlier with reference to FIG. 10. However, the optical network 1*b* is arranged so that the functions of the control device 20 are executed within nodes.

In addition, the optical network 1*b* is a network that performs transmission using two logical channels, namely, a bearer channel through which travels service data of a network user, and a control channel through which travels operation-related control information and which is used for network control. The bearer channel is referred to as a data plane and the control channel is referred to as a control plane (the control plane is to be processed on a control network layer).

Among transmission control units c1 to c11, the transmission control units c1 to c9 are respectively installed in the OADM nodes 10*a*-1 to 10*a*-9, while the transmission control units c10 and c11 are respectively installed in the hub nodes 10*a*-10 and 10*a*-11.

The transmission control units c1 to c11 perform transmission control within the nodes (perform the same control as the transmission control units 56-1 and 56-2 described earlier with reference to FIG. 13). In addition, the functions of the control device 20 are to be provided to at least any one transmission control unit among the transmission control units c1 to c11 (alternatively, the functions of the control device 20 may be provided to all nodes). Subsequently, using the control plane, corresponding initial histogram information is communicated to the receivers 10*b*-1 to 10*b*-3.

For example, the transmission control unit c1 is provided with functions of the control device 20, whereby the transmission control unit c1 creates initial histogram information H1 regarding a path p1, initial histogram information H2 regarding a path p2, and initial histogram information H3 regarding a path p3. The initial histogram information H1 to H3 are then transmitted over the control plane.

Upon recognizing that the initial histogram information H1 to be dropped from the OADM node 10*a*-3 exists in the control information having flowed over the control plane, the transmission control unit c3 extracts the initial histogram information H1 from the control information and drops the initial histogram information H1 onto the receiver 10*b*-1.

Upon recognizing that the initial histogram information H2 to be dropped from the OADM node 10*a*-2 exists in the control information having flowed over the control plane, the transmission control unit c2 extracts the initial histogram information H2 from the control information and drops the initial histogram information H2 onto the receiver 10*b*-2.

Upon recognizing that the initial histogram information H3 to be dropped from the hub node 10*a*-10 exists in the control information having flowed over the control plane, the transmission control unit c10 extracts the initial histogram information H3 from the control information and drops the initial histogram information H3 onto the receiver 10*b*-3.

Figure 40:
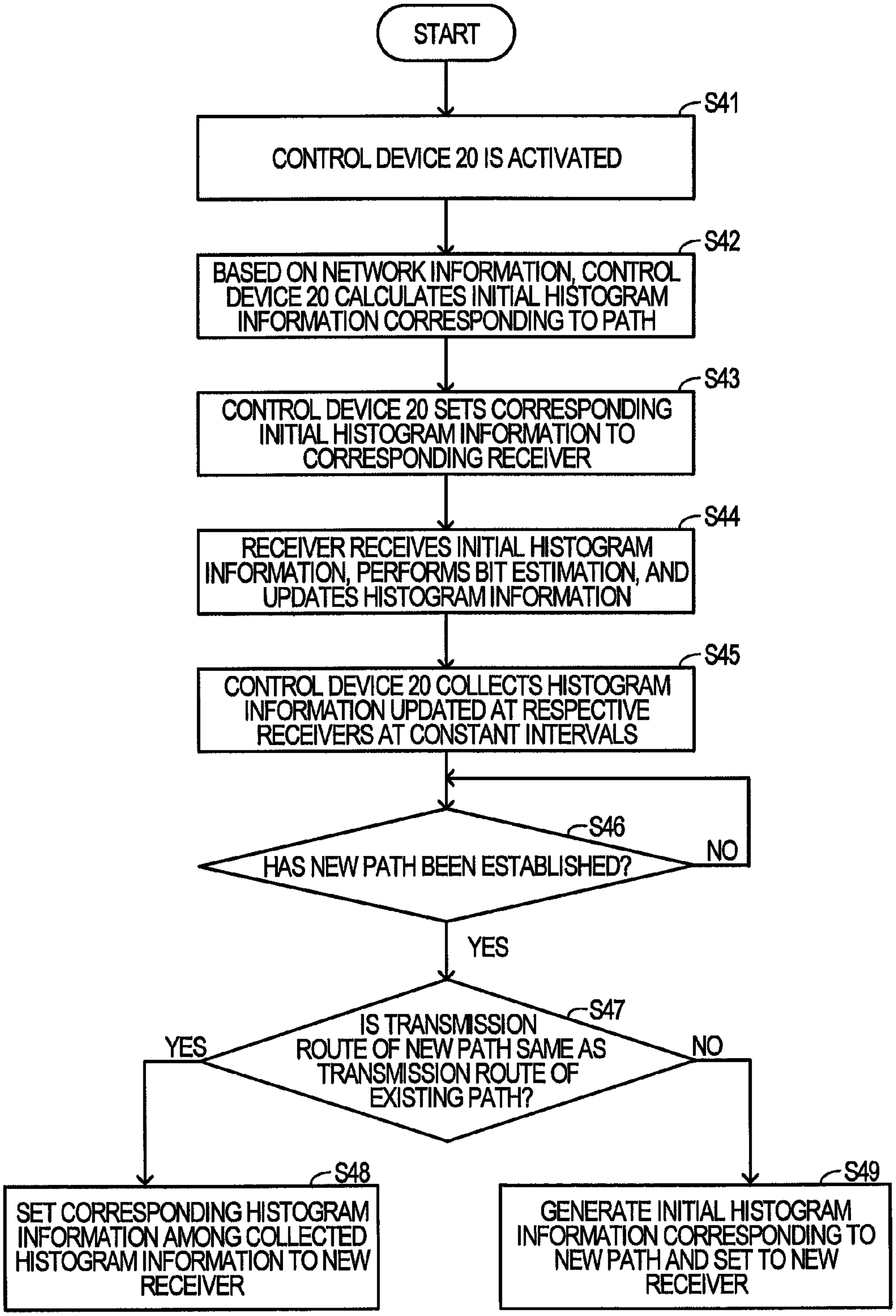
FIG. 40 is a flowchart illustrating generation/communication processing of initial histogram information when a new path is established.

Next, generation and communication processing of initial histogram information upon establishment of a new path will be described. FIG. 40 is a flowchart illustrating generation/communication processing of initial histogram information when a new path is established.

[S41] The control device 20 is activated.

[S42] Based on network information, the control device 20 calculates initial histogram information corresponding to paths.

[S43] Upon recognizing the activation of a receiver, the control device 20 sets the initial histogram information calculated for each path to a corresponding receiver that receives an optical signal through the path.

[S44] The receiver receives its own initial histogram information, and based on the initial histogram information, performs bit estimation and update histogram information.

[S45] The control device 20 collects histogram information updated by each receiver at constant intervals.

[S46] The control device 20 judges whether there is a newly established path or not. If there is a new path, processing proceeds to step S47. If not, step S46 is repeated.

[S47] The control device 20 judges whether or not the new path is the same as an existing path. If a transmission route of the new path is the same as a transmission route of an existing path, processing proceeds to step S48. If the transmission route of the new path differs from that of an existing path, processing proceeds to step S49.

[S48] With respect to a plurality of existing paths, let P1 to Pn denote the existing paths and Rk denote a receiver that receives an optical signal via an existing path Pk (where 1≤k≤n). In addition, let Pnew denote a new path and Rnew denote a receiver that receives an optical signal via the new path Pnew.

When a transmission route of the new path Pnew is the same as a transmission route of an existing path Pk, the control device 20 sets the latest histogram information (histogram information that was most recently updated) collected from the receiver Rk to the receiver Rnew.

[S49] When the new path Pnew differs from any of the transmission routes of the existing paths P1 to Pn, the control device 20 generates new initial histogram information corresponding to the new path Pnew and sets the new initial histogram information to the receiver Rnew.

As described above, when a new path Pnew is established, if the new path Pnew shares the same transmission channel route as an existing path Pk, setting histogram information corresponding to the existing path Pk to the receiver Rnew shall suffice. (This is premised on the assumption that transmission quality does not significantly differ even though a wavelength signal flowing through the new path Pnew differs from a wavelength signal flowing through the existing path Pk). Therefore, the latest histogram information updated at the receiver Rk side is set as initial histogram information to the receiver Rnew.

On the other hand, if the new path Pnew is a transmission channel route that differs from all existing paths P1 to Pk, new initial histogram information corresponding to the new path Pnew is to be generated and set to the receiver Rnew.

Figure 41:
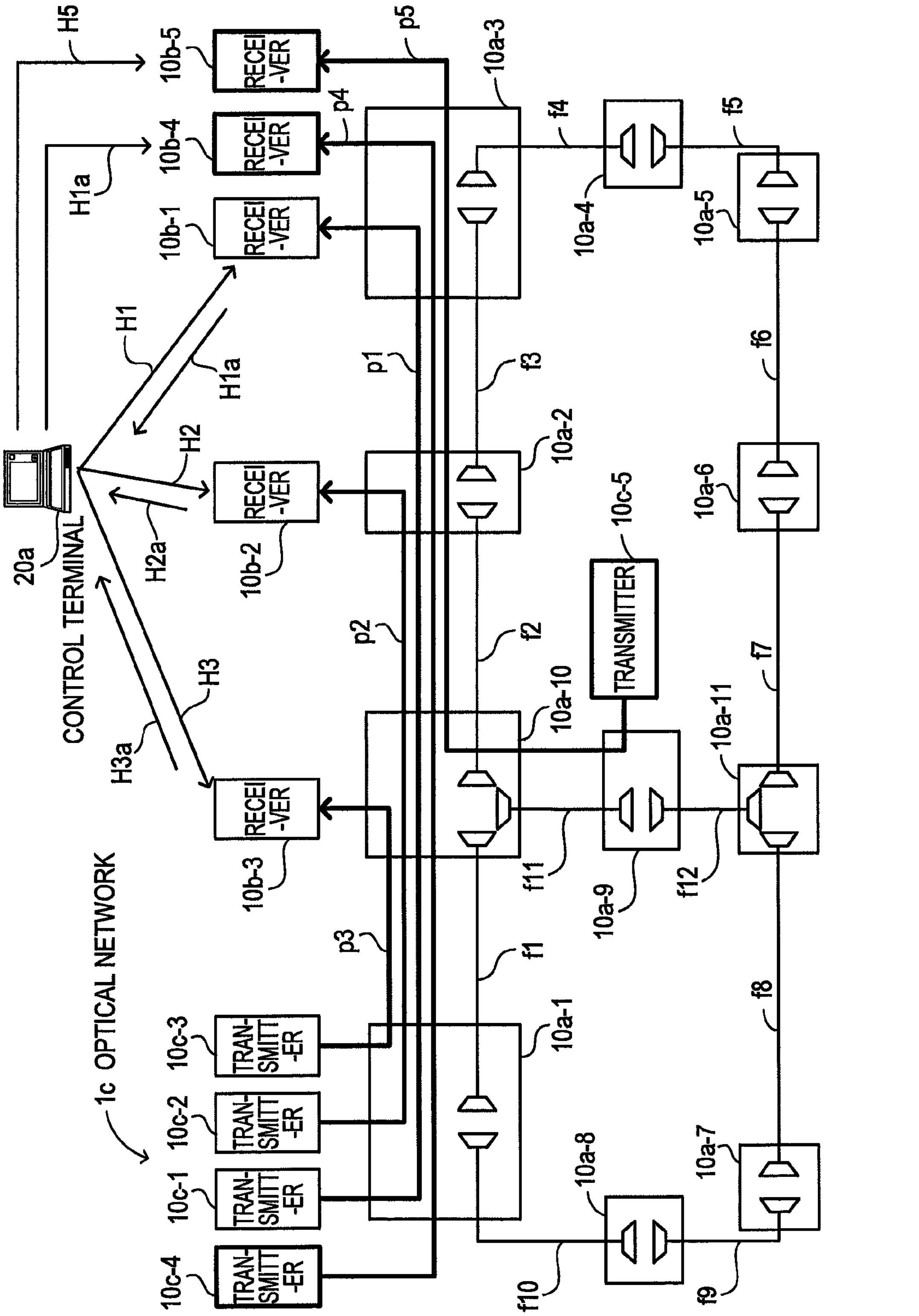
FIG. 41 is a diagram illustrating a network configuration example for describing generation/communication processing of initial histogram information upon establishment of a new path.

FIG. 41 is a diagram illustrating a network configuration example for describing generation/communication processing of initial histogram information upon establishment of a new path. Contents of the aforementioned flow chart will now be specifically described by graphically showing an optical network.

An optical network 1*c* is basically configured the same as the optical network 1*a* described earlier with reference to FIG. 10. However, a transmitter 10*c*-4 is newly connected to the OADM node 10*a*-1 and a transmitter 10*c*-5 is newly connected to the OADM node 10*a*-9. In addition, receivers 10*b*-4 and 10*b*-5 are newly connected to the OADM node 10*a*-3. Furthermore, a new path p4 has been generated between the transmitter 10*c*-4 and the receiver 10*b*-4 and a new path p5 has been generated between the transmitter 10*c*-5 and the receiver 10*b*-5.

Based on network information, the control terminal 20*a* calculates initial histogram information H1 to H3 corresponding to the paths p1 to p3. Subsequently, upon recognizing the activation of the receivers 10*b*-1 to 10*b*-3, the control terminal 20*a* sets the initial histogram information H1 to H3 to the receivers 10*b*-1 to 10*b*-3. Upon receiving their own initial histogram information, the receivers 10*b*-1 to 10*b*-3 perform bit estimation and update histogram information.

The control terminal 20*a* collects histogram information updated by the receivers 10*b*-1 to 10*b*-3 (the pieces of updated history information shall respectively be referred to as histogram information H1*a*, H2*a*, and H3*a*) at constant intervals. Subsequently, the control terminal 20*a* recognizes that the new paths p4 and p5 are newly established paths.

At this point, as the new paths p4 and p5 are established, the control terminal 20*a* generates initial histogram information corresponding to the new paths p4 and p5 and sets the initial histogram information to the receivers 10*b*-4 and 10*b*-5. Moreover, at this point, the control terminal 20*a* recognizes that the transmission route of the new path p4 is the same as the transmission route of the existing path p1 and that the transmission route of the new path p5 differs from all of the existing paths p1 to p3.

The control terminal 20*a* sets the collected histogram information H1*a* to the receiver 10*b*-4. In addition, for the receiver 10*b*-5, the control terminal 20*a* generates initial histogram information H5 for the new path p5 and sets the initial histogram information H5 to the receiver 10*b*-5.

Next, effects will be described based on transmission simulation results. FIGS. 42 and 43 are diagrams illustrating initial histogram information. The ordinates represent frequency and the abscissas represent quantization value z. Initial histogram data for eight combination patterns of present state-next bits for state bit N=2 are illustrated by line plots.

Figure 42:
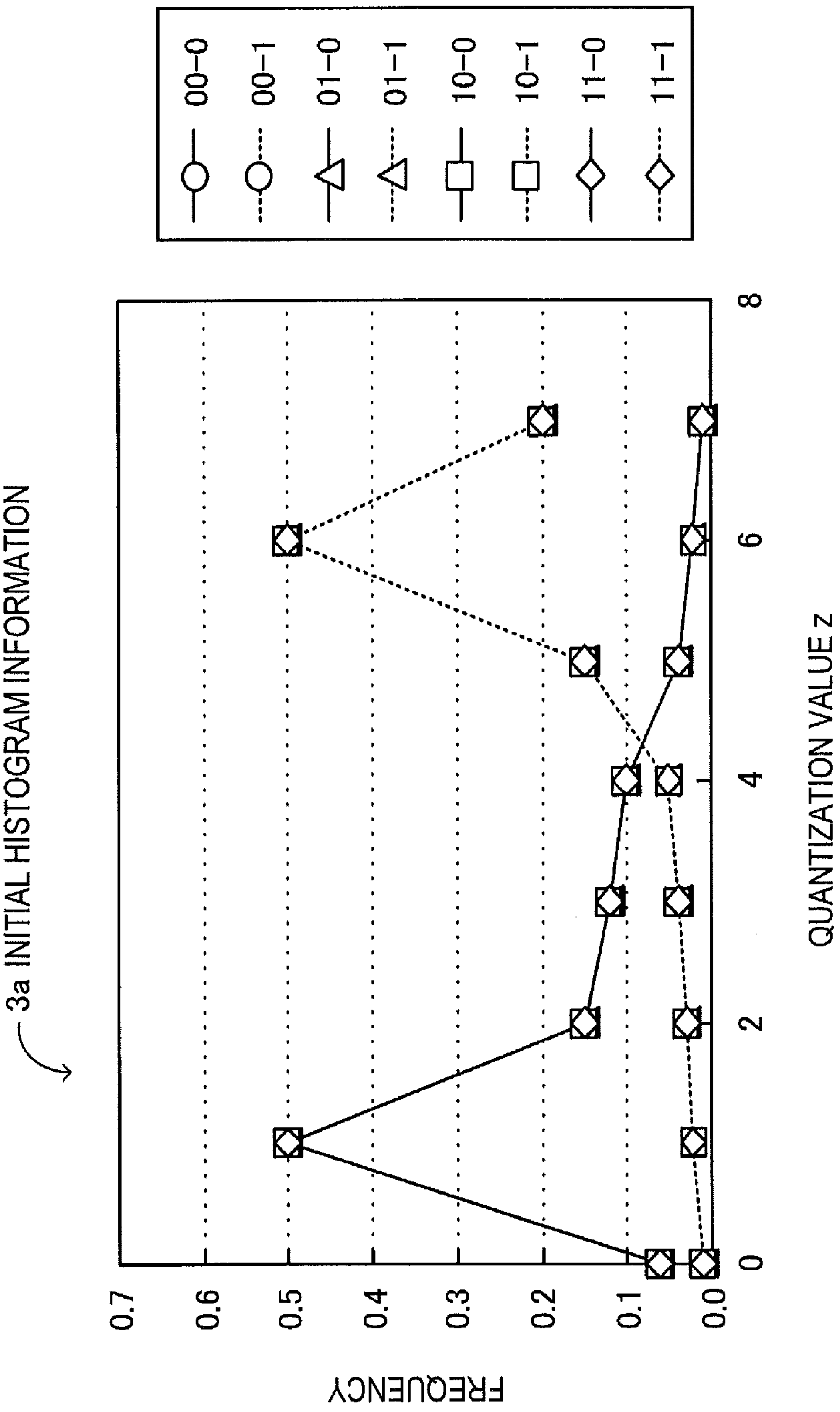
FIG. 42 is a diagram illustrating initial histogram information.
Figure 43:
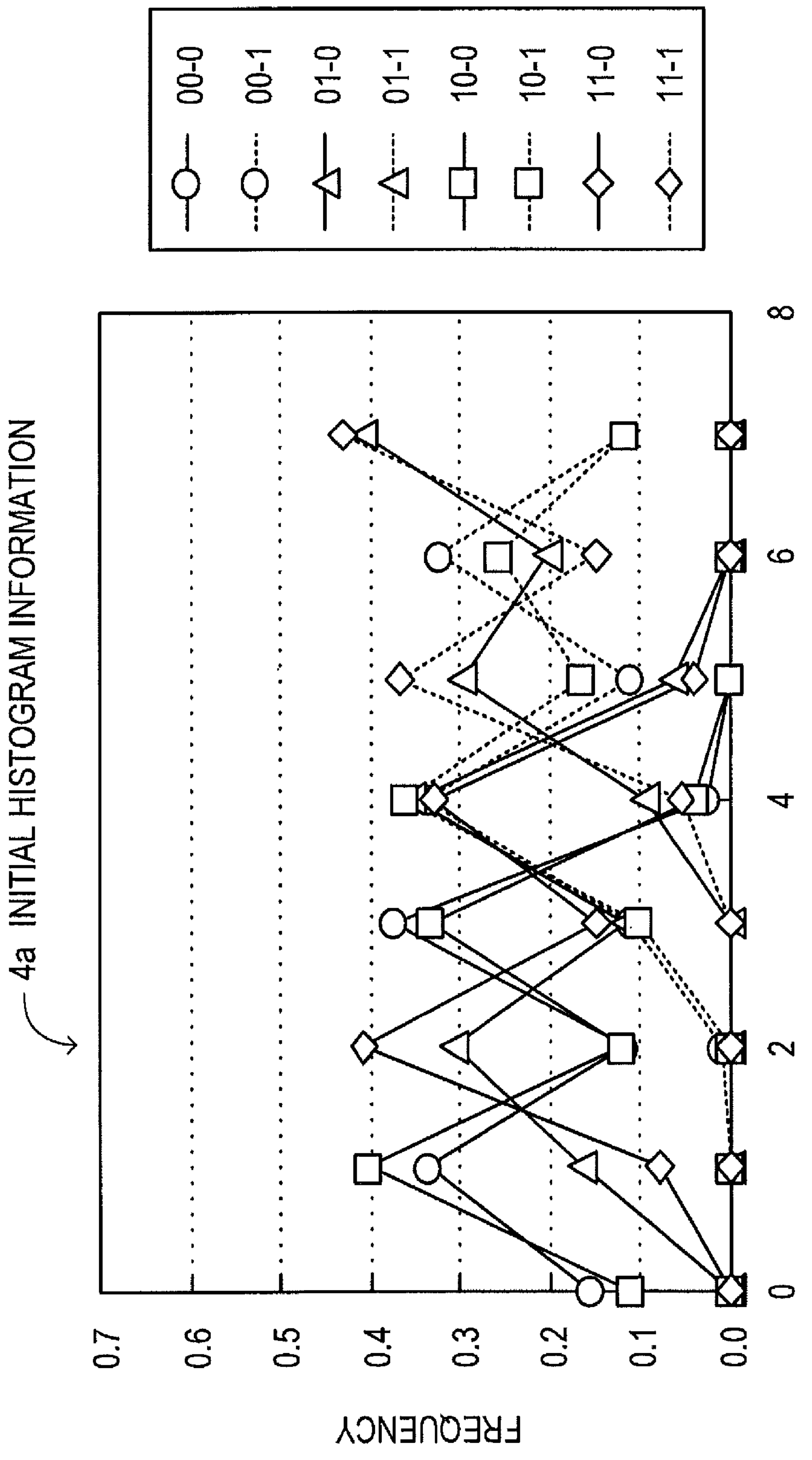
FIG. 43 is a diagram illustrating initial histogram information.

In addition, FIG. 42 illustrates conventional initial histogram information 3*a* set as a fixed value, while FIG. 43 illustrates initial histogram information 4*a* according to the present invention which has been generated from a received waveform obtained through waveform simulation.

It is assumed that the simulation conditions of the waveform simulation performed when generating the initial histogram information illustrated in FIG. 43 include an NRZ (Non Return to Zero) signal of 10.7059225E9 [bit/sec] as an input signal and 65536 as the number of inputted bits. It is further assumed that, as waveform degradation factors, a wavelength dispersion of 100 [ps/nm] has occurred, a DGD (Differential Group Delay) of 1.0 Tsec (T=1/10.7059225E9 [sec]) has occurred, and that the reception OSNR is 20.0 dB.

When a pulse signal flows through an optical fiber in which a PMD has occurred, the pulse signal splits into two polarization mode pulse waveforms with mutually different propagation velocities. The DGD corresponds to the magnitude of the pulse splitting and is used as an index of the magnitude of a signal waveform distortion when a PDM has occurred.

Figure 44:
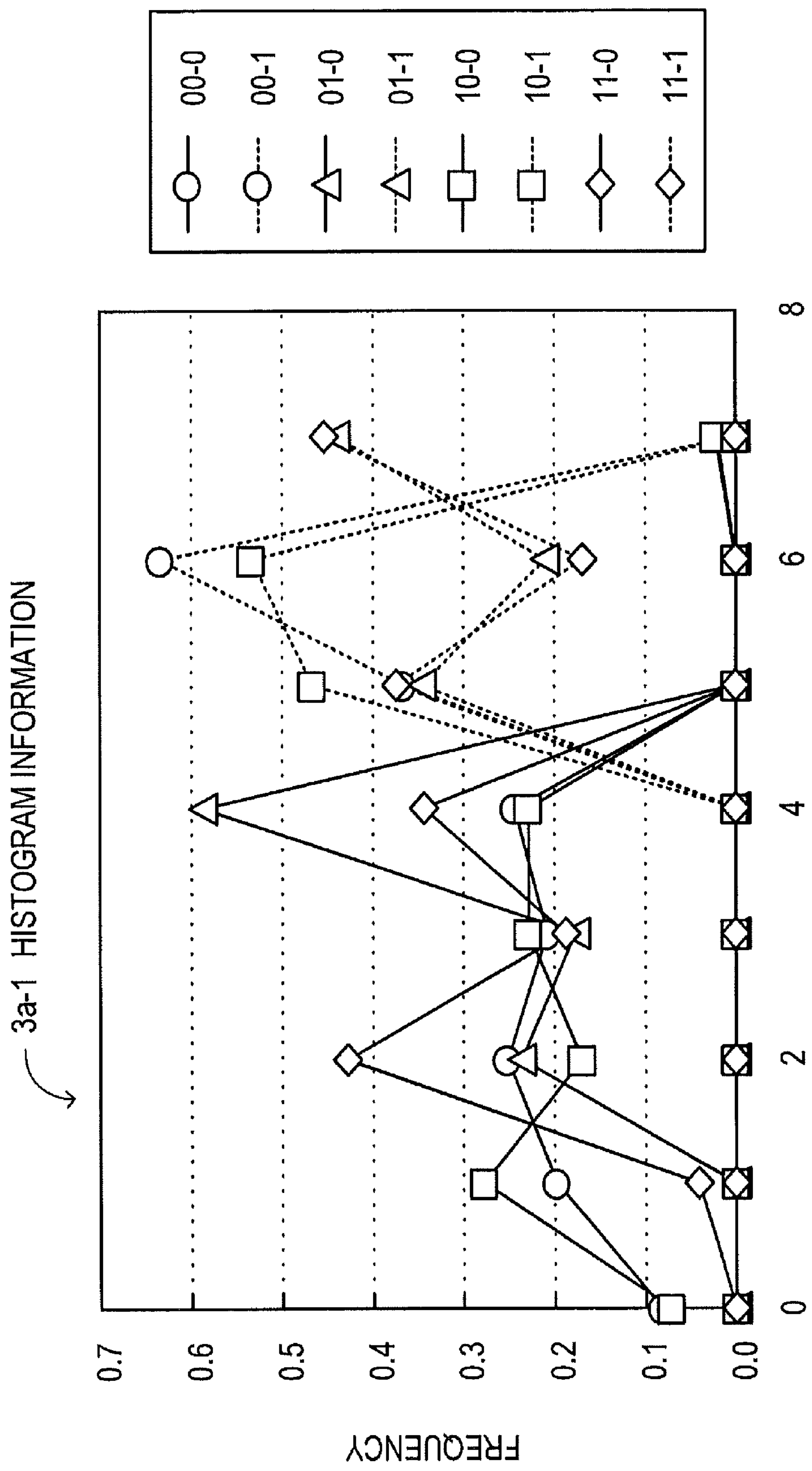
FIG. 44 is a diagram illustrating histogram information after initial histogram information is updated.
Figure 45:
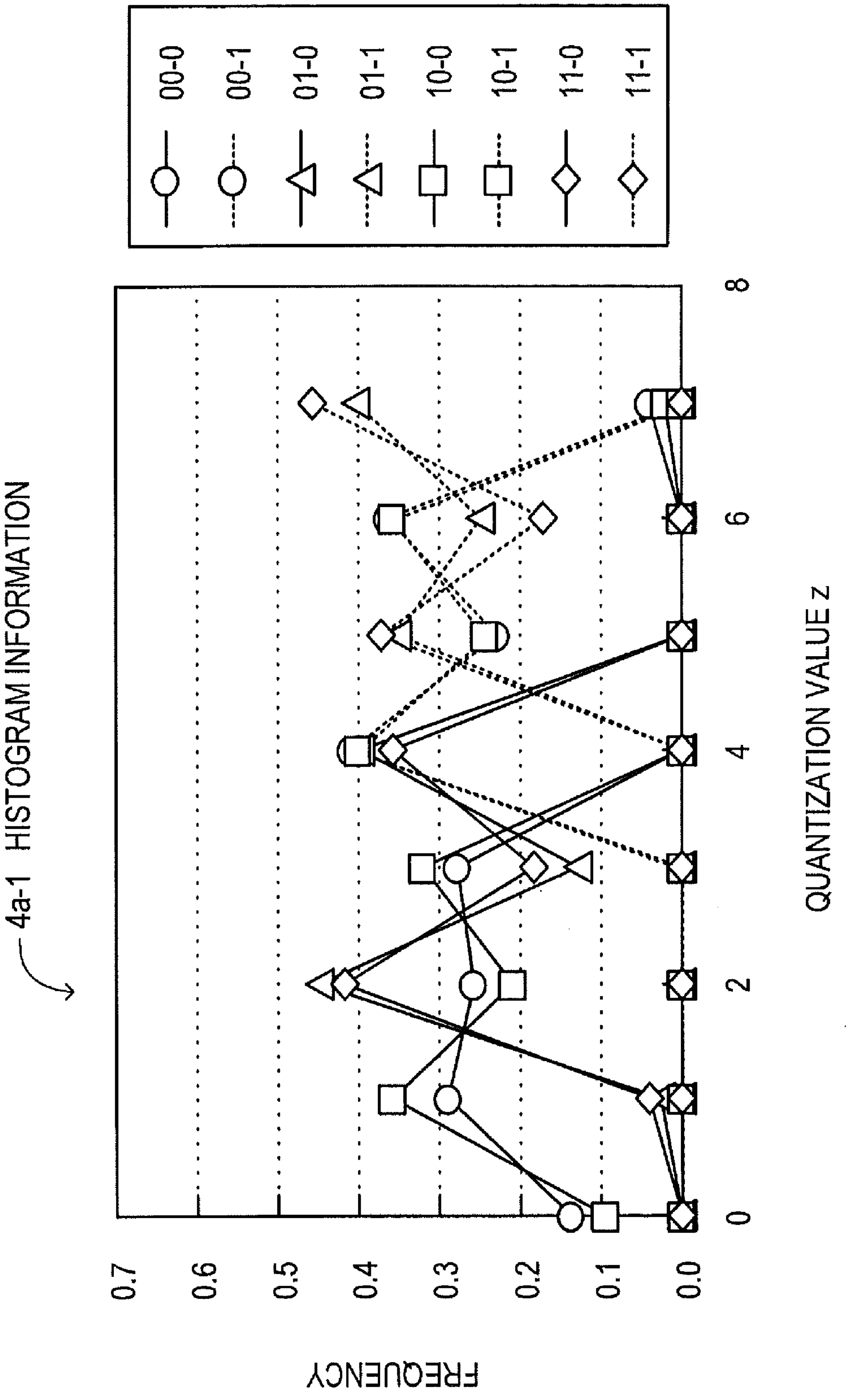
FIG. 45 is a diagram illustrating histogram information after initial histogram information is updated.
Figure 46:
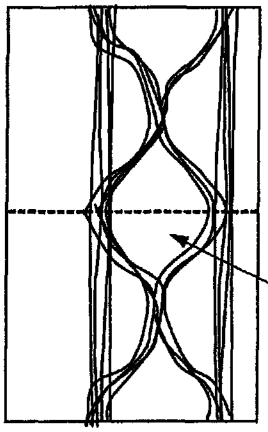
FIG. 46 is a diagram illustrating an eye pattern of a received signal.

FIGS. 44 and 45 are diagrams illustrating histogram information after initial histogram information is updated. The ordinates represent frequency while the abscissas represent quantization value z. FIG. 44 illustrates updated histogram information 3*a*-1 of the initial histogram information 3*a* illustrated in FIG. 42. FIG. 45 illustrates updated histogram information 4*a*-1 of the initial histogram information 4*a* illustrated in FIG. 43.

Histogram information 3*a*-1 and 4*a*-1 are updated and generated as needed during the reception of bits estimated from initial histogram information 3*a* and 4*a*. In addition, the histogram information 3*a*-1 and 4*a*-1 illustrated in FIG. 44 and FIG. 45 represent histogram data updated after all bits (the number of inputted bits=65536) have been received.

From the result of transmission simulation, while the number of errors is 8911/65536 bits and the error rate is 1.36E-1 in a conventional case, in the case of the present invention, the number of errors is 4378/65536 bits and the error rate is 6.68E-2.

Here, from the initial histogram information 4*a* which takes received waveform into consideration, by focusing on the differences in the 2 bits immediately preceding the received bit (the values expressed by xx in xx−1 and xx−0), it is shown that even when the same bit is received, histograms are to differ if the 2 immediately-preceding bits differ (for example, the histogram of 00-1 and the histogram of 01-1 differ even if the same bit 1 is received). This means that an optimum histogram is formed every time the 2 immediately-preceding bits differ.

In addition, a comparison of the initial histogram information 3*a* and the initial histogram information 4*a* reveals that there is a significant difference between the trends of frequencies of xx−0 (judged to be 0) and xx−1 (judged to be 1) (in other words, the deviation of the solid graph from the dotted graph is pronounced in initial histogram information 3*a* but unpronounced in the initial histogram information 4*a*). A significant difference between the trends of frequencies of xx−0 (judged to be 0) and xx−1 (judged to be 1) indicates a deterioration in the error rate.

Meanwhile, the shape of the initial histogram information 3*a* and the updated histogram information 3*a*-1 differs significantly, suggesting that an update to an optimum histogram has not been achieved with respect to the number of inputted bits (65536) (since the initial histogram information 3*a* is not appropriate with respect to the state of the transmission channel, the shape of the histogram cannot be specified no matter how many updates are performed).

In contrast, the shape of the initial histogram information 4*a* and the shape of the updated histogram information 4*a*-1 are similar, suggesting that an update to an optimum histogram has been achieved with respect to the number of inputted bits (65536) (since the initial histogram information 4*a* is appropriate with respect to the state of the transmission channel, the shape of the histogram does not change significantly even after subsequent updates).

As described above, the present invention is configured so that, using a receiver having an MLSE function, an initial value of a histogram to be used to estimate a bit sequence is appropriately set so as to reduce the error rate of a received signal. Conventionally, an MLSE receiver individually manages an initial value and is incapable of reflecting information regarding an entire network to a histogram. However, due to the communication system 1, it is now possible to calculate and set initial histograms appropriate for the respective receivers from information regarding the entire network. Therefore, the error rate of a received signal can be reduced significantly to enable improvement of transmission quality.

In summary, by calculating initial likelihood information for performing maximum likelihood sequence estimation for each individual path and setting the initial likelihood information to a predetermined transmission device, it is now possible to perform bit estimation using appropriate likelihood information reflecting a present network state. Consequently, error rates can be reduced and the transmission quality of an entire system can be improved.

Therefore, according to an aspect of the embodiments of the invention, any combinations of one or more of the described features, functions, operations, and/or benefits can be provided. A combination can be one or a plurality. The embodiments of the invention can be a method (process), an apparatus (machine), and/or manufacture, and including computer readable recording media. The embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The apparatus (e.g., the transceivers 10-*n*, control device 20, etc.) comprises a controller (CPU) (e.g., a hardware logic circuitry based computer processor that processes or executes instructions, namely software/program), computer readable recording media, transmission communication media interface (network interface), and/or a display device, all in communication through a data communication bus. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations. The results produced can be displayed on the display.

A program/software implementing the embodiments may be recorded on computer-readable recording media. Examples of the computer-readable recording media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW.

The program/software implementing the embodiments may also be included/encoded as a data signal and transmitted over transmission communication media. A data signal moves on transmission communication media, such as wired network or wireless network, for example, by being incorporated in a carrier wave. The data signal may also be transferred by a so-called baseband signal. A carrier wave can be transmitted in an electrical, magnetic or electromagnetic form, or an optical, acoustic or any other form.]

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A communication system for communicating over a network, the communication system comprising:

a plurality of transmission devices disposed within a network and connected by transmission channels; and a control device that sets initial-stage likelihood information required during an initial activation of a transmission device for performing maximum likelihood sequence estimation, in accordance with histogram information corresponding to a transmission state reflecting waveform distortion and/or noise deterioration of a communication path of connected transmission channel.

2. The communication system according to claim 1, wherein the control device obtains, for a quantization value when a received signal is quantized by the transmission devices, a distribution of a likelihood that, under a condition that a bit sequence of N bits (where N=2, 3, 4, . . . ) has occurred, a presently received bit takes a value of 0, and a distribution of a likelihood that, under the condition that a bit sequence of N bits has occurred, a presently received bit takes a value of 1, expresses the distribution of the likelihood that a value of 0 is to be taken and the distribution of the likelihood that a value of 1 is to be taken as histogram data, obtains initial histogram information made up of $2^N\times2$ pieces of histogram data in accordance with a transmission state of communication paths as the initial likelihood information, and when the initial histogram information obtained in accordance with the transmission states of communication paths p1 to pn (where n=1, 2, 3, . . . ) is assumed to be initial histogram information H1 to Hn, sets, to a transmission device Rk (where $1\leq k\leq n$; k is an integer) that receives a signal transmitted through a communication path pk, initial histogram information Hk corresponding to the communication path pk.

3. The communication system according to claim 2, wherein the control device comprises:

a network information managing unit that manages network information that is state information of the transmission channels and the transmission devices;

a received waveform generating unit that performs a waveform simulation of a target communication path based on the network information to obtain a received waveform;

a signal level retaining unit that retains a signal level of the received waveform;

a noise distribution computing unit that calculates a standard deviation of a noise distribution based on the network information; and an initial histogram information computing unit that calculates a likelihood that quantization values to be taken from the noise distribution has the standard deviation and normalizes the calculated likelihood to generate the initial histogram information.

4. The communication system according to claim 2, wherein functions in the control device are set to a control terminal connectable to the transmission devices, and the initial histogram information generated at the control terminal is to be inserted into a monitoring control signal for communicating operational information among the transmission devices to be communicated to predetermined transmission devices.

5. The communication system according to claim 2, wherein functions in the control device are set to a transmission control unit in the transmission devices which perform transmission control of the transmission devices, and the initial histogram information generated at the transmission control unit is inserted into a control plane that is a channel for communicating operational information and is communicated to predetermined transmission devices.

6. The communication system according to claim 2, wherein if existing communication paths P1 to Pn denote a plurality of existing communication paths, a transmission device Rk (where 1≤k≤n) denotes a transmission device that transmits signals via an existing communication path Pk, a new communication path Pnew denotes a newly established communication path, and a transmission device Rnew denotes a transmission device that transmits signals via the new communication path Pnew, then the control device collects, at constant intervals, histogram information after initial histogram information respectively set to the transmission devices R1 to Rn is updated, upon recognizing that the new communication path Pnew has been established, sets histogram information collected from the transmission device Rk to the transmission device Rnew if a transmission route of the new communication path Pnew is same as a transmission route of an existing communication path Pk, and generates new initial histogram information corresponding to the new communication path Pnew and sets the new initial histogram information to the transmission device Rnew if the transmission route of the new communication path Pnew differs from any of transmission routes of the existing communication paths P1 to Pn.

7. The communication system according to claim 3, wherein the initial histogram information computing unit performs:

a first computation for generating the initial histogram information reflecting waveform distortion and/or noise deterioration occurring at the target communication path; or a second computation for generating the initial histogram information reflecting noise deterioration occurring at the target communication path, wherein the initial histogram information computing unit generates the initial histogram information when performing the first computation from the noise distribution superimposed on a signal level of the received waveform obtained through the waveform simulation, and the initial histogram information computing unit generates the initial histogram information when performing the second computation from the noise distribution at bit 1 and the noise distribution at bit 0.

8. The communication system according to claim 7, wherein the initial histogram information computing unit, when a bit of the quantization value is an (n+1) bit of a quantization value 0 to n (where n=0, 1, 2, . . . ), calculates, if an intermediate value of the quantization value is denoted by a quantization intermediate value Mk (where 0≤k≤n+1; k is an integer), Mk=M0=0 when k=0, Mk=(k+(k−1))/2 when 1≤k≤n, and Mk=Mn+1=n when k=n+1, divides the quantization intermediate value Mk by n to obtain a normalized received level Sk (Sk=Mk/n) which expresses a signal received level range by a discrete value, when performing the first computation, if the signal level of the received waveform is denoted by a signal level L1 to Lp (where p=1, 2, . . . ), calculates a probability of occurrence Pk that a probability variable in the noise distribution superimposed on a signal level Lr (where 1≤r≤p; r is an integer) equals or falls below a value of the normalized received level Sk, with respect to a quantization value k−1 (where 1≤k≤n+1) corresponding to the normalized received level Sk and a quantization value k−2 (where 2≤k≤n+1) corresponding to a normalized received level Sk−1, subtracts the probability of occurrence Pk−1 of equaling or falling below the quantization value k−2 from the probability of occurrence Pk of equaling or falling below the quantization value k−1 to obtain a frequency that is a probability that the signal level Lr equals the quantization value k−1, when k takes a value of 1, subtracts a probability of occurrence of a normalized received level S0 from a probability of occurrence P1 of equaling or falling below a quantization value 0 to obtain a frequency that is a probability that the signal level Lr equals the quantization value 0, and obtains frequencies of all signal levels L1 to Lp and assumes normalized values of the frequencies to be data values of the initial histogram information, when performing the second computation, calculates a probability of occurrence Pk that a probability variable in the noise distribution of bit 0 equals or falls below a value of the normalized received level Sk, with respect to a quantization value k−1 (where 1≤k≤n+1) corresponding to the normalized received level Sk and a quantization value k−2 (where 2≤k≤n+1) corresponding to the normalized received level Sk−1, subtracts the probability of occurrence Pk−1 of equaling or falling below the quantization value k−2 from the probability of occurrence Pk of equaling or falling below the quantization value k−1 to obtain a frequency of bit 0 that is a probability that the signal level Lr equals the quantization value k−1, when k takes a value of 1, subtracts a probability of occurrence of the normalized received level S0 from a probability of occurrence P1 of equaling or falling below a quantization value 0 to obtain a frequency that is a probability that the signal level Lr equals the quantization value 0, and calculates a probability of occurrence Pk that a probability variable in the noise distribution of bit 1 equals or falls below a value of the normalized received level Sk, with respect to a quantization value k−1 (where 1≤k≤n+1) corresponding to the normalized received level Sk and a quantization value k−2 (where 2≤k≤n+1) corresponding to the normalized received level Sk−1, subtracts the probability of occurrence Pk−1 of equaling or falling below the quantization value k−2 from the probability of occurrence Pk of equaling or falling below the quantization value k−1 to obtain a frequency of bit 1 that is a probability that the signal level Lr equals the quantization value k−1, when k takes a value of 1, subtracts a probability of occurrence of the normalized received level S0 from a probability of occurrence P1 of equaling or falling below a quantization value 0 to obtain a frequency that is a probability that the signal level Lr equals the quantization value 0, and assumes the normalized values of the frequencies of bit 0 and bit 1 to be data values of the initial histogram information.

9. The communication system according to claim 7, wherein the initial histogram information computing unit extracts information on a transmission distance of the target communication path from the network information, and when the extracted transmission distance exceeds a threshold, selects the first computation and generates the initial histogram information regarding the target communication path through the first computation, but when the transmission distance does not exceed the threshold, selects the second computation and generates the initial histogram information regarding the target communication path through the second computation.

10. A control device that calculates initial data required upon initial operation of transmission devices that perform reception processing of maximum likelihood sequence estimation, the control device comprising:

a network information managing unit that manages network information including transmission states of communication paths that are signal communication pathways between the transmission devices, the transmission states including state information of network transmission channels on which the transmission devices are disposed and/or state information on the transmission devices; and a control unit that causes setting of initial-stage likelihood information required during an initial activation of a transmission device for performing the maximum likelihood sequence estimation, in accordance with histogram information corresponding to a transmission state reflecting waveform distortion and/or noise deterioration of a communication path of connected network transmission channel obtained from the network information managing unit.

11. The control device according to claim 10, wherein the control unit obtains, for a quantization value when a received signal is quantized by the transmission devices, a distribution of a likelihood that, under a condition that a bit sequence of N bits (where N=2, 3, 4, . . . ) has occurred, a presently received bit takes a value of 0, and a distribution of a likelihood that, under the condition that a bit sequence of N bits has occurred, a presently received bit takes a value of 1, expresses the distribution of the likelihood that a value of 0 is to be taken and the distribution of the likelihood that a value of 1 is to be taken as histogram data, obtains initial histogram information made up of $2^N \times 2$ pieces of histogram data in accordance with a transmission state of communication paths as the initial likelihood information, and when the initial histogram information obtained in accordance with the transmission states of communication paths p1 to pn (where n=1, 2, 3, . . . ) is assumed to be initial histogram information H1 to Hn, sets, to a transmission device Rk (where 1≤k≤n: k is an integer) that receives a signal transmitted through a communication path pk, initial histogram information Hk corresponding to the communication path pk.

12. The control device according to claim 11, wherein the control unit comprises:

a received waveform generating unit that performs a waveform simulation of target communication path based on the network information to obtain a received waveform;

a signal level retaining unit that retains a signal level of the received waveform;

a noise distribution computing unit that calculates a standard deviation of a noise distribution based on the network information; and an initial histogram information computing unit that calculates a likelihood that quantization values to be taken from the noise distribution has the standard deviation and normalizes the calculated likelihood to generate the initial histogram information.

13. The control device according to claim 11, wherein functions in the control device are set to a control terminal connectable to the transmission devices, and the initial histogram information generated at the control terminal is to be inserted into a monitoring control signal for communicating operational information among the transmission devices to be communicated to predetermined transmission devices.

14. The control device according to claim 11, wherein functions in the control device are set to a transmission control unit in the transmission devices which perform transmission control of the transmission devices, and the initial histogram information generated at the transmission control unit is inserted into a control plane that is a channel for communicating operational information and is communicated to predetermined transmission devices.

15. The control device according to claim 11, wherein if existing communication paths P1 to Pn denote a plurality of existing communication paths, a transmission device Rk (where 1≤k≤n) denotes a transmission device that transmits signals via an existing communication path Pk, a new communication path Pnew denotes a newly established communication path, and a transmission device Rnew denotes a transmission device that transmits signals via the new communication path Pnew, the control unit collects, at constant intervals, histogram information after initial histogram information respectively set to the transmission devices R1 to Rn is updated, upon recognizing that the new communication path Pnew has been established, sets histogram information collected from the transmission device Rk to the transmission device Rnew if a transmission route of the new communication path Pnew is the same as a transmission route of an existing communication path Pk, and generates new initial histogram information corresponding to the new communication path Pnew and sets the new initial histogram information to the transmission device Rnew if the transmission route of the new communication path Pnew differs from any of the transmission routes of the existing communication paths P1 to Pn.

16. The control device according to claim 12, wherein the initial histogram information computing unit performs:

a first computation for generating the initial histogram information reflecting waveform distortion and/or noise deterioration occurring at the target communication path; or a second computation for generating the initial histogram information reflecting noise deterioration occurring at the target communication path, wherein the initial histogram information computing unit generates the initial histogram information when performing the first computation from the noise distribution superimposed on a signal level of the received waveform obtained through the waveform simulation, and the initial histogram information computing unit generates the initial histogram information when performing the second computation from the noise distribution at bit 1 and the noise distribution at bit 0.

17. The control device according to claim 16, wherein the initial histogram information computing unit, when a bit of the quantization value is an (n+1) bit of a quantization value 0 to n (where n=0, 1, 2, . . . ), if an intermediate value of the quantization value is denoted by a quantization intermediate value Mk (where 0≤k≤n+1; k is an integer), calculates Mk=M0=0 when k=0, Mk=(k+(k−1))/2 when 1≤k≤n, and Mk=Mn+1=n when k=n+1, divides the quantization intermediate value Mk by n to obtain a normalized received level Sk (Sk=Mk/n) which expresses a signal received level range by a discrete value, when performing the first computation, if the signal level of the received waveform is denoted by a signal level L1 to Lp (where p=1, 2, . . . ), calculates a probability of occurrence Pk that a probability variable in the noise distribution superimposed on a signal level Lr (where 1≤r≤p; r is an integer) equals or falls below a value of the normalized received level Sk, with respect to a quantization value k−1 (where 1≤k≤n+1) corresponding to the normalized received level Sk and a quantization value k−2 (where 2≤k≤n+1) corresponding to a normalized received level Sk−1, subtracts the probability of occurrence Pk−1 of equaling or falling below the quantization value k−2 from the probability of occurrence Pk of equaling or falling below the quantization value k−1 to obtain a frequency that is a probability that the signal level Lr equals the quantization value k−1, when k takes a value of 1, subtracts a probability of occurrence of a normalized received level S0 from a probability of occurrence P1 of equaling or falling below a quantization value 0 to obtain a frequency that is a probability that the signal level Lr equals the quantization value 0, and obtains frequencies of all signal levels L1 to Lp and assumes normalized values of the frequencies to be data values of the initial histogram information, when performing the second computation, calculates a probability of occurrence Pk that a probability variable in the noise distribution of bit 0 equals or falls below a value of the normalized received level Sk, with respect to a quantization value k−1 (where 1≤k≤n+1) corresponding to the normalized received level Sk and a quantization value k−2 (where 2≤k≤n+1) corresponding to the normalized received level Sk−1, subtracts the probability of occurrence Pk−1 of equaling or falling below the quantization value k−2 from the probability of occurrence Pk of equaling or falling below the quantization value k−1 to obtain a frequency of bit 0 that is a probability that the signal level Lr equals the quantization value k−1, when k takes a value of 1, subtracts a probability of occurrence of the normalized received level S0 from a probability of occurrence P1 of equaling or falling below a quantization value 0 to obtain a frequency that is a probability that the signal level Lr equals the quantization value 0, and calculates a probability of occurrence Pk that a probability variable in the noise distribution of bit 1 equals or falls below a value of the normalized received level Sk, with respect to a quantization value k−1 (where 1≤k≤n+1) corresponding to the normalized received level Sk and a quantization value k−2 (where 2≤k≤n+1) corresponding to the normalized received level Sk−1, subtracts the probability of occurrence Pk−1 of equaling or falling below the quantization value k−2 from the probability of occurrence Pk of equaling or falling below the quantization value k−1 to obtain a frequency of bit 1 that is a probability that the signal level Lr equals the quantization value k−1, when k takes a value of 1, subtracts a probability of occurrence of the normalized received level S0 from a probability of occurrence P1 of equaling or falling below a quantization value 0 to obtain a frequency that is a probability that the signal level Lr equals the quantization value 0, and assumes the normalized values of the frequencies of bit 0 and bit 1 to be data values of the initial histogram information.

18. The control device according to claim 16, wherein the initial histogram information computing unit extracts information on a transmission distance of the target communication path from the network information, and when the extracted transmission distance exceeds a threshold, selects the first computation and generates the initial histogram information regarding the target communication path through the first computation, but when the transmission distance does not exceed the threshold, selects the second computation and generates the initial histogram information regarding the target communication path through the second computation.

19. A method of calculating initial data required upon initial activation of transmission devices that perform reception processing by maximum likelihood sequence estimation, the method comprising:

collecting network information on transmission states of communication paths that are signal communication pathways between the transmission devices; and executing by a computer processor setting of initial-stage likelihood information required during an initial activation of a transmission device for performing the maximum likelihood sequence estimation, in accordance histogram information corresponding to with a transmission state reflecting waveform distortion and/or noise deterioration of a communication path of connected network transmission channel.

20. The method according to claim 19, wherein the network information on the transmission states of the communication paths include state information of network transmission channels on which the transmission devices are disposed and/or state information of the transmission devices.

* * * * *